(12) United States Patent
Azernikov et al.

(10) Patent No.: US 12,295,806 B2
(45) Date of Patent: May 13, 2025

(54) AUTOMATIC DETERMINATION OF TRIM-LINE FOR ALIGNERS

(71) Applicant: James R. Glidewell Dental Ceramics, Inc., Newport Beach, CA (US)

(72) Inventors: Sergei Azernikov, Irvine, CA (US); Fedor Chelnokov, Khimki (RU)

(73) Assignee: James R. Glidewell Dental Ceramics, Inc., Newport Beach, CA (US)

( * ) Notice: Subject to any disclaimer, the term of this patent is extended or adjusted under 35 U.S.C. 154(b) by 142 days.

(21) Appl. No.: 17/572,239

(22) Filed: Jan. 10, 2022

(65) Prior Publication Data

US 2023/0218370 A1    Jul. 13, 2023

(51) Int. Cl.
*A61C 7/00*    (2006.01)
*A61C 9/00*    (2006.01)
*G06T 17/20*   (2006.01)

(52) U.S. Cl.
CPC .............. *A61C 7/002* (2013.01); *A61C 9/004* (2013.01); *G06T 17/20* (2013.01); *A61C 2007/004* (2013.01); *G06T 2210/41* (2013.01)

(58) Field of Classification Search
CPC ... A61C 7/002; A61C 9/004; A61C 2007/004; G06T 17/20; G06T 2210/41
See application file for complete search history.

(56) References Cited

U.S. PATENT DOCUMENTS

| | | |
|---|---|---|
| 6,140,950 A | 10/2000 | Oprescu |
| 6,409,504 B1 | 6/2002 | Jones et al. |
| 6,701,016 B1 | 3/2004 | Jojic et al. |
| 7,084,868 B2 | 8/2006 | Farag et al. |
| 7,187,790 B2 | 3/2007 | Sabol et al. |
| 7,490,085 B2 | 2/2009 | Walker et al. |
| 7,702,492 B2 | 4/2010 | Marshall |
| 7,708,557 B2 | 5/2010 | Rubbert |
| 7,860,300 B2 | 12/2010 | Siltanen et al. |
| 8,068,580 B2 | 11/2011 | Lang et al. |

(Continued)

FOREIGN PATENT DOCUMENTS

| | | |
|---|---|---|
| CA | 3146240 A1 | 1/2021 |
| DE | 102017203475 A1 | 9/2018 |

(Continued)

OTHER PUBLICATIONS

US 11,182,981 B2, 11/2021, Long et al. (withdrawn)

(Continued)

*Primary Examiner* — Sing-Wai Wu
(74) *Attorney, Agent, or Firm* — Klarquist Sparkman, LLP

(57) ABSTRACT

A computer-implemented method/system of determining a trim-line includes receiving a 3D digital dental model; combining the one or more virtual teeth; determining a distance field; determining a first iso-line; determining a back distance field; determining a second iso-line to generate a trim-line. A computer-implemented method/system of segmenting the 3D digital dental model includes receiving a 3D digital dental model; determining an initial virtual tooth location of one or more virtual teeth; constructing a virtual crown line; determining a long axis of one or more virtual teeth; constructing a virtual root line; determining a virtual tooth virtual bounding box; performing an initial segmentation; performing final segmentation.

20 Claims, 40 Drawing Sheets

(56) References Cited

U.S. PATENT DOCUMENTS

| | | |
|---|---|---|
| 8,126,726 B2 | 2/2012 | Matov et al. |
| 8,454,362 B2 | 6/2013 | Rubbert |
| 8,602,780 B2 | 12/2013 | Rubbert |
| 9,417,700 B2 | 8/2016 | El Dokor et al. |
| 9,474,582 B2 | 10/2016 | Musuvathy et al. |
| 9,818,186 B2 | 11/2017 | Kim et al. |
| 9,865,176 B2 | 1/2018 | Tran |
| 10,278,584 B2 | 5/2019 | Glinec et al. |
| 10,438,363 B2 | 10/2019 | Kim et al. |
| 10,537,463 B2 | 1/2020 | Kopelman |
| 10,542,944 B2 | 1/2020 | Petersilka |
| 10,548,690 B2 | 2/2020 | Wen |
| 10,624,717 B2 | 4/2020 | Wen |
| 10,755,409 B2 | 8/2020 | Salah et al. |
| 10,912,530 B2 | 2/2021 | Mandelkern et al. |
| 10,925,691 B2 | 2/2021 | Yancey et al. |
| 10,932,890 B1 | 3/2021 | Sant et al. |
| 10,984,529 B2 | 4/2021 | Carter et al. |
| 10,997,727 B2 | 5/2021 | Xue et al. |
| 11,000,349 B2 | 5/2021 | Willers et al. |
| 11,007,040 B2 | 5/2021 | Azernikov et al. |
| 11,026,766 B2 | 6/2021 | Chekh et al. |
| 11,049,248 B2 | 6/2021 | Salah et al. |
| 11,051,912 B2 | 7/2021 | Martz et al. |
| 11,051,914 B2 | 7/2021 | Kopelman et al. |
| 11,058,515 B1 * | 7/2021 | Raslambekov .......... A61C 7/08 |
| 11,109,945 B2 | 8/2021 | Salah et al. |
| 11,116,466 B2 | 9/2021 | Mandelkern et al. |
| 11,154,267 B2 | 10/2021 | Mandelkern et al. |
| 11,164,045 B2 | 11/2021 | Paik et al. |
| 11,189,021 B2 | 11/2021 | Shah et al. |
| 11,191,508 B2 | 12/2021 | Mandelkern et al. |
| 11,191,618 B1 | 12/2021 | Raslambekov |
| 11,194,312 B2 | 12/2021 | Cramer et al. |
| 11,232,573 B2 | 1/2022 | Brown et al. |
| 11,238,586 B2 | 2/2022 | Minchenkov et al. |
| 11,250,580 B2 | 2/2022 | Meyer et al. |
| 11,270,523 B2 | 3/2022 | Long et al. |
| 11,278,375 B2 | 3/2022 | Wang et al. |
| 11,291,404 B2 | 4/2022 | Schnabel et al. |
| 11,291,532 B2 | 4/2022 | Azernikov et al. |
| 11,399,792 B2 | 8/2022 | Mandelkern et al. |
| 11,403,813 B2 | 8/2022 | Katzman et al. |
| 11,423,697 B1 | 8/2022 | Wucher et al. |
| 11,517,272 B2 | 12/2022 | Unklesbay et al. |
| 11,534,272 B2 | 12/2022 | Li et al. |
| 11,534,275 B2 | 12/2022 | Wey |
| 11,568,656 B2 | 1/2023 | Mohan et al. |
| 11,589,955 B2 | 2/2023 | Medvinskaya et al. |
| 11,589,957 B2 | 2/2023 | Carrier, Jr. et al. |
| 11,622,843 B2 | 4/2023 | Nikolskiy et al. |
| 11,672,629 B2 | 6/2023 | Chekh et al. |
| 11,676,701 B2 | 6/2023 | Carter et al. |
| 11,694,418 B2 | 7/2023 | Long et al. |
| 11,735,306 B2 | 8/2023 | Wirjadi et al. |
| 11,887,209 B2 | 1/2024 | Traff et al. |
| 11,894,114 B2 | 2/2024 | Paik et al. |
| 11,900,538 B2 | 2/2024 | Katzman et al. |
| 11,918,437 B2 | 3/2024 | Salah et al. |
| 2002/0015934 A1 | 2/2002 | Rubbert et al. |
| 2002/0028418 A1 | 3/2002 | Farag et al. |
| 2004/0122702 A1 | 6/2004 | Sabol et al. |
| 2004/0122703 A1 | 6/2004 | Walker et al. |
| 2004/0122719 A1 | 6/2004 | Sabol et al. |
| 2004/0152036 A1 | 8/2004 | Abolfathi |
| 2004/0197728 A1 | 10/2004 | Abolfathi et al. |
| 2005/0192835 A1 | 9/2005 | Kuo et al. |
| 2007/0047794 A1 | 3/2007 | Lang et al. |
| 2007/0183633 A1 | 8/2007 | Hoffmann |
| 2009/0019552 A1 | 1/2009 | McLaughlin et al. |
| 2009/0024416 A1 | 1/2009 | McLaughlin et al. |
| 2010/0309301 A1 | 12/2010 | Thiel et al. |
| 2013/0022252 A1 | 1/2013 | Chen et al. |
| 2013/0022255 A1 | 1/2013 | Chen et al. |
| 2013/0244208 A1 | 9/2013 | Rubbert |
| 2014/0003695 A1 | 1/2014 | Dean et al. |
| 2015/0056576 A1 | 2/2015 | Nikolskiy et al. |
| 2016/0199215 A1 | 7/2016 | Kopelman |
| 2017/0008168 A1 | 1/2017 | Weng et al. |
| 2017/0045950 A1 | 2/2017 | Doker et al. |
| 2017/0100213 A1 | 4/2017 | Kuo |
| 2017/0281110 A1 | 10/2017 | Mandelkern et al. |
| 2017/0340418 A1 | 11/2017 | Raanan |
| 2018/0008213 A1 | 1/2018 | Rubbert |
| 2018/0028294 A1 | 2/2018 | Azernikov et al. |
| 2018/0121601 A1 | 5/2018 | Hahm et al. |
| 2018/0132982 A1 | 5/2018 | Nikolskiy et al. |
| 2018/0144466 A1 | 5/2018 | Hsieh et al. |
| 2018/0303581 A1 | 10/2018 | Martz et al. |
| 2018/0360567 A1 | 12/2018 | Xue et al. |
| 2018/0365089 A1 | 12/2018 | Okanohara et al. |
| 2019/0083209 A1 | 3/2019 | Lior et al. |
| 2019/0105128 A1 * | 4/2019 | Velazquez ............. G06T 17/205 |
| 2019/0150724 A1 | 5/2019 | Elazar et al. |
| 2019/0197358 A1 | 6/2019 | Madani et al. |
| 2019/0282344 A1 | 9/2019 | Azernikov et al. |
| 2019/0318479 A1 | 10/2019 | Ajri et al. |
| 2020/0000562 A1 | 1/2020 | Wey |
| 2020/0013145 A1 | 1/2020 | Ratner et al. |
| 2020/0022783 A1 | 1/2020 | Cramer et al. |
| 2020/0022790 A1 | 1/2020 | Fisker |
| 2020/0027252 A1 | 1/2020 | Ye et al. |
| 2020/0066391 A1 | 2/2020 | Sachdeva et al. |
| 2020/0125069 A1 * | 4/2020 | Sirovskiy ........... G05B 19/4099 |
| 2020/0175681 A1 | 6/2020 | Ezhov et al. |
| 2020/0268495 A1 | 8/2020 | Ryakhovsky et al. |
| 2020/0273248 A1 | 8/2020 | Jorgensen et al. |
| 2020/0293878 A1 | 9/2020 | Bhaskar et al. |
| 2020/0297458 A1 | 9/2020 | Roschin et al. |
| 2020/0311934 A1 | 10/2020 | Cherkas et al. |
| 2020/0383752 A1 | 12/2020 | Willers et al. |
| 2020/0402272 A1 | 12/2020 | Xu et al. |
| 2020/0405455 A1 | 12/2020 | Nikolskiy et al. |
| 2020/0405456 A1 | 12/2020 | Nikolskiy et al. |
| 2020/0405464 A1 | 12/2020 | Nikolskiy et al. |
| 2020/0411201 A1 | 12/2020 | Kearney et al. |
| 2021/0005017 A1 | 1/2021 | Hollenbeck |
| 2021/0012884 A1 | 1/2021 | Kim et al. |
| 2021/0034813 A1 | 2/2021 | Wu et al. |
| 2021/0059796 A1 | 3/2021 | Weiss et al. |
| 2021/0073998 A1 | 3/2021 | Brown et al. |
| 2021/0085238 A1 | 3/2021 | Schnabel et al. |
| 2021/0090272 A1 | 3/2021 | Meyer et al. |
| 2021/0093421 A1 | 4/2021 | Michaeli et al. |
| 2021/0100642 A1 | 4/2021 | Weiss et al. |
| 2021/0100643 A1 | 4/2021 | Weiss et al. |
| 2021/0106409 A1 | 4/2021 | Ojelund et al. |
| 2021/0110605 A1 | 4/2021 | Haslam et al. |
| 2021/0153986 A1 | 5/2021 | Wirjadi et al. |
| 2021/0158607 A1 | 5/2021 | Katzman et al. |
| 2021/0174604 A1 | 6/2021 | Long et al. |
| 2021/0196434 A1 | 7/2021 | Cramer et al. |
| 2021/0216822 A1 | 7/2021 | Paik et al. |
| 2021/0236249 A1 | 8/2021 | Nikolskiy et al. |
| 2021/0251729 A1 | 8/2021 | Schneider et al. |
| 2021/0255600 A1 | 8/2021 | Faust |
| 2021/0264611 A1 | 8/2021 | Xue et al. |
| 2021/0315667 A1 | 10/2021 | Raslambekov |
| 2021/0321872 A1 | 10/2021 | Saphier et al. |
| 2021/0338400 A1 | 11/2021 | Murata et al. |
| 2021/0353154 A1 | 11/2021 | Saphier et al. |
| 2021/0393375 A1 | 12/2021 | Chekh et al. |
| 2022/0000583 A1 | 1/2022 | Parpara et al. |
| 2022/0008175 A1 | 1/2022 | Ojelund et al. |
| 2022/0028162 A1 | 1/2022 | Katzman et al. |
| 2022/0130045 A1 | 4/2022 | Kopelman et al. |
| 2022/0137592 A1 | 5/2022 | Cramer et al. |
| 2022/0148173 A1 | 5/2022 | Minchenkov et al. |
| 2022/0165388 A1 | 5/2022 | Chernov et al. |
| 2022/0189130 A1 | 6/2022 | Long et al. |
| 2022/0215531 A1 | 7/2022 | Azernikov et al. |
| 2022/0215928 A1 | 7/2022 | Tabak et al. |
| 2022/0257342 A1 | 8/2022 | Kuo |
| 2022/0262007 A1 | 8/2022 | Cramer et al. |

(56) References Cited

U.S. PATENT DOCUMENTS

| | | |
|---|---|---|
| 2022/0296344 A1 | 9/2022 | Lee et al. |
| 2022/0304782 A1 | 9/2022 | Derzapf et al. |
| 2022/0318989 A1 | 10/2022 | Chelnokov et al. |
| 2022/0327774 A1 | 10/2022 | Katzman et al. |
| 2022/0350936 A1 | 11/2022 | Azernikov et al. |
| 2022/0369916 A1 | 11/2022 | Carrier, Jr. et al. |
| 2022/0378548 A1 | 12/2022 | Salah et al. |
| 2023/0048895 A1 | 2/2023 | Wucher et al. |
| 2023/0057664 A1 | 2/2023 | Steger |
| 2023/0066220 A1 | 3/2023 | Coulombe et al. |
| 2023/0075514 A1 | 3/2023 | Wiedemann et al. |
| 2023/0153476 A1 | 5/2023 | Fabbri et al. |
| 2023/0218370 A1 | 7/2023 | Azernikov et al. |
| 2023/0410495 A1 | 12/2023 | Xue et al. |
| 2024/0028782 A1 | 1/2024 | Selberis et al. |
| 2024/0029380 A1 | 1/2024 | Azernikov et al. |

FOREIGN PATENT DOCUMENTS

| | | |
|---|---|---|
| EP | 1368986 B1 | 12/2011 |
| EP | 3671531 A1 | 12/2018 |
| EP | 3767521 A1 | 7/2019 |
| EP | 3797732 A1 | 9/2019 |
| KR | 101718868 B1 | 3/2017 |
| KR | 102334519 B1 | 12/2021 |
| WO | 2012061652 A2 | 5/2012 |
| WO | 2016044465 A1 | 3/2016 |
| WO | 2018069736 A1 | 4/2018 |
| WO | 2018118200 A1 | 6/2018 |
| WO | 2018158411 A1 | 9/2018 |
| WO | 2018195554 A1 | 10/2018 |
| WO | 2019217764 A1 | 4/2019 |
| WO | 2019100022 A1 | 5/2019 |
| WO | 2019204520 A1 | 10/2019 |
| WO | 2019209820 A1 | 10/2019 |
| WO | 2020048960 A1 | 3/2020 |
| WO | 2020173912 A1 | 3/2020 |
| WO | 2020089406 A1 | 5/2020 |
| WO | 2020161245 A1 | 8/2020 |
| WO | 2020182920 A1 | 9/2020 |
| WO | 2021046147 A1 | 3/2021 |
| WO | 2021046434 A1 | 3/2021 |
| WO | 2021058643 A1 | 4/2021 |
| WO | 2021110938 A1 | 6/2021 |
| WO | 2021113501 A1 | 6/2021 |
| WO | 2021155230 A1 | 8/2021 |
| WO | 2021210723 A1 | 10/2021 |
| WO | 2021210966 A1 | 10/2021 |
| WO | 2021214212 A1 | 10/2021 |
| WO | 2022131418 A1 | 6/2022 |
| WO | 2022131419 A1 | 6/2022 |

OTHER PUBLICATIONS

H. Wang et al., Multiclass CBCT Image Segmentation for Orthodontics with Deep Learning, Journal of Dental Research, 2021, vol. 100(9), 943-949, International & American Associates for dental Research 2021.

Yin et al., Algorithm of drawing isoline based on improved Delaunay triangle net, Hubei Province Key Laboratory of Intelligent Information Processing and Real-time Industrial System, Wuhan University of Science and technology, 978-1-5090-6161-7/17/#31.00, 2017, IEEE, pp. 1022-1026.

Cowley et al., The Effect of Gingival-Margin Design on the Retention of Thermoformed Aligners, Nov. 2012 JCO, Inc. vol. XLVI, No. 11, pp. 697-702.

Hanchao Li et al., Pyramid Attention Network for Semantic Segmentation, Nov. 25, 2018, in 13 pages.

Jeremy Zhang, UNet—Line by Line Explanation, Published in Towards Data Science Oct. 17, 2019, in 20 pages.

Joseph Redmon et al., You Only Look Once: Unified, Real-Time Object Detection, University of Washington, Allen Institute for AI, May 9, 2016, in 10 pages, http://pjreddie.com/yolo/.

Joseph Redmon et al., YOLO9000: Better, Faster, Stronger, University of Washington, Dec. 25, 2016, in 9 pages, http://pjreddie.com/yolo9000/.

Joseph Redmon et al., YOLOv3: An Incremental Improvement, University of Washington, Apr. 8, 2018, in 6 pages.

Olaf Ronneberger et al., U-Net: Convolutional Networks for Biomedical Image Segmentation, Computer Science Department and BIOSS Centre for Biological Signalling Studies, University of Freiburg, Germany. May 18, 2015.

Pablo Ruiz, ResNets, Harvard University, Aug. 2018, in 8 pages.

Yu-Bing Chang et al., An Automatic and Robust Algorithm of Reestablishment of Digital dental Occlusion, HHS Public Access, IEEE Trans Med Imaging. Sep. 2010; 29(9) 1652-1663,doi: 10.1109/TMI.2049526, in 36 pages.

YOLO Real Time Objection Detection, downloaded from https://pjreddie.com/darknet/yolo/ on Jun. 10, 2020, in 10 pages.

Shunping Ji, 3D Convolutional Neural Networks for Crop Classification with Multi-Temporal Remote Sensing Images, Remote Sensing, 2018, 10, 75; doi: 10.3390/rs10010075, www.MDPI.com/journal/remotesensing, pp. 1-17.

Imagoworks web page, https://imagoworks.ai/#technology, copyright 2021 downloaded on Feb. 18, 2022, pp. 1-8.

Tsung-Yi Lin et al., Feature Pyramid Networks for Object Detection, arXiv: 1612.03144v2 [cs.CV] Apr. 19, 2017, in 10 pages Youngjun Kevin Kim, Imagoworks B2B Collaboration Proposal, Sep. 2021, in 32 pages.

Chen et al., A Convolutional Neural Networks for Teeth Margin Detection on 3-Dimensional Dental Meshes, Mesh CNN for Teeth Margin Detection, Jul. 7, 2021, in 11 pages.

Detect Edit Margins-Exocad Wiki, Release from 2022, downloaded Sep. 1, 2023.

Tsung-Yi Lin et al., Focal Loss for Dense Object Detection, arXiv: 1708.02002v2 [cs.CV] Feb. 7, 2018, in 10 pages.

Andrew Nealen et al., Laplacian Mesh Optimization, 2006, in 9 pages.

Hang-Nga Mai et al., Reliability of automatic finish line detection for tooth preparation in dental computer-aided software, J.Prosthodont Res. 2023:67(1): 138-143.

Raydent CAD, AI Based Dental CAD Solution brochure, in 7 pages, downdloaded Feb. 18, 2022.

Stefan Raith et al., Artificial Neural Networks as a Powerful Numerical Tool to Classify Specific Features of a Tooth Based on 3D Scan Data, Elsevier, Computers in Biology and Medicine 80 (2017) 65-76, in 12 pages.

Mario Botsch, Leif Kobbelt, Mark Pauly, Pierre Alliez, and Bruno Levy, Polygon Mesh Processing, 1st Edition, Copyright 2010, Published Oct. 7, 2010 by A.K. Peters/CRC Press, Ecole Polytechnique Federale de Lausanne, Smoothing Section, in 43 pages.

Ross Girshick, Fast R-CNN, Computer Vision Foundation, accessed Apr. 18, 2015, in pp. 1440-1448.

Jifeng Dai et al., R-FCN: Object Detection via Region-based Fully Convolutional Networks, 30th Conference on Neural Information Processing Systems (NIPS 2016), Barcelona Spain, in 9 pages.

Toshiaki Kondo et al., Tooth Segmentation of Dental Study Models Using Range Images, Research Gate, IEEE Transactions on Medical Imaging, Apr. 2004, vol. 23, No. 3, Mar. 2004, in 14 pages.

Shuai Yang et al., 3D Intelligent Scissors for Dental Mesh Segmentation, Hindawi, Computational and Mathematical Methods in Medicine, vol. 2020, Article ID 1394231, 12 pages.

Shuai Yang et al., Interactive Tooth Segmentation Method of Dental Model based on Geodesic, Research Gate, Conference paper Jan. 2017, Advances in Engineering Research, vol. 138, in 6 pages.

Thibault Groueix et al., A Papier-Mâché Approach to Learning 3D Surface Generation, Computer Vision Foundation, 2018, pp. 216-224.

Xiaotao Hu et al., Enhancing Dental CBCT Image by Semi-coupled Generative Adversarial Networks, Journal of Dental Research, 2016, in 8 pages.

Charles R. Qi et al., PointNet: Deep Hierarchical Feature Learning on Point Sets in a Metric Space, Stanford University, Jun. 7, 2017, in 14 pages.

(56) References Cited

OTHER PUBLICATIONS

Charles R. Qi et al., PointNet: Deep Learning on Pont Sets for 3D Classification and Segmentation, Computer Vision Foundation, 2017, pp. 652-660.

* cited by examiner

902

AUTOMATIC DETERMINATION OF TRIM-LINE FOR ALIGNERS

BACKGROUND

Aligners are typically orthodontic devices fabricated by dental laboratories, often out of a material such as plastic, and can be used to align teeth through one or more stages. Conventionally, Aligner manufacturing includes printing a model of jaw, thermoforming a plastic film on top of it and then cutting that plastic along a trim line. 3D digital dental models of a patient's dentition typically contain a virtual tooth region, which can include one or more virtual teeth, and a virtual non-tooth region, such as a virtual gum region. Conventionally, separating the virtual tooth region from the virtual non-tooth region requires a technician to manually draw the trim-line between the virtual tooth region and the virtual non-tooth region on the computer by hand, which can be time-consuming and raise accuracy and consistency issues. Additionally, some 3D digital dental models can arrive unsegmented, which can also be challenging for processing 3D digital dental models.

SUMMARY

A computer-implemented method of automatically determining a trim-line can include receiving a 3D digital dental model, the 3D digital dental model having one or more virtual teeth and a virtual non-tooth region; combining the one or more virtual teeth into one or more virtual tooth regions; determining a distance field from a virtual tooth region to one or more vertices in a virtual non-tooth region of the 3D digital dental model; determining a first iso-line of the distance field for a first iso-value; determining a back distance field from the one or more first iso-lines to one or more vertex points having a distance value less than the first iso-value; determining a second iso-line for the back distance field for a second iso-value to generate a trim-line.

A non-transitory computer readable medium storing executable computer program instructions to determine a trim line for an aligner, the computer program instructions including instructions for: receiving a 3D digital dental model, the 3D digital dental model having one or more virtual teeth and a virtual non-tooth region; combining the one or more virtual teeth into one or more virtual tooth regions; determining a distance field from a virtual tooth region to one or more vertices in a virtual non-tooth region of the 3D digital dental model; determining a first iso-line of the distance field for a first iso-value; determining a back distance field from the one or more first iso-lines to one or more vertex points having a distance value less than the first iso-value; determining a second iso-line for the back distance field for a second iso-value to generate a trim-line.

A system to determine a trim line for an aligner can include: a processor; and a non-transitory computer-readable storage medium having instructions executable by the processor to perform steps including: receiving a 3D digital dental model, the 3D digital dental model having one or more virtual teeth and a virtual non-tooth region; combining the one or more virtual teeth into one or more virtual tooth regions; determining a distance field from a virtual tooth region to one or more vertices in a virtual non-tooth region of the 3D digital dental model; determining a first iso-line of the distance field for a first iso-value; determining a back distance field from the one or more first iso-lines to one or more vertex points having a distance value less than the first iso-value; determining a second iso-line for the back distance field for a second iso-value to generate a trim-line.

A computer-implemented method of segmenting the 3D digital dental model can include: receiving a 3D digital dental model; determining an initial virtual tooth location of one or more virtual teeth in the 3D digital dental model; constructing a virtual crown line from one or more initial virtual tooth location(s); determining a long axis of one or more virtual teeth based on the virtual crown line; constructing a virtual root line; determining a virtual tooth virtual bounding box for one or more virtual teeth in a panoramic image; performing an initial segmentation to generate a first segmented 3D digital dental model; performing final segmentation of the first segmented 3D digital dental model to generate a final segmented 3D digital dental model including one or more virtual teeth.

DETAILED DESCRIPTION

Figure 1:
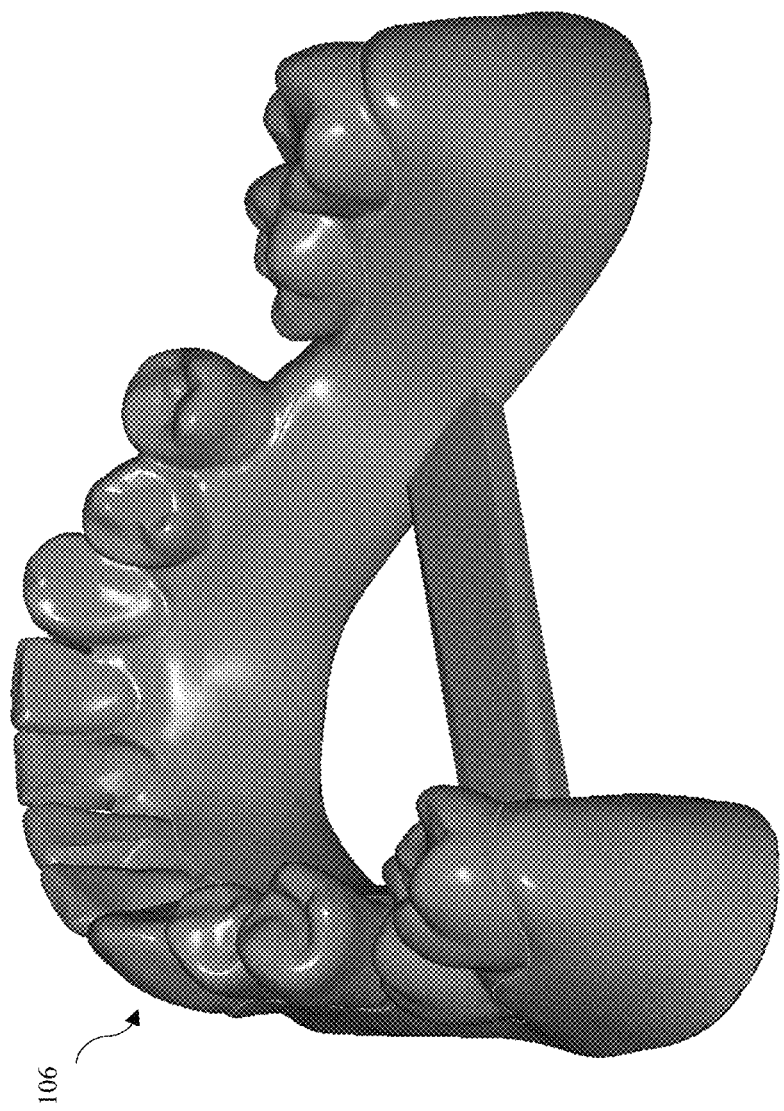
FIG. 1 illustrates one example of the 3D digital dental model that includes a first virtual jaw model in some embodiments.

For purposes of this description, certain aspects, advantages, and novel features of the embodiments of this disclosure are described herein. The disclosed methods, apparatus, and systems should not be construed as being limiting in any way. Instead, the present disclosure is directed toward all novel and nonobvious features and aspects of the various disclosed embodiments, alone and in various combinations and sub-combinations with one another. The methods, apparatus, and systems are not limited to any specific aspect or feature or combination thereof, nor do the disclosed embodiments require that any one or more specific advantages be present or problems be solved.

Although the operations of some of the disclosed embodiments are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "provide" or "achieve" to describe the disclosed methods. The actual operations that correspond to these terms may vary depending on the particular implementation and are readily discernible by one of ordinary skill in the art.

As used in this application and in the claims, the singular forms "a," "an," and "the" include the plural forms unless the context clearly dictates otherwise. Additionally, the term "includes" means "comprises." Further, the terms "coupled" and "associated" generally mean electrically, electromagnetically, and/or physically (e.g., mechanically or chemically) coupled or linked and does not exclude the presence of intermediate elements between the coupled or associated items absent specific contrary language.

In some examples, values, procedures, or apparatus may be referred to as "lowest," "best," "minimum," or the like. It will be appreciated that such descriptions are intended to indicate that a selection among many alternatives can be made, and such selections need not be better, smaller, or otherwise preferable to other selections.

Some embodiments of the present disclosure can include computer-implemented method of automatically determining a virtual trim-line. The computer-implemented method can be performed automatically in some embodiments, without user input. In some embodiments, the aligner can be a transparent aligner.

In some embodiments, the computer-implemented method of automatically determining the trim-line can include receiving a 3D digital dental model, the 3D digital dental model having one or more virtual teeth. In some embodiments, the 3D digital dental model can be of the patient's dentition, and/or the patient's dentition at various stages of an orthodontic treatment plan, such as one utilizing aligners, for example.

In some embodiments, the 3D digital dental model can be initially generated by any technique known in the art, such as CT scanning or optical scanning, including but not limited to CT scanning or intra oral scanning of a patient's dentition or a physical impression taken of the patient's dentition. One example of CT scanning is described in U.S. Patent Application No. US20180132982A1 to Nikolskiy et al., which is hereby incorporated in its entirety by reference. However, embodiments are not limited to any particular type of 3D digital dental model generation, and any type of scanning known in the art can be used to generate the 3D digital dental model.

FIG. 1 illustrates one example of a 3D digital dental model that includes a first virtual jaw model 106 in some embodiments. The 3D digital dental model can have been modified using CAD/CAM modelling software such as FastDesign™ dental design software provided by Glidewell Laboratories of Newport Beach, Calif. or other modelling software known in the art, for example, in some embodiments. In some embodiments, the 3D digital dental model can be generated from a raw scan of the physical impression without further modifications from modelling software. Optionally, a second virtual jaw model of the opposing jaw can also be generated. Each virtual jaw model can be generated by scanning a physical impression using any scanning technique known in the art including, but not limited to, for example, optical scanning, CT scanning, etc. or by intraoral scanning of the patient's mouth (dentition). A conventional scanner typically captures the shape of the physical impression/patient's dentition in 3 dimensions during a scan and digitizes the shape into a 3 dimensional virtual model. The first virtual jaw model 106 can include multiple interconnected polygons in a topology that corresponds to the shape of the physical impression/patient's dentition, for example, for a responding jaw. In some embodiments, the polygons can include two or more digital surface triangles. In some embodiments, the scanning process can produce STL, PLY, or CTM files, for example that can be suitable for use with a dental design software, such as FastDesign™ dental design software provided by Glidewell Laboratories of Newport Beach, Calif.

The first virtual jaw model 106 can also be generated by intraoral scanning of the patient's dentition, for example. In some embodiments, each electronic image is obtained by a direct intraoral scan of the patient's teeth. This will typically take place, for example, in a dental office or clinic and be performed by a dentist or dental technician. In other embodiments, each electronic image is obtained indirectly by scanning an impression of the patient's teeth, by scanning a physical model of the patient's teeth, or by other methods known to those skilled in the art. This will typically take place, for example, in a dental laboratory and be performed by a laboratory technician. Accordingly, the methods described herein are suitable and applicable for use in chair side, dental laboratory, or other environments.

Prior to being received and processed by one or more features in the present disclosure, the 3D digital dental model can have been modified by a dentist or technician or other person or process using CAD/CAM software known in the art such as, for example, digital treatment planning software. The digital treatment planning software can develop one or more stages of treatment with aligners to realign teeth to a desired position and/or orientation at each stage. The 3D digital dental model—whether taken from a patient's dentition or from a particular stage of a digital treatment plan—can include a virtual tooth region and a virtual non-tooth region. In some embodiments, the computer-implemented method can determine a virtual trim-line between the virtual tooth region and the virtual non-tooth region. This can allow fabrication of a physical aligner having only the tooth region, for example.

Figure 2:
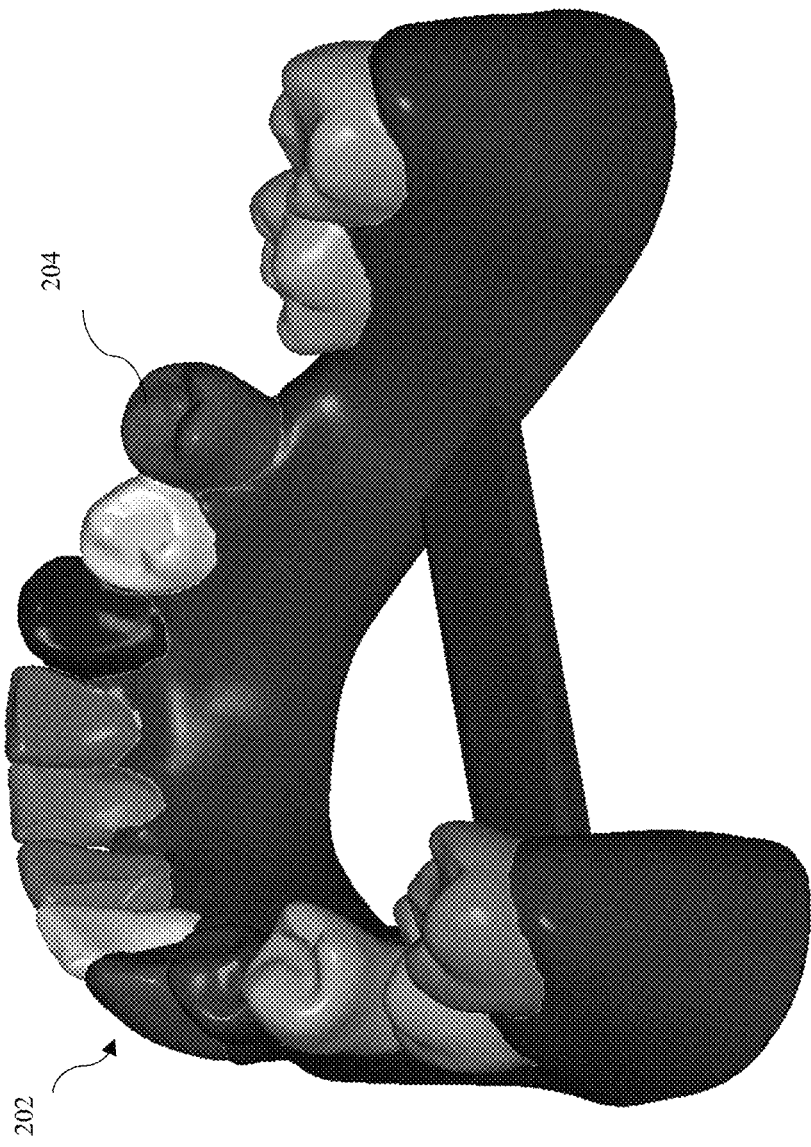
FIG. 2 illustrates an example of a 3D digital dental model having one or more segmented virtual teeth in some embodiments.

In some embodiments, 3D digital dental model received can be already segmented into one or more virtual teeth. For example, FIG. 2 illustrates an example of a 3D digital dental model 202 having one or more segmented virtual teeth, such as a first virtual tooth 204. The segmenting can have been performed by any technique known in the art, or as disclosed herein.

In some embodiments, the computer-implemented method of automatically determining the trim-line can include combining the one or more virtual teeth into one or more virtual tooth regions. In some embodiments, the one or more virtual tooth regions each include one or more adjacent virtual teeth. In some embodiments, the one or more adjacent virtual teeth contact one another. In some embodiments, the one or more virtual tooth regions can be separated by one or more edentulous spaces. In some embodiments, the one or more edentulous spaces can be a virtual non-tooth region. In some embodiments, the one or more edentulous spaces can be determined by any gap between teeth. In some embodiments, the gap can be due to one or more missing teeth. In some embodiments, the one or more edentulous spaces each include a missing tooth.

Figure 3:
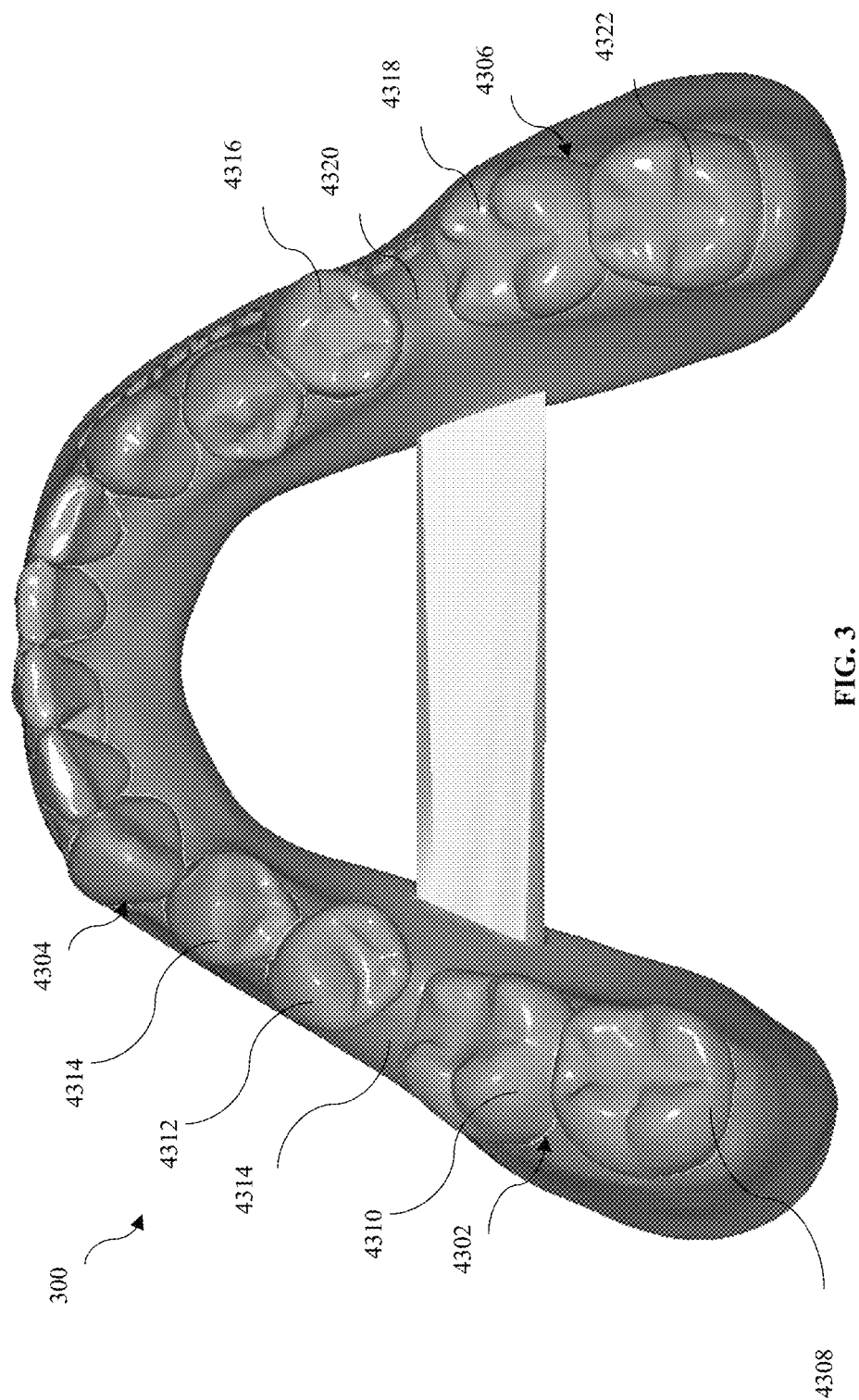
FIG. 3 illustrates an example of combining the one or more virtual teeth into one or more virtual tooth regions in some embodiments.

FIG. 3 illustrates an example of combining the one or more virtual teeth into one or more virtual tooth regions. The computer-implemented method can determine adjacent virtual teeth such as a first virtual tooth 4308 and a second virtual tooth 4310 adjacent to the first virtual tooth 4308. The computer-implemented method can determine the first virtual tooth 4308 and the second virtual tooth 4310 are adjacent through a contact between them, for example. The computer-implemented method can group the first virtual tooth 4308 and the second virtual tooth 4310 together as a first virtual tooth region 4302. The computer-implemented method can determine that a third virtual tooth 4312 is not adjacent to the second virtual tooth 4310 due to a first gap 4314, for example. The computer-implemented method can therefore exclude 4312 from the first virtual tooth region 4302. The computer-implemented method can determine that the third virtual tooth 4312 is adjacent to fourth virtual tooth 4314, for example, and determine additional adjacent virtual teeth between the fourth virtual tooth 4314 and a fifth virtual tooth 4316 to provide a second virtual tooth region 4304. The computer-implemented can determine a sixth virtual tooth 4318 is not adjacent to the fifth virtual tooth 4316 due to a second gap 4320 and therefore not include the sixth virtual tooth 4318 in the second virtual tooth region 4304, for example. The computer-implemented method can determine that the sixth virtual tooth 4318 is adjacent to a seventh virtual tooth 4322, and group the sixth virtual tooth 4318 and the seventh virtual tooth 4322 into a third virtual tooth region 4306.

In some embodiments, the computer-implemented method of automatically determining the trim-line can optionally include combining the one or more virtual tooth regions together to provide a final virtual tooth region. In some embodiments, combining the one or more virtual tooth regions can be performed if a single cutting trim line is desired, for example. If multiple cut lines can be allowed, then no combining needs to be performed. In some embodiments, combining the one or more virtual tooth regions together can include eliminating edentulous spaces.

Figure 4:
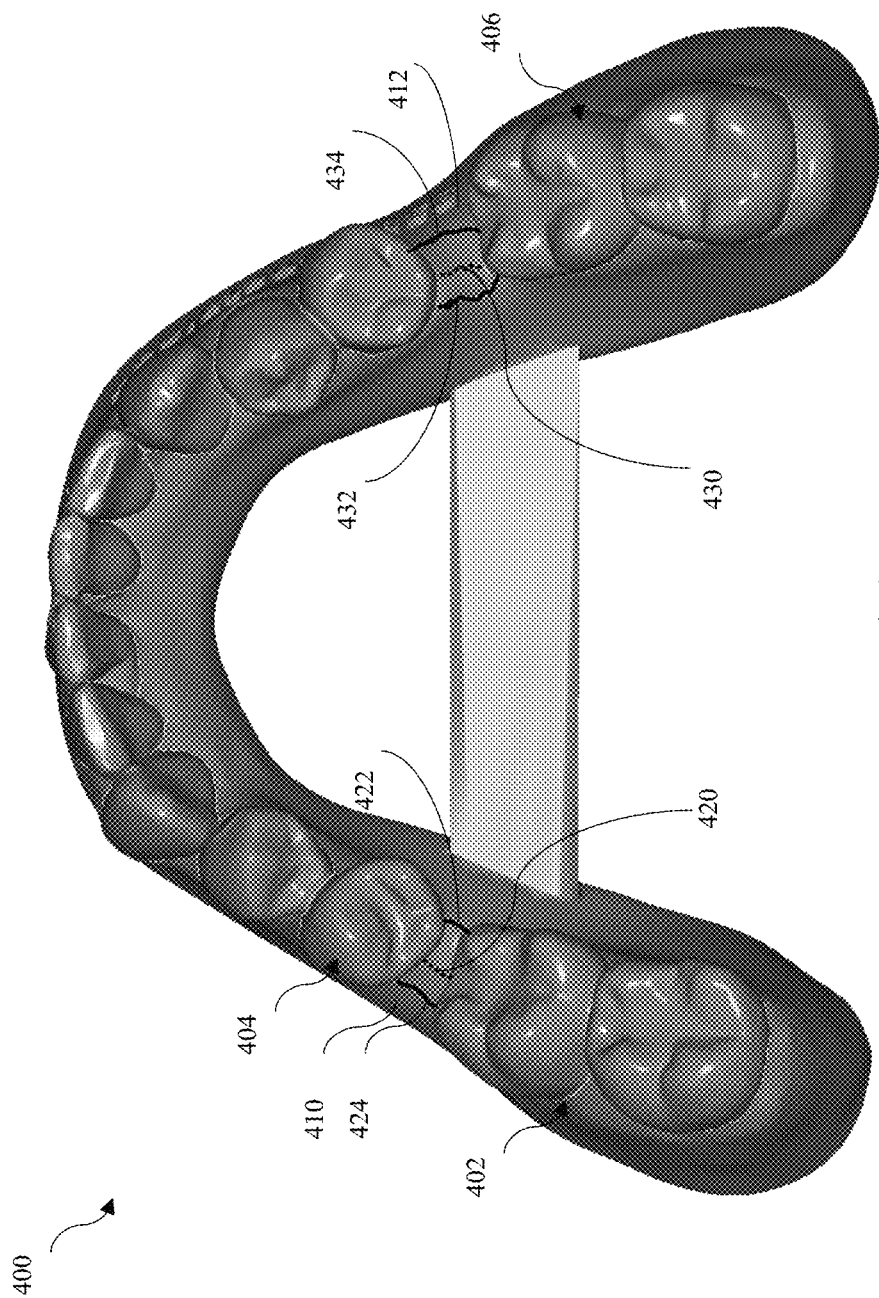
FIG. 4 illustrates an example of a 3D digital dental model that includes a one or more virtual tooth regions in some embodiments.

FIG. 4 illustrates an example of a 3D digital dental model 400 that includes a first virtual tooth region 402, a second virtual tooth region 404, and a third virtual region 406. The first virtual tooth region 402 and the second virtual tooth region 404 can be separated by a first gap 410 that can be an edentulous space, for example. Similarly, the second virtual tooth region 404 and the third virtual tooth region 406 can be separated by a second gap 412 that can be an edentulous space, for example. In some embodiments, the computer-implemented method can combine the first virtual tooth region 402, the second virtual tooth region 404, and the third virtual tooth region 406 into a final virtual tooth region.

In some embodiments, combining the one or more virtual tooth regions together can include repeatedly performing the following steps until a single virtual tooth region remains:

Combining Step 1: determining a closest virtual tooth region to a first virtual tooth region. In some embodiments, the closest tooth region can be determined to have a shortest path from a first tooth region to the closest tooth region.

Combining Step 2: adding the closest virtual tooth region to the first virtual tooth region.

Some embodiments can include adding to the single virtual tooth region an edentulous space region filler region to form the final virtual tooth region. In some embodiments, the edentulous space region filler region can be positioned at each shortest path. In some embodiments, the edentulous space region filler region can include a filler region width. In some embodiments, the filler region width can be the approximate width of an average virtual tooth. In some embodiments, the filler region width can be any suitable width based on one or more adjacent virtual teeth. In some embodiments, the filler region width can be 4 mm.

For example, in FIG. 4, the computer-implemented method can combine the first virtual tooth region 402 and the second virtual tooth region 404 by determining a first shortest path 420 between the first virtual tooth region 402 and the second virtual tooth region 404 and adding a first filler region bounded by a first filler region boundary 422 and a second filler region boundary 424 to generate a first combined virtual tooth region. The computer-implemented method can combine the first combined virtual tooth region and the third virtual tooth region 406 by determining a second shortest path 430 between the first combined virtual tooth region and the third virtual tooth region 406 and adding a second filler region bounded by a third filler region boundary 432 and a fourth filler region boundary 434.

In some embodiments, the computer-implemented method of automatically determining the trim-line can include determining a distance field from a virtual tooth region to one or more vertices in a virtual non-tooth region of the 3D digital dental model. The distance field can include one or more distance values, each distance value is a distance along a digital surface of the 3D digital dental model from the virtual tooth region to a vertex in the virtual non-tooth region. In some embodiments, a boundary between the virtual tooth region and the virtual non-tooth region can include one or more digital surface triangles with two vertices belonging to the virtual tooth region and one belonging to the virtual non-tooth region. The distance values can range from a user-configurable minimum distance to a user-configurable maximum distance. In some embodiments, the user-configurable minimum distance can be any value. In some embodiments, the user-configurable minimum distance value can be 0. In some embodiments, the user-configurable maximum distance value can be any value. In some embodiments, the user-configurable maximum distance value can be 1 meter.

In some embodiments, determining the distance field can include performing following:

Distance Field Determination Step 1: Setting an initial distance value for virtual tooth region vertices to the user-configurable minimum value and marking the virtual tooth region vertices as processed.

Distance Field Determination Step 2: Setting an initial distance value for the virtual non-tooth region vertices to the maximum distance value and marking the one or more virtual non-tooth region vertices as unprocessed.

Distance Field Determination Step 3: Setting an unprocessed vertex distance value for one or more unprocessed vertices of each digital surface triangle can include two processed vertices and one unprocessed vertex. In some embodiments, setting the unprocessed vertex distance value can include determining a calculated distance value for the one unprocessed vertex as follows: in each virtual digital surface triangle with two processed vertices with distance values $d_1$ and $d_2$ in points $p_1$ and $p_2$, setting the distance value $d_3$ to the third unprocessed vertex in point $p_3$ as the minimum of its current distance value and all possible α-variants, where α∈[0,1]: calculated distance value $$d_3 = \min_{\alpha}(d_1(1-\alpha) + d_2\alpha + |p_1(1-\alpha) + p_2\alpha - p_3|).$$

In some embodiments, p1, p2, and p3 can be 3D coordinates of a digital surface triangle vertices 1, 2, and 3, respectively, and d1, d2, and d3 comprise scalar distances along a digital surface of the 3D digital dental model to vertices 1, 2, and 3, respectively from the virtual tooth region. In some embodiments, Step 3 can be performed for vertices marked as processed recently.

Figure 5:
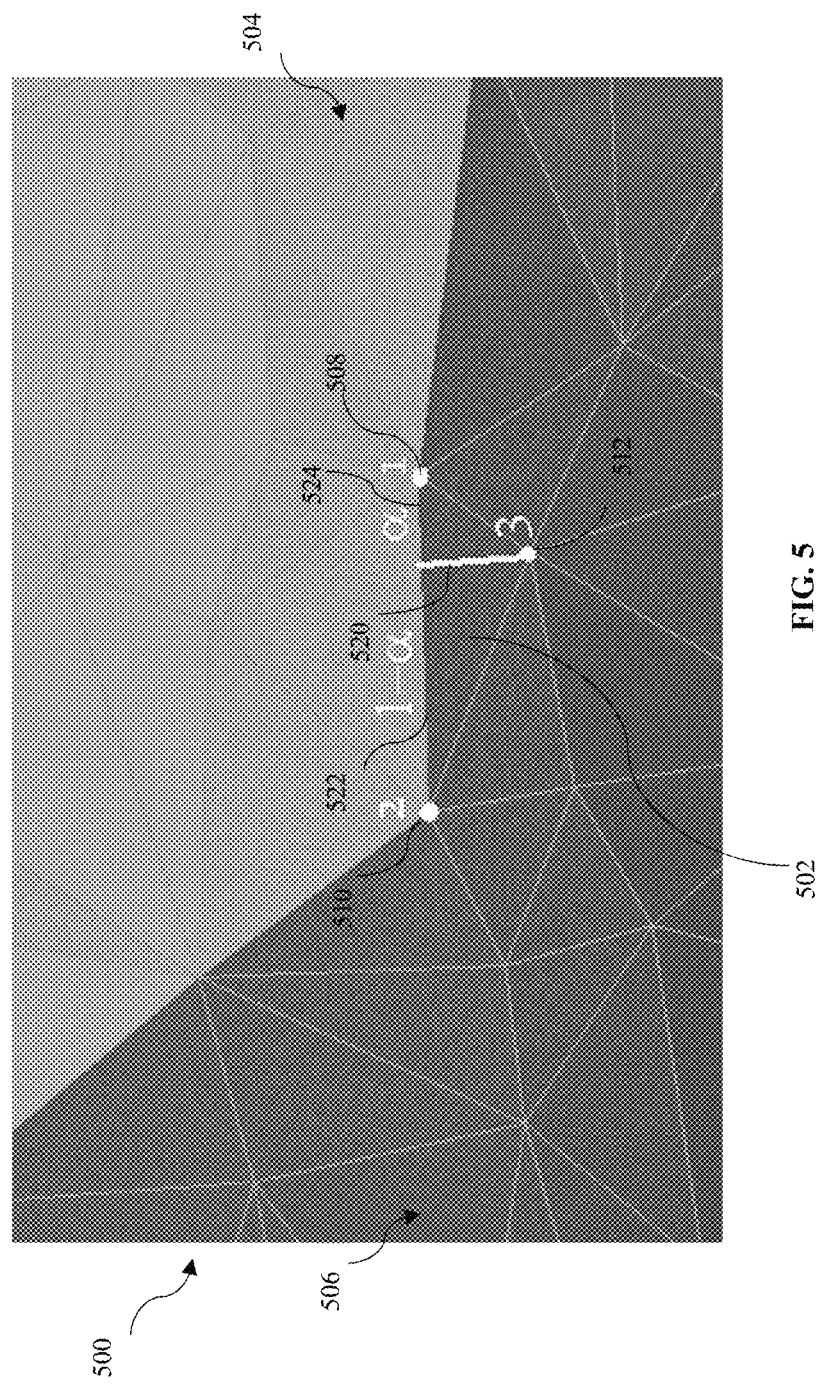
FIG. 5 illustrates a portion of the 3D digital dental model that can include a first bordering digital surface triangle in some embodiments.

FIG. 5 illustrates a portion of the 3D digital dental model that can include a first bordering digital surface triangle 502 that is adjacent to a virtual tooth region 504 and a virtual non-tooth region 506. The first bordering digital surface triangle 502 can include a first bordering vertex 508 (labeled as "1" in the figure for clarity, and corresponding to p1) and a second bordering vertex 510 (labeled as "2" in the figure for clarity and corresponding to p2), and a first non-bordering vertex 512 (labeled as "3" in the figure for clarity and corresponding to p3). From Distance Field Determination Step 1 and Step 2, the first bordering vertex 508 and the second bordering vertex 510 are set as processed, and the first non-bordering vertex 512 can be set to unprocessed since it resides in the non-virtual tooth region 506. A distance $d_3$ 520 can be determined from Distance Field Determination Step 3 based on a first value 522 corresponding to 1−α and a second value 524 corresponding to a as provided in the step.

Distance Field Determination Step 4: Selecting from all unprocessed vertices an unprocessed vertex with a minimum distance value and marking the selected vertex as processed. In some embodiments, all unprocessed vertices can be added to a priority queue based on their distance.

Figure 6:
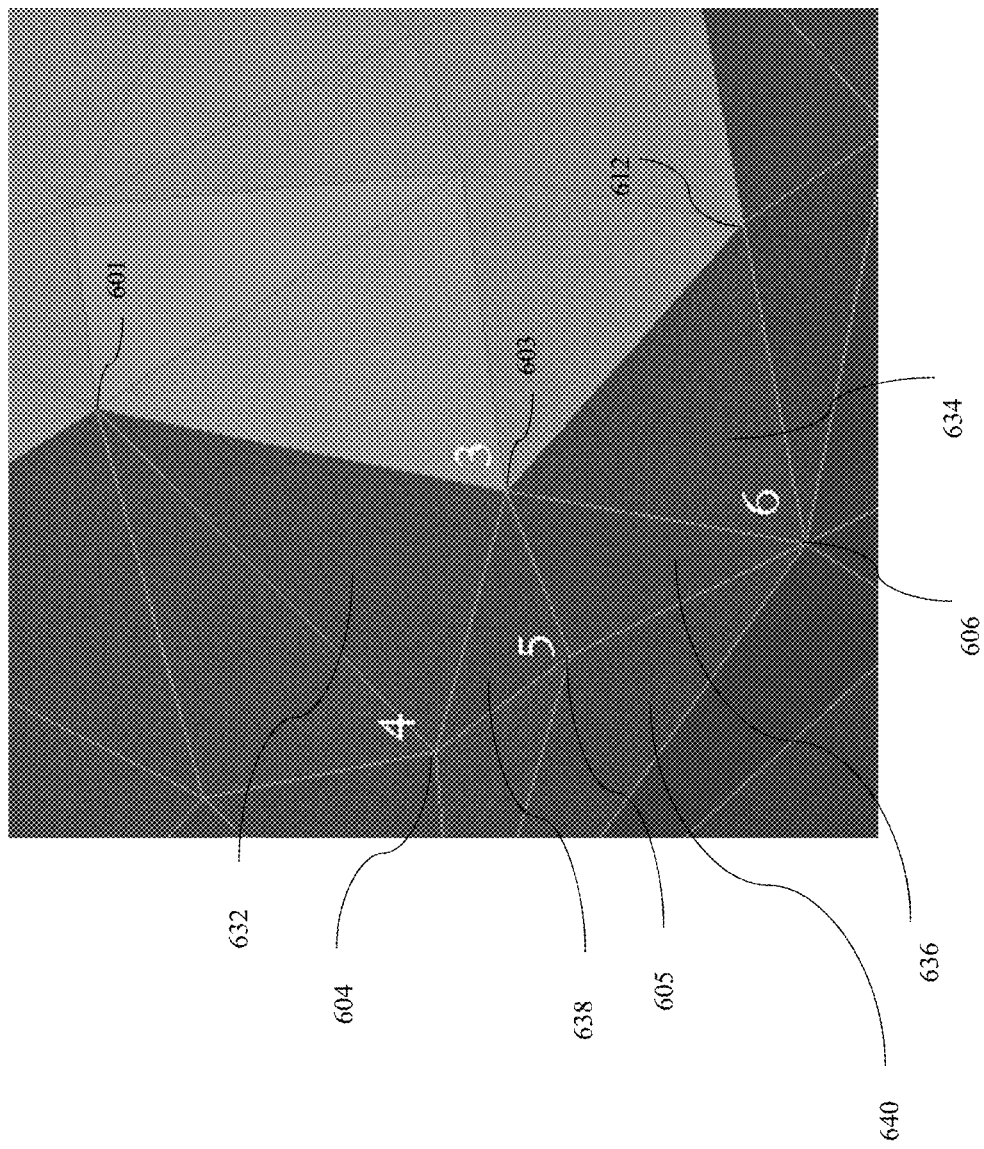
FIG. 6 illustrates one example of updating the distance value of one or more unprocessed vertices neighboring the selected vertex in some embodiments.

Distance Field Determination Step 5: Updating a distance value of one or more unprocessed vertices neighboring the selected vertex from Distance Field Determination Step 4 using the formula from Distance Field Determination Step 3. In some embodiments, the same vertex can be updated by Distance Field Determination Steps 3 and Distance Field Determination 5 multiple times if it belongs to multiple digital surface triangles having two other processed vertices. FIG. 6 illustrates one example of updating the distance value of one or more unprocessed vertices neighboring the selected vertex. In FIG. 6, shows a portion of a 3D digital surface region 600 includes a processed vertex 602 (labeled as "3" in the figure). In this example, the processed vertex 602 has just been processed, and has neighboring unprocessed vertices such as unprocessed vertex 604, unprocessed vertex 605, and unprocessed vertex 606. The computer-implemented method can update the distance values for the unprocessed vertex 604 using the formula from Distance Field Determination Step 3 since a digital surface triangle 632 includes two processed vertices, processed vertex 601 and processed vertex 603. Similarly, the computer-implemented method can update the distance values for the unprocessed vertex 606 using the formula from Distance Field Determination Step 3 since a digital surface triangle 634 includes two processed vertices, processed vertex 612 and processed vertex 603. However, the distance value for unprocessed vertex 605 is not updated, since no digital surface triangles to which it belongs have two processed vertices. For example digital surface triangle 638 includes only one processed vertex 603, and digital surface triangle 636 includes only one processed vertex 603. Digital surface triangle 640 includes no processed vertices. Accordingly, the distance value for unprocessed vertex 605 is not updated.

Distance Field Determination Step 6: Repeating from Distance Field Determination Step 4 until all unprocessed vertices are processed or the minimal distance to unprocessed vertices is more than a user-configurable predefined value. In some embodiments, the user-configurable predefined value can be any suitable value. In some embodiments, the user-configurable predefined value can be, for example, 50 mm. However, it is noted that the user-configurable predefined value can be any suitable value, and is not limited to 50 mm or any other value. In some embodiments this value can be slightly larger than t1.

In some embodiments, the computer-implemented method of automatically determining the trim-line can include determining a first iso-line of the distance field for a first iso-value t1. In some embodiments, the first iso-value can be a user-configurable value. In some embodiments, the first iso-value t1 can be any suitable value. In some embodiments, the first iso-value t1 can be 3 mm, for example. In some embodiments, the first iso-value t1 can be the distance of the first iso-line from the tooth region.

In some embodiments, the distance field can include a distance value for each vertex of a digital surface of the 3D digital dental model. In some embodiments, determining the first iso-line of the distance field can include determining one or more digital surface triangles having vertices with distance values both below and above a first iso-value t1. This can include constructing one or more first iso-line segments for the digital surface triangles having vertices with distance values both below and above a first iso-value t1. In some embodiments, the union of the one or more first iso-line segments can include one or more first iso-lines located on the a digital surface of the 3D digital dental model. In some embodiments, the distance field can be linear in each digital surface triangle and determined by three vertices of the digital surface triangle. In some embodiments, constructing one or more an iso-line segments can include one or more digital surface triangles having vertices with distance values both below and above the first iso-value t1. One technique to determine an iso-line for digital surface triangles is described in ALGORITHM OF DRAWING ISOLINE BASED ON IMPROVED DELAUNAY TRIANGLE NET by Mei-Ling Yin, Jianxun Chen, and Ziruo He, 2017 12th IEEE Conference on Industrial Electronics and Applications (ICIEA), copyright 2017, the entirety of which is hereby incorporated by reference.

In some embodiments, determining the first iso-line of the distance field can include the following:

For a digital surface triangle can include 3 points (p1, p2, p3) and 3 corresponding values (v1, v2, v3), and an iso-value t:

(1) If all (v1, v2, v3) can be larger-or-equal than t, or all (v1, v2, v3) can be smaller-or-equal than t, then the iso-line does not cross the digital surface triangle;

(2) Otherwise the isoline crosses two edges of the digital surface triangle, each having in one vertex pa a vertex iso-value va below the selected iso-value, and in the other vertex pb a vertex iso-value vb value above the selected iso-value.

(3) The iso-line crosses the edge in the point p=pa+(pb−pa)*(t−va)/(vb−va);

(4) Joining crossing points of two edges to provide an iso-line segment of the iso-line within the digital surface triangle.

Figure 7A:
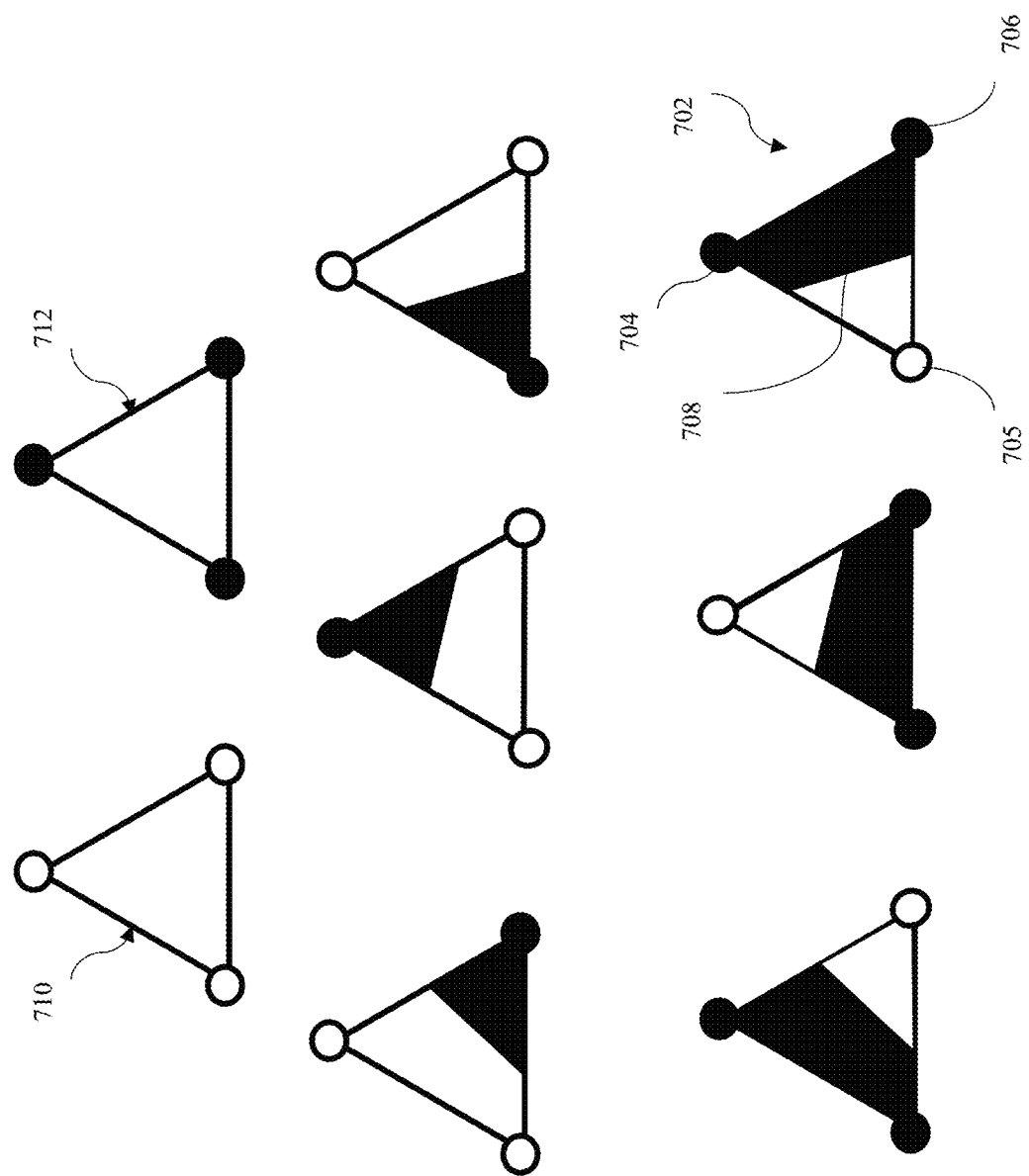
FIG. 7(a) illustrates example of different combinations of vertex iso-values having vertex iso-values in some embodiments.
Figure 7B:
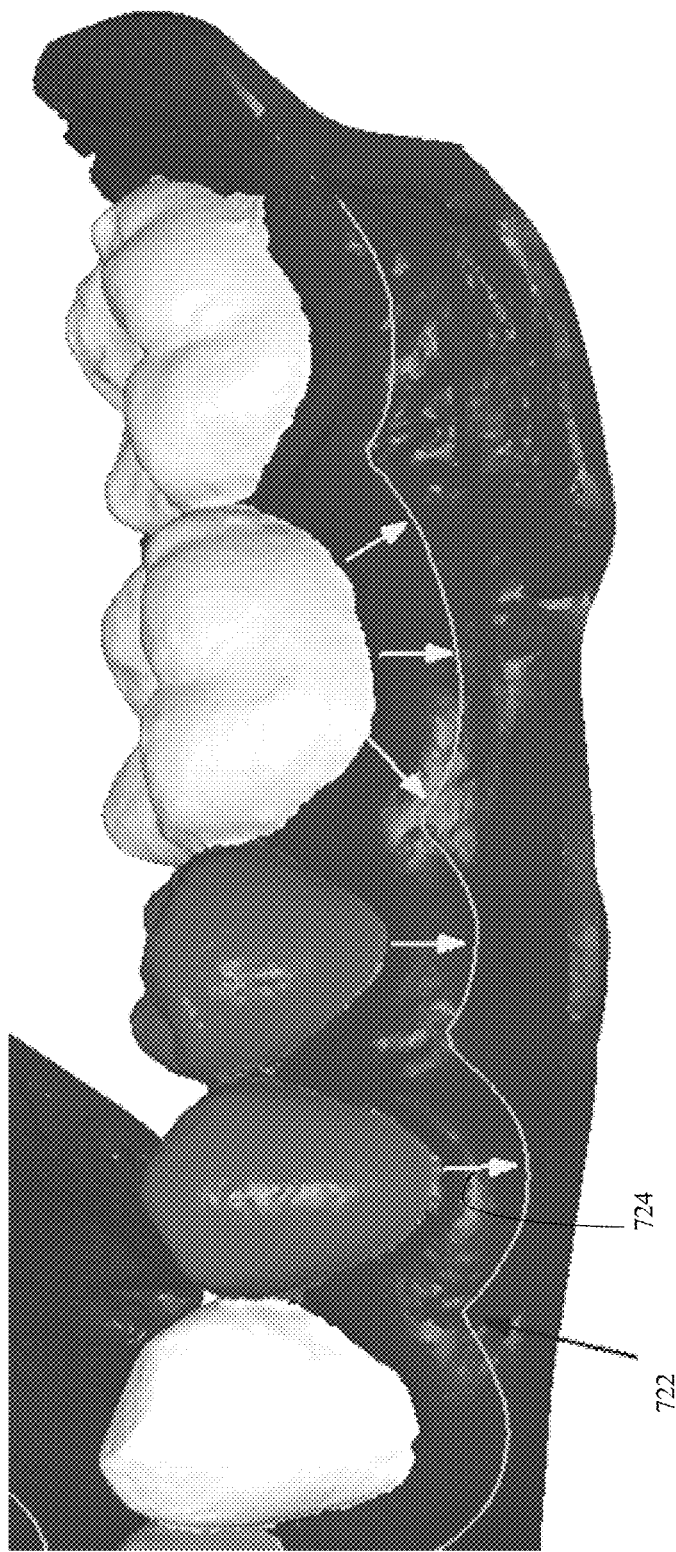
FIG. 7(b) illustrates an example of at least a portion of a 3D digital dental model with a first iso-line.

FIG. 7(a) illustrates example of different combinations of vertex iso-values having vertex iso-values above the selected iso-value filled in black, with iso-values below the selected iso-value filled in white. For example, for digital surface triangle 702, vertex 704 and vertex 706 have vertex iso-values above the selected iso-value and vertex 705 has a vertex iso-value below the selected iso-value, thereby generating iso-line segment 708. Digital surface triangle 710, on the other hand, has all vertices having vertex iso-values below the selected iso-value, thereby providing no iso-line segment. Digital surface triangle 712 has all vertices with vertex iso-values above the selected iso-value, thereby also providing no iso-line segment. FIG. 7(b) illustrates an example of at least a portion of a 3D digital dental model with a first iso-line 722 generated by determining a distance field from the virtual tooth region, with arrows showing a gradient of the distance field (direction of maximum increase), such as arrow 724.

In some embodiments, the computer-implemented method of automatically determining the trim-line can include determining a back distance field from the one or more first iso-lines to one or more vertex points having a distance value less than the first iso-value t1. In some embodiments, the back distance field can include one or more distance values, each distance value a distance from the first iso-line in the direction of the virtual tooth region. In some embodiments, determining the back distance of each first iso-line can include:

(1) Setting a new distance to 0 for all vertices having a distance value more than the first iso-value t1 and marking the vertices as processed.

(2) For digital surface triangles having one vertex with the distance value d less than the first iso-value $t_1$ and two other vertices with distance values more than the first iso-value $t_1$, setting new distance value in the first vertex to $t_1$-d, and marking the first vertex as not-processed.

(3) Setting the distance value for all other vertices to a user-configurable large value and marking them as not-processed. In some embodiments, the large user-configurable value can be any suitable value. In some embodiments, the large user-configurable value can be 1 meter, for example. Other user-configurable values can be used.

(4) Repeating the algorithm from Distance Field Determination Step 3 through Distance Field Determination Step 6 described previously.

In some embodiments, the computer-implemented method of automatically determining the trim-line can include determining a second iso-line for the back distance field for a second iso-value to generate a trim-line. In some embodiments, determining the second iso-line of the back distance field can include:

(1) determining one or more digital surface triangles having vertices with distance values both below and above a second iso-value t2. In some embodiments, the second iso-value t2 can be any suitable value. In some embodiments, the second iso-value t2 can be 3 mm, for example. In some embodiments, the second iso-value t2 can be the distance of the second iso-line from the tooth region.

(2) constructing one or more second iso-line segments for the digital surface triangles having vertices with distance values both below and above the second iso-value t2. In some embodiments, the union of the one or more second iso-line segments can include one or more second iso-lines located on the a digital surface of the 3D digital dental model. In some embodiments, the trim line can be the second iso-line. In some embodiments, the resulting trim-line can come to teeth not closer than on the distance ($t_1-t_2$). If $t_1=t_2$ then the trim line can touch virtual teeth in some points. In some embodiments, $t_1=t_2=3$ mm. In some embodiments, the resulting trim line can have curvature not more than $1/t_2$. In some embodiments, increasing $t_2$ can make the trim line smoother, and decreasing $t_2$ can allow the trim line to come closer to teeth in the region between the teeth.

Figure 7C:
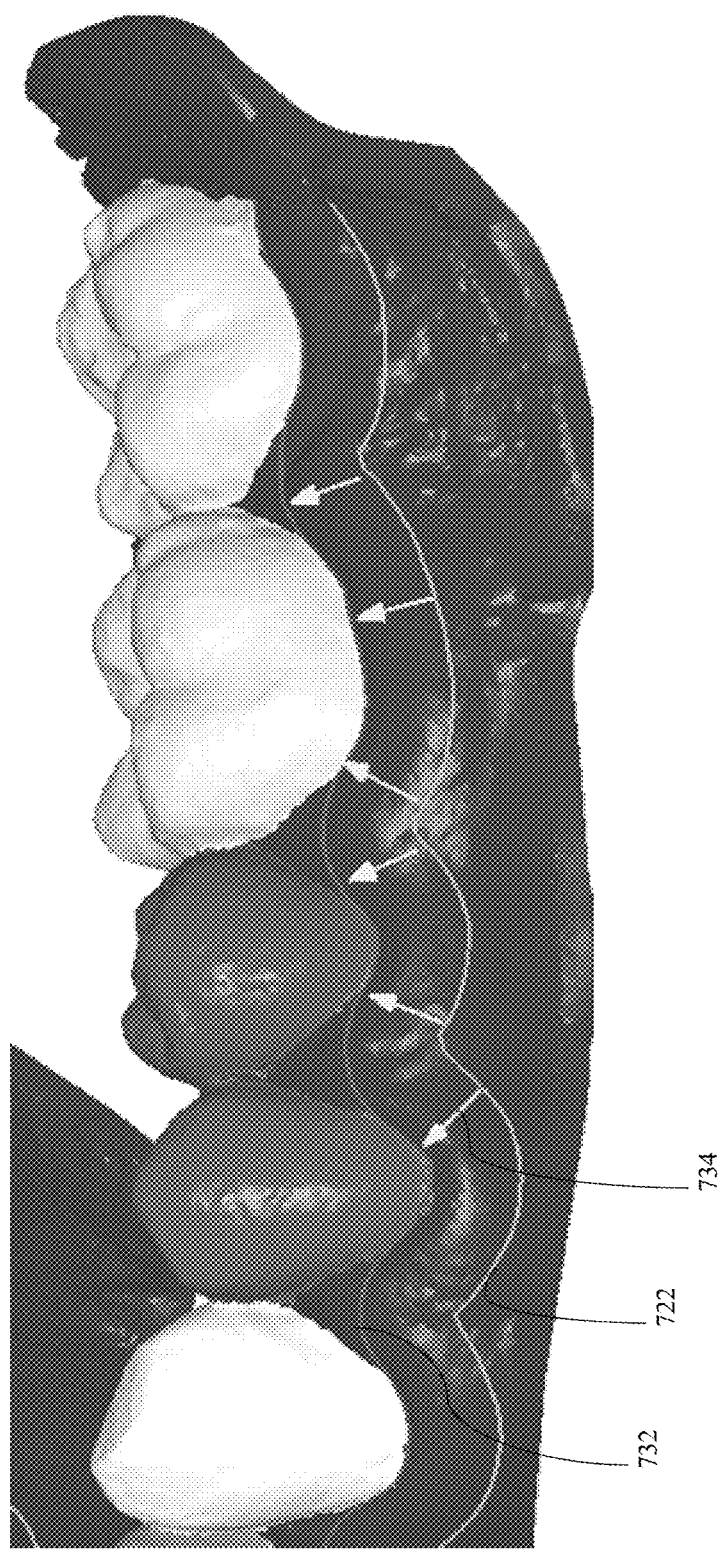
FIG. 7(c) illustrates an example of at least a portion of a 3D digital dental model with a second iso-line.

FIG. 7(c) illustrates an example of at least a portion of a 3D digital dental model with a second iso-line 732 generated by determining a back distance field from the first iso-line 722, with arrows showing a gradient of the back distance field (direction of maximum increase), such as arrow 734.

Figure 8:
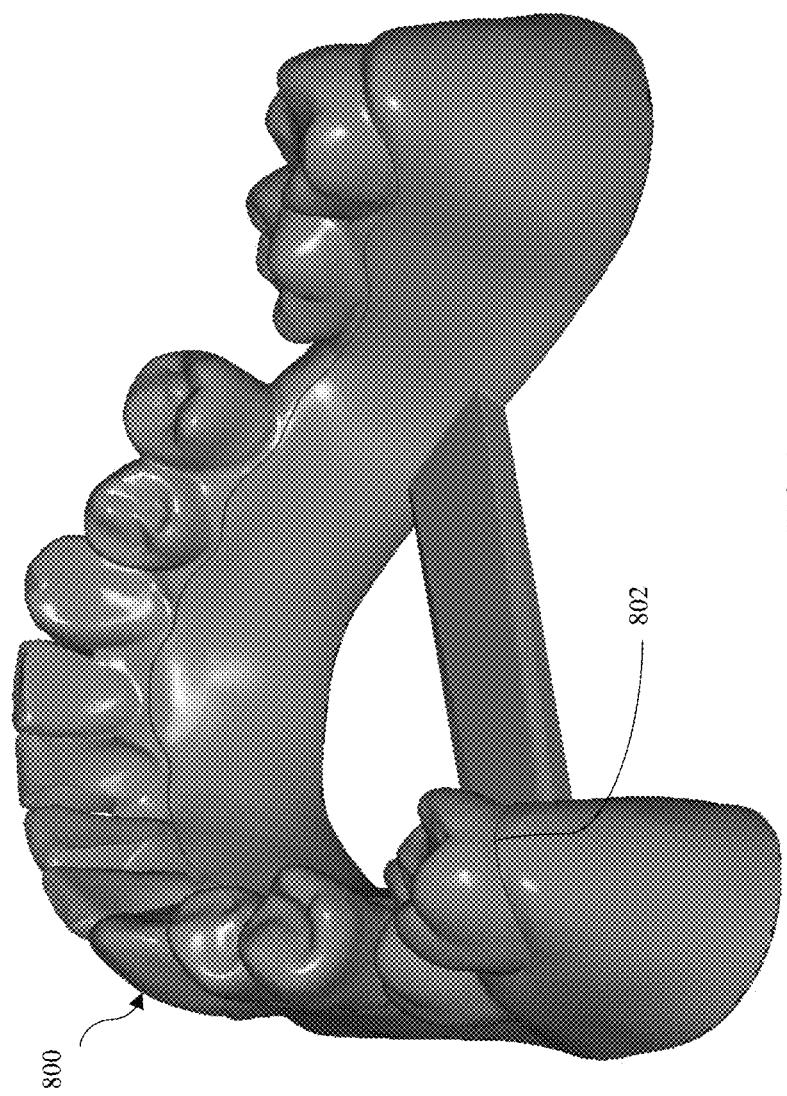
FIG. 8 illustrates an example of a 3D digital dental model with the trim line in some embodiments.

FIG. 8 illustrates an example of a 3D digital dental model with the trim line 802. In some embodiments, the trim-line is a virtual trim-line that can be displayed on the 3D digital dental model. In some embodiments, the trim-line can be a closed line that smoothly separates teeth with some gum region from the rest of the 3D digital dental model. In some embodiments, the trim-line determined by one or more features can cover all of the virtual teeth while still allowing for smoothness in shape.

In some embodiments, the computer-implemented method of determining the trim-line can include segmenting a received 3D digital dental model into one or more virtual teeth. This can be performed for 3D digital dental models whose virtual teeth are not yet segmented. In some embodiments, the one or more virtual teeth can be determined by the computer-implemented method segmenting the 3D digital dental model.

In some embodiments, the computer-implemented method can perform segmenting of the 3D digital dental model using any 3D digital model segmentation technique known in the art, and is not limited to segmentation techniques described or referenced herein. In some embodiments, the computer-implemented method can perform segmenting using one or more features described in U.S. patent application Ser. No. 17/140,739 of Azernikov, et al., filed Jan. 4, 2021, the entirety of which is hereby incorporated by reference. In some embodiments, the computer-implemented method can perform segmenting using one or more features described in U.S. patent application Ser. No. 16/778,406 of Nikolskiy et al., filed Jan. 31, 2020, the entirety of which is hereby incorporated by reference.

In some embodiments, the computer-implemented method can perform segmentation using Advanced Tooth Segmentation as follows.

In some embodiments, the computer-implemented method of advanced virtual tooth segmentation can include determining an initial virtual tooth location of one or more virtual teeth in the 3D digital dental model. In some embodiments, the initial virtual tooth location can be in 3D space.

In some embodiments, determining an initial virtual tooth location can include determining an occlusion direction. In some embodiments, the occlusion direction can be provided in the 3D digital dental model. In some embodiments, the occlusion direction can be determined using one or more techniques known in the art. The occlusal direction is a normal to an occlusal plane and the occlusal plane can be determined for the digital model using any technique known in the art. For example, one technique is described in AN AUTOMATIC AND ROBUST ALGORITHM OF REESTABLISHMENT OF DIGITAL DENTAL OCCLUSION, by Yu-Bing Chang, James J. Xia, Jaime Gateno, Zixiang Xiong, Fellow, IEEE, Xiaobo Zhou, and Stephen T. C. Wong in IEEE TRANSACTIONS ON MEDICAL IMAGING, VOL. 29, NO. 9, SEPTEMBER 2010, the entirety of which is incorporated by reference herein. Alternatively, in some embodiments, the occlusal direction can be specified by a user using an input device such as a mouse or touch screen to manipulate the digital model on a display, for example, as described herein. In some embodiments, the occlusal direction can be determined, for example, using the Occlusion Axis techniques described in PROCESSING DIGITAL DENTAL IMPRESSION U.S. patent application Ser. No. 16/451,968, of Nikolskiy et al., the entirety of which is incorporated by reference herein.

Figure 9:
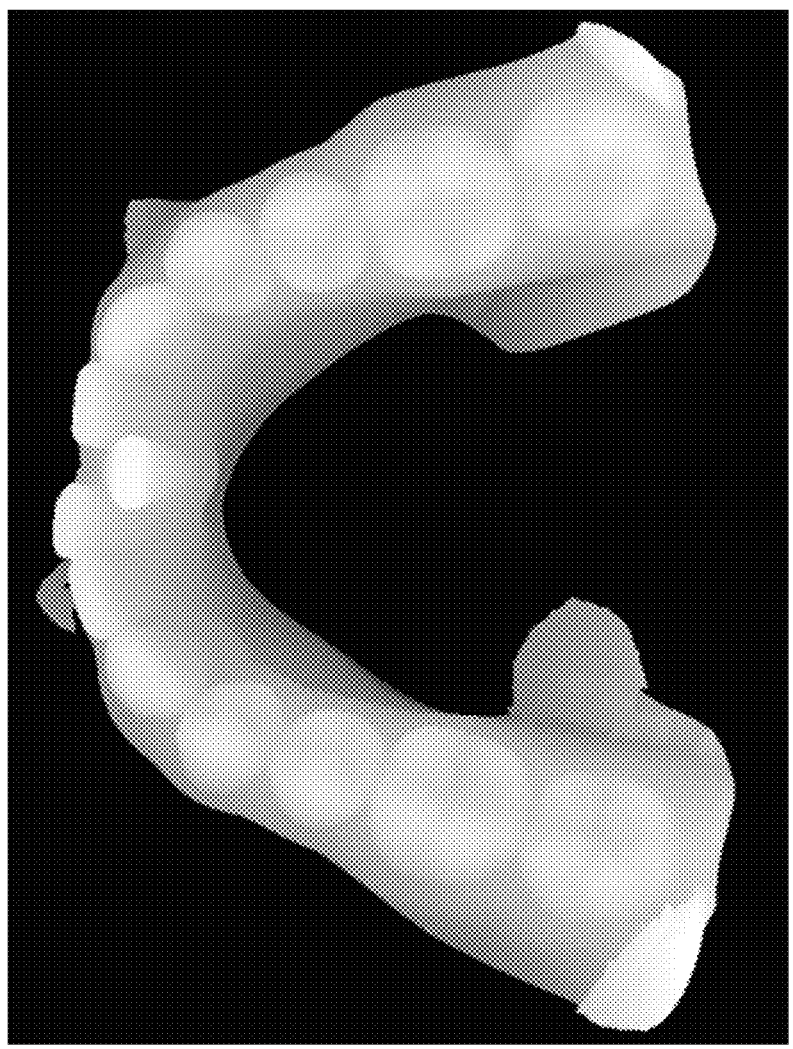
FIG. 9 illustrates an example of a 2D depth map of a digital model in some embodiments.

In some embodiments, determining an initial virtual tooth location can include generating a depth map from the occlusion direction. The 2D depth map can be generated using any technique known in the art, including, for example z-buffer or ray tracing. For example, in some embodiments, the computer-implemented method can initialize the depth of each pixel (j, k) to a maximum length and a pixel color to a background color, for example. The computer-implemented method can for each pixel in a polygon's projection onto a digital surface such as a 3D digital model determine a depth, z of the polygon at (x, y) corresponding to pixel (j, k). If z<depth of pixel (j, k), then set the depth of the pixel to the depth, z. "Z" can refer to a convention that the central axis of view of a camera is in the direction of the camera's z-axis, and not necessarily to the absolute z axis of a scene. In some embodiments, the computer-implemented method can also set a pixel color to something other than a background color for example. In some embodiments, the polygon can be a digital triangle, for example. In some embodiments, the depth in the map can be per pixel. FIG. 9 illustrates an example of a 2D depth map 902 of a digital model in some embodiments.

In some embodiments, determining an initial virtual tooth location can include determining, using a trained neural network, a virtual bounding box for one or more virtual teeth in the depth map. In some embodiments, any neural network that outputs a virtual boundary region such as a virtual boundary rectangle around detected objects can be used. In some embodiments, an example of one such neural network is a YOLO neural network.

Neural networks can be structured and used in different ways. For example, details of an example of a You Only Look Once ("YOLO") network are described in *You Only Look Once: Unified, Real-Time Object Detection*, by Joseph Redmon, Santosh Divvala, Ross Girshick, Ali Farhadi, submitted 8 Jun. 2015, last revised 9 May 2016, v5, the entirety of which is hereby incorporated by reference. Additional details of a YOLO network can be found in *YOLO9000: Better, Faster, Stronger*, by Joseph Redmon, Ali Farhadi, University of Washington-Allen Institute for AI, published 25 Dec. 2016, arXiv, the entirety of which is hereby incorporated by reference. Details of an example of a YOLO network are also described in *YOLOv3: An Incremental Improvement*, by Joseph Redmon and Ali Farhadi, University of Washington, published 2018, ArXiv, the entirety of which is hereby incorporated by reference. A trained YOLO network can receive, for example, a 2D digital model of patient's dentition and output the digital model with a digital bounding box as the virtual tooth bounding region around each virtual tooth.

A YOLOv3 network (hereinafter, "YOLO network") as described can include one or more convolutional networks that predict multiple bounding boxes and class probability for each bounding box. In some embodiments, the YOLO network can divide an input image into a S×S grid. Each of grid cells can predict B bounding boxes and can determine confidence scores for the bounding boxes. The confidence scores can indicate the model's confidence that the bounding box contains an object as well as the accuracy of the predicted box. Confidence can be expressed as Pr(Object) *$IOU_{pred}^{truth}$, where IOU is intersection over union.

In some embodiments, YOLO can use dimension clusters as anchor boxes to predict bounding boxes. For example, YOLO can predict four coordinates for a bounding box: $t_x$, $t_y$, $t_w$, $t_h$. If a cell is offset from the left top corner of the image by ($C_x$,$C_y$) and a prior bounding box has width $p_w$ and a height $p_h$, the predictions can correspond to:

$$b_x = \sigma(t_x) + c_x$$

$$b_y = \sigma(t_y) + c_y$$

$$b_w = p_w e^{t_w}$$

$$b_h = p_h e^{t_h}$$

where box center coordinates relative to the filter application location are predicted using a sigmoid function (providing σ). In some embodiments, YOLO can predict each bounding box's objectness score by performing logistic regression. The result can be 1 if the prior bounding box overlaps a ground truth object by more than any other prior bounding box. A prior bounding box that is not best but that overlaps a ground truth object by more than a threshold such as 0.5 can be ignored. Other threshold values can be used and can be set in a user configurable file, for example. A prior bounding box not assigned to a ground truth object incurs a loss for objectness, but not coordinate or class prediction. In some embodiments, each box can predict classes within the bounding box by utilizing multilabel classification. For example, independent logistic classifiers can be used. Binary cross-entropy loss for class predictions can be used in training. YOLO can make predictions across scales. For example, YOLO can predict boxes at three different scales. Features can be extracted from the scales. Several convolutional layers can be added to the base feature extractor. The final convolutional layer can predict a 3D tensor encoding bounding box, objectness, and class predictions. The tensor can be N×N×[(number of boxes at each scale)*(4+1+(number of class predictions))]. For example, the number of boxes at each scale can be 3, and the class prediction number can be 80 class predictions. YOLO can obtain a feature map from two layers previous and up-sample the feature map. For example, YOLO can up-sample the feature map by 2×. Another previous feature map can be concatenated with the up-sampled feature map to provide a combined feature map. One or more convolutional layers can be added to process the combined feature map and provide a second tensor of twice the size. The same design can be performed a final time to predict boxes for the final scale. K-means clustering can be used to determine prior bounding box values. For example, 9 clusters and 3 scales can be used and the clusters divided evenly across the scales.

Figure 10:
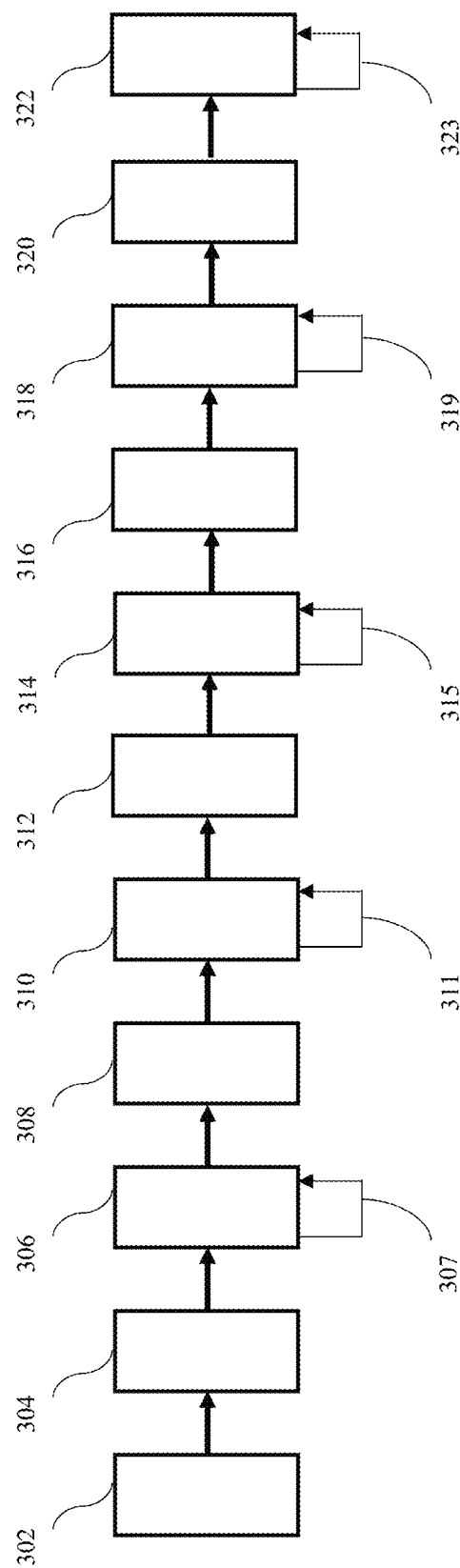
FIG. 10 illustrates an example of a YOLO neural network in some embodiments.

In some embodiments, YOLO can perform feature extraction using one or more convolution layers. One or more of the convolution layers can optionally include residual operations. FIG. 10 illustrates an example of YOLO feature extraction. The following indicates the operations performed at each layer as an example:

| LAYER REF # | TYPE | FILTERS | SIZE | OUTPUT |
|---|---|---|---|---|
| Layer 302: | convolutional | 32 | 3 × 3 | 256 × 256 |
| Layer 304: | convolutional | 64 | 3 × 3/2 | 128 × 128 |

-continued

| LAYER REF # | TYPE | FILTERS | SIZE | OUTPUT |
|---|---|---|---|---|
| Layer 306: | convolutional | 32 | 1 × 1 | |
| | convolutional | 64 | 3 × 3 | |
| | residual 307 | | | 64 × 64 |
| Layer 308: | convolutional | 128 | 3 × 3/2 | 64 × 64 |
| Layer 310: | convolutional | 64 | 1 × 1 | |
| | convolutional | 128 | 3 × 3 | |
| | residual 311 | | | 64 × 64 |
| Layer 312: | convolutional | 256 | 3 × 3/2 | 32 × 32 |
| Layer 314: | convolutional | 128 | 1 × 1 | |
| | convolutional | 256 | 3 × 3 | |
| | residual 315 | | | 32 × 32 |
| Layer 316: | convolutional | 512 | 3 × 3/2 | 16 × 16 |
| Layer 318: | convolutional | 256 | 1 × 1 | |
| | convolutional | 512 | 3 × 3 | |
| | residual 319 | | | 16 × 16 |
| Layer 320: | convolutional | 1024 | 3 × 3/2 | 8 × 8 |
| Layer 322: | convolutional | 512 | 1 × 1 | |
| | convolutional | 1024 | 3 × 3 | |
| | residual 323 | | | 8 × 8 |

Layer 310 can be performed 2×, Layer 314 can be performed 8×, layer 318 can be performed 8×, and layer 322 can be performed 4×, bringing the total number of convolutions for the entire network to 53 convolutions. The avgpool can be global. Other arrangements and variations are also contemplated in the YOLO network. In some embodiments, a trained YOLO network can receive an image and provide bounding regions around each feature in the image. The features can be defined during training. YOLO training can include minimizing loss functions. The loss function only penalizes classification errors when an object is in the particular grid cell. The loss function penalizes bounding box coordinate errors if a particular predictor is responsible for the ground truth box. For example, if the particular predictor has the highest IOU of all predictors in the particular grid cell.

In some embodiments, the trained neural network can be a depth map trained neural network. In some embodiments, the depth map trained network can be trained using a depth map image training dataset can include one or more training depth map images, each training depth map image can include a virtual bounding box marked around at least one virtual tooth in the depth map.

Figure 11A:
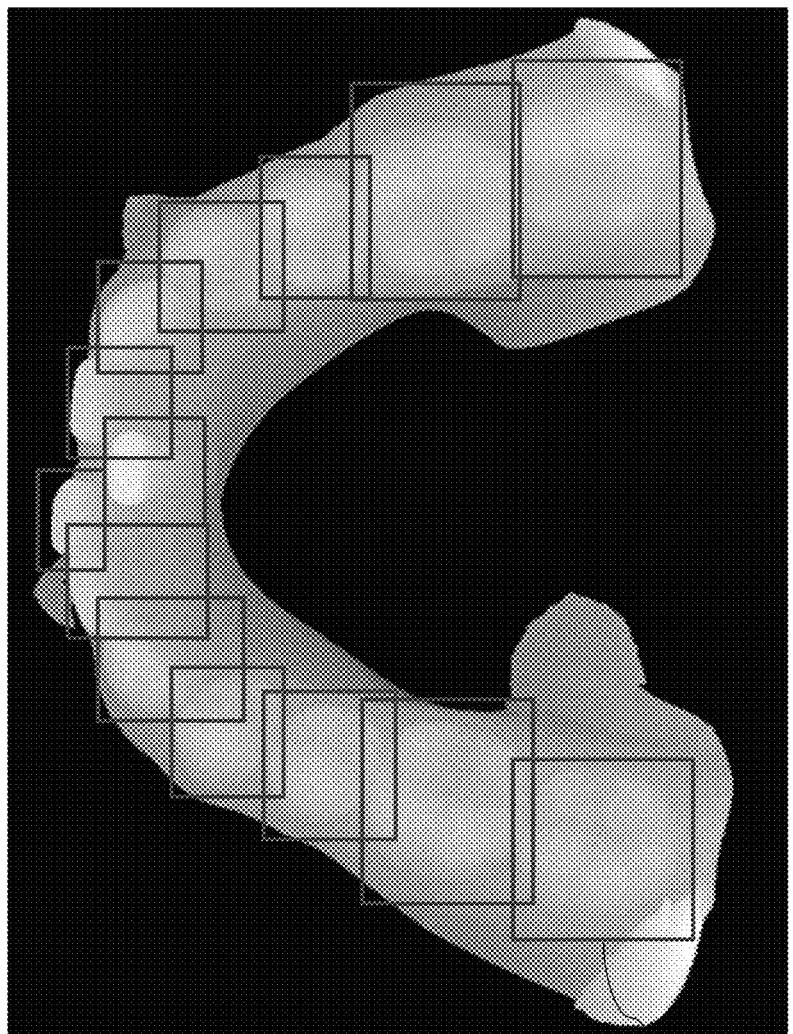
FIG. 11(a) illustrates an example of a 2D depth map with a marked virtual tooth bounding region in some embodiments.

To generate the training dataset, each virtual tooth in each 2D depth map in the training dataset can be marked by a virtual tooth bounding region. FIG. 11(a) illustrates an example of a 2D depth map 1110 with a marked virtual tooth bounding region 1113. The marked virtual tooth bounding region for each virtual tooth in the 2D depth map can be marked manually by a user or technician, for example, or by an automatic process in some embodiments. In some embodiments, the computer-implemented method can provide the 2D depth map training set to a neural network to provide a 2D depth map trained neural network. In some embodiments, the computer-implemented method can train a YOLO network with one or more 2D depth maps, each with marked virtual tooth bounding regions shaped as rectangles or boxes.

After training, in some embodiments, the 2D depth map trained neural network can receive one or more unmarked 2D depth maps each having a digital dental arch and generate a virtual tooth bounding region for one or more virtual teeth in at least a portion of each digital dental arch. In some embodiments, the computer-implemented method can use the trained neural network to roughly define a virtual tooth bounding region around each virtual tooth, for example. Each virtual tooth bounding region can provide a rough approximation of the position of each tooth when viewed from an occlusal direction.

In some embodiments, the 2D depth map trained neural network is a 2D depth map trained convolutional neural network as described previously. In some embodiments, the 2D depth map trained neural network can be a 2D depth map trained YOLO network as described previously. The trained 2D depth map YOLO network can receive a 2D depth map and can provide a virtual tooth bounding region for each virtual tooth in at least a portion of the 2D depth map. The computer-implemented method can label one or more pixels bounded by a virtual tooth bounding region with a unique label in some embodiments for example. The virtual tooth bounding regions provided by a trained 2D depth map YOLO network can be virtual tooth bounding boxes, for example.

Figure 11B:
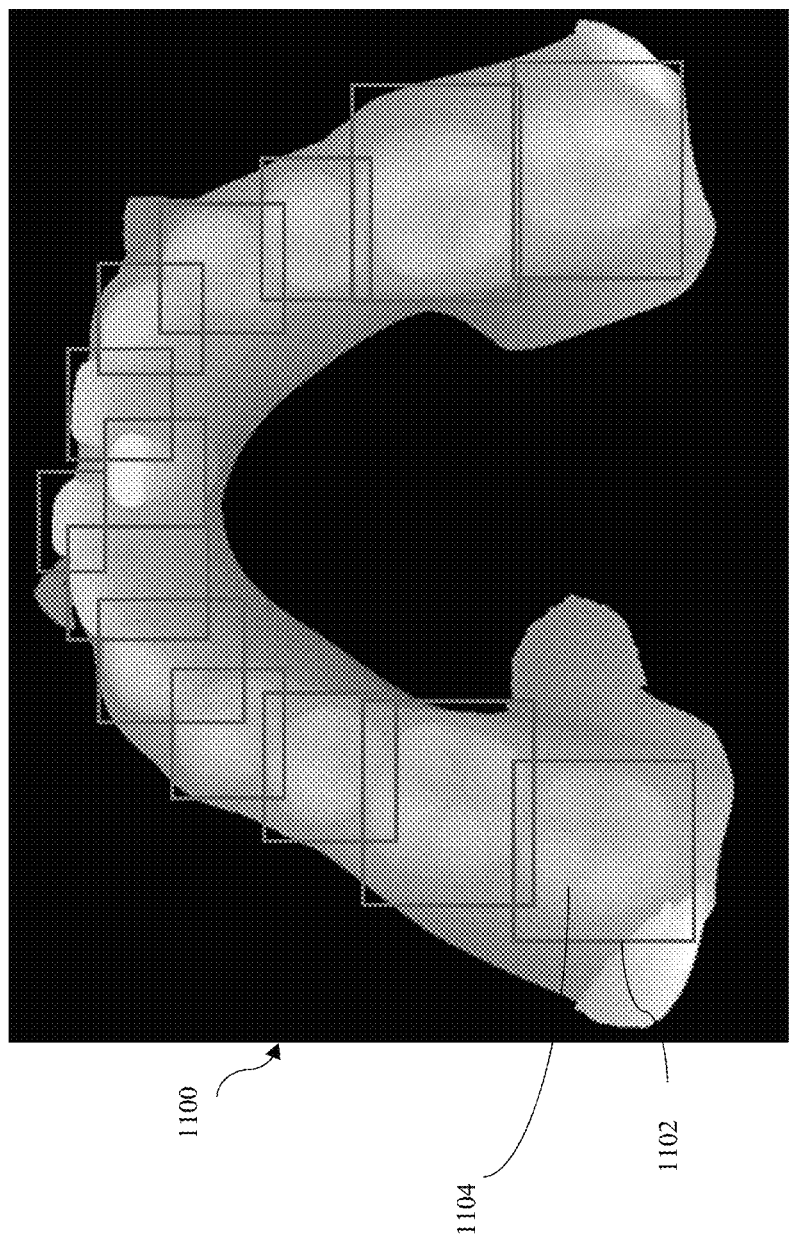
FIG. 11(b) illustrates an example of a 2D depth map with one or more virtual tooth bounding regions in some embodiments.
Figure 12:
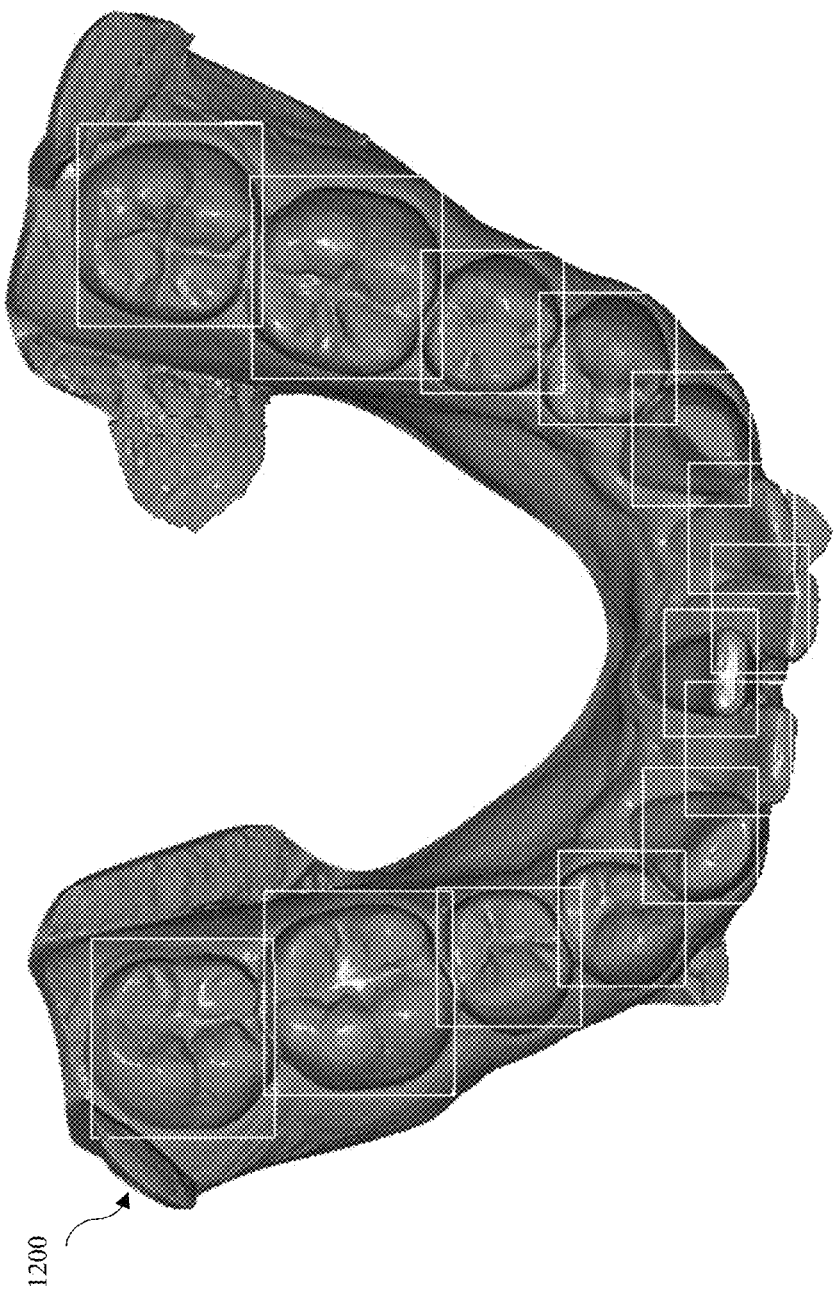
FIG. 12 illustrates an example of one or more virtual bounding regions on the 3D digital dental model.

FIG. 11(b) illustrates an example of an output of a 2D depth map trained neural network (such as a YOLO network in some embodiments, for example). The output can be one or more virtual bounding regions corresponding to one or more virtual teeth as illustrated on a 2D depth map 1100. For example a virtual bounding region 1102 corresponds to virtual tooth 1104. FIG. 12 illustrates the virtual bounding regions on the 3D digital dental model 1200.

Figure 13:
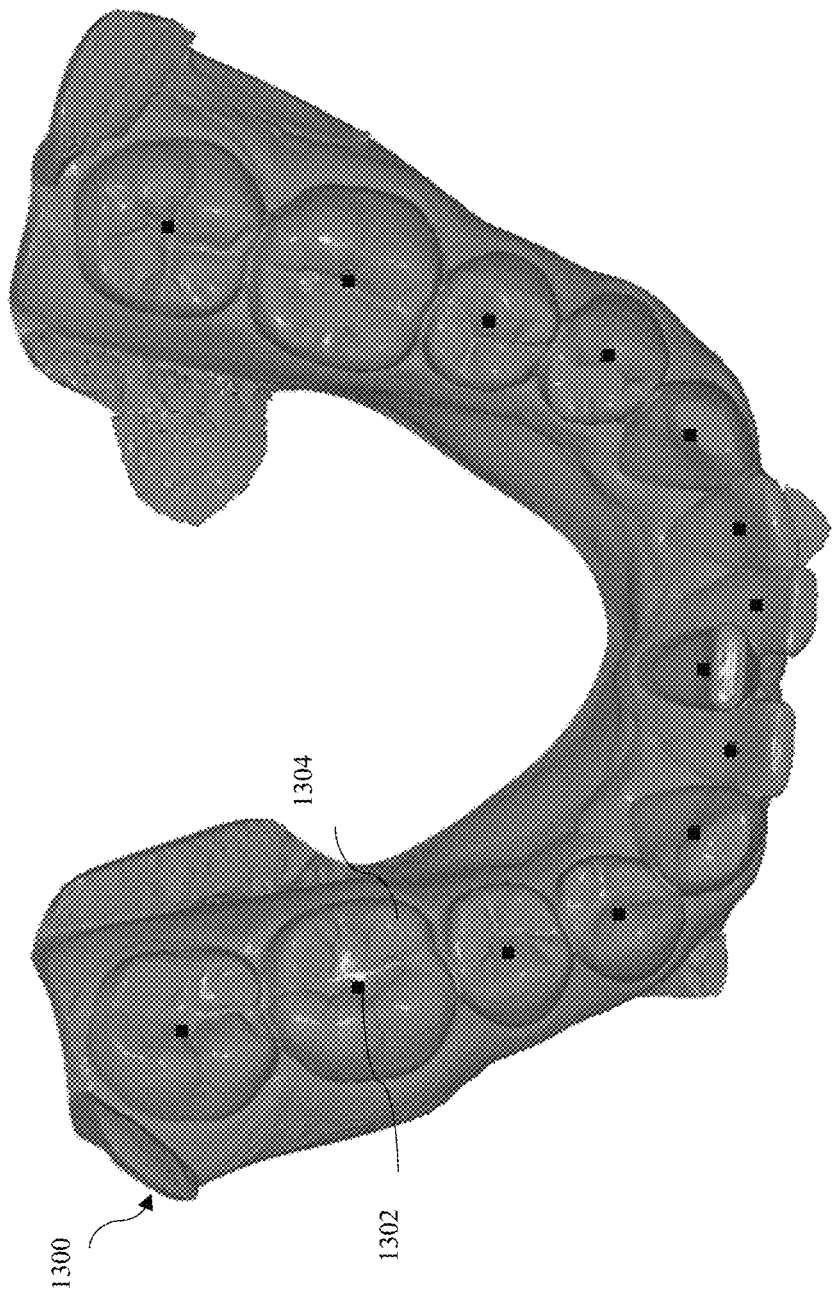
FIG. 13 illustrates an example of one or more virtual tooth centers corresponding to one or more virtual teeth in some embodiments.

In some embodiments, the computer-implemented method can determine a virtual tooth center for one or more virtual teeth in the 2D depth map. In some embodiments, the computer-implemented method can determine the virtual tooth center as a 2D center position of each virtual bounding box. In some embodiments, the computer-implemented method can combine the 2D center position with a height at the 2D center position to determine a 3D position of one or more virtual tooth centers. FIG. 13 illustrates an example of a 2D depth map 1300 that includes one or more virtual tooth centers corresponding to one or more virtual teeth. For example a virtual tooth center 1302 corresponds to virtual tooth 1304. In some embodiments, a virtual tooth center can be determined for all of the virtual teeth in the 2D depth map.

In some embodiments, the computer-implemented method of advanced virtual tooth segmentation can include constructing a virtual crown line from one or more initial virtual tooth location(s). In some embodiments, the virtual crown line can include determining a spline passing through one or more virtual tooth centers to form a convex hull. In some embodiments, initial tooth locations outside of a convex hull are not included in the virtual crown line. In some embodiments, the computer-implemented method can skip or exclude one or more virtual tooth centers that would prevent the crown line from forming a convex hull. In an alternate embodiment, the computer-implemented method can construct a smooth curve that is influenced by virtual tooth centers but, not required to go exactly through each virtual tooth center in order to preserve its smoothness. Such a smooth curve does not necessarily require a convex hull and can include concave curve regions that are small by length and curvature magnitude in some embodiments, for example.

Figure 14:
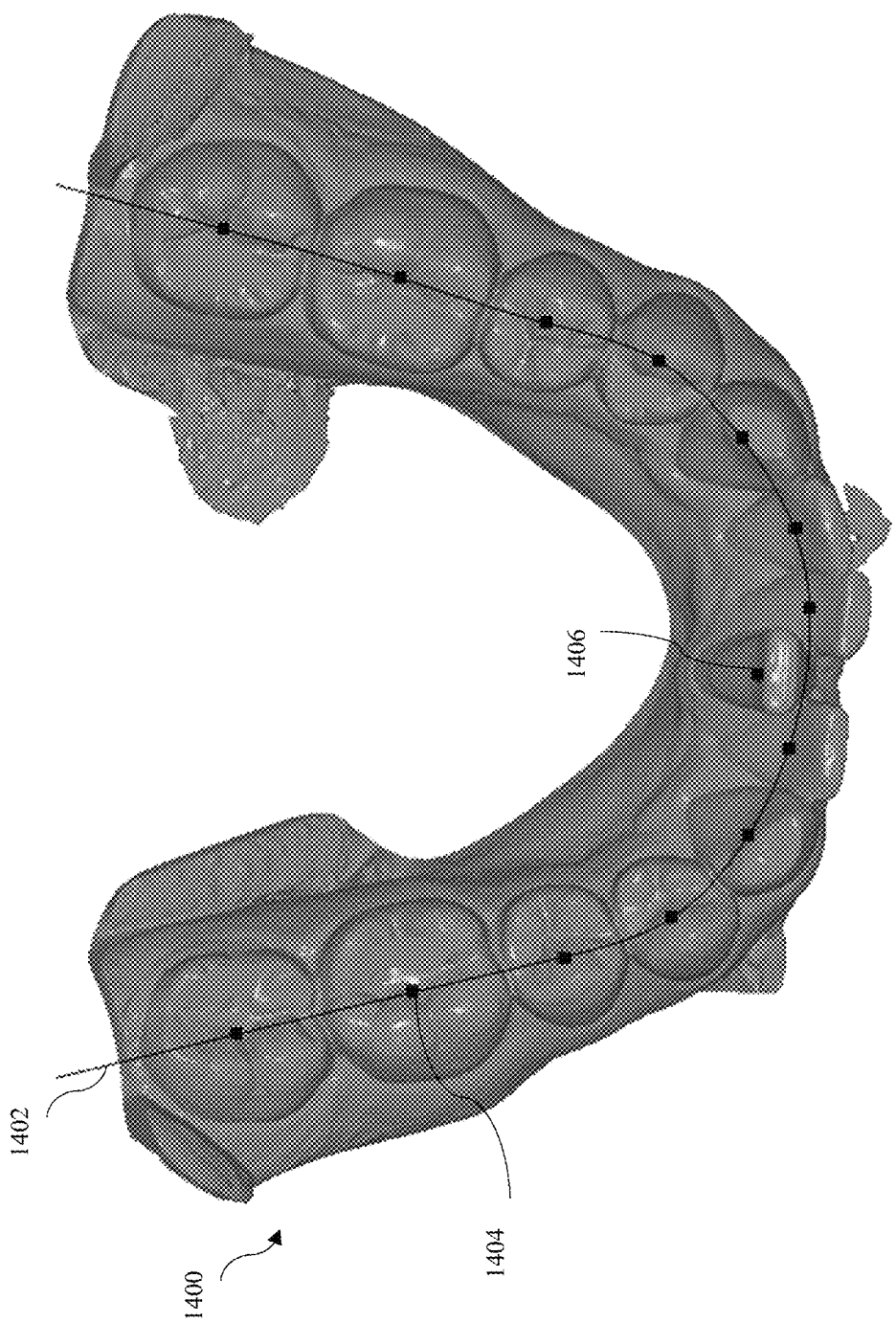
FIG. 14 illustrates an example of constructing a virtual crown line for the digital dental model in some embodiments.
Figure 15:
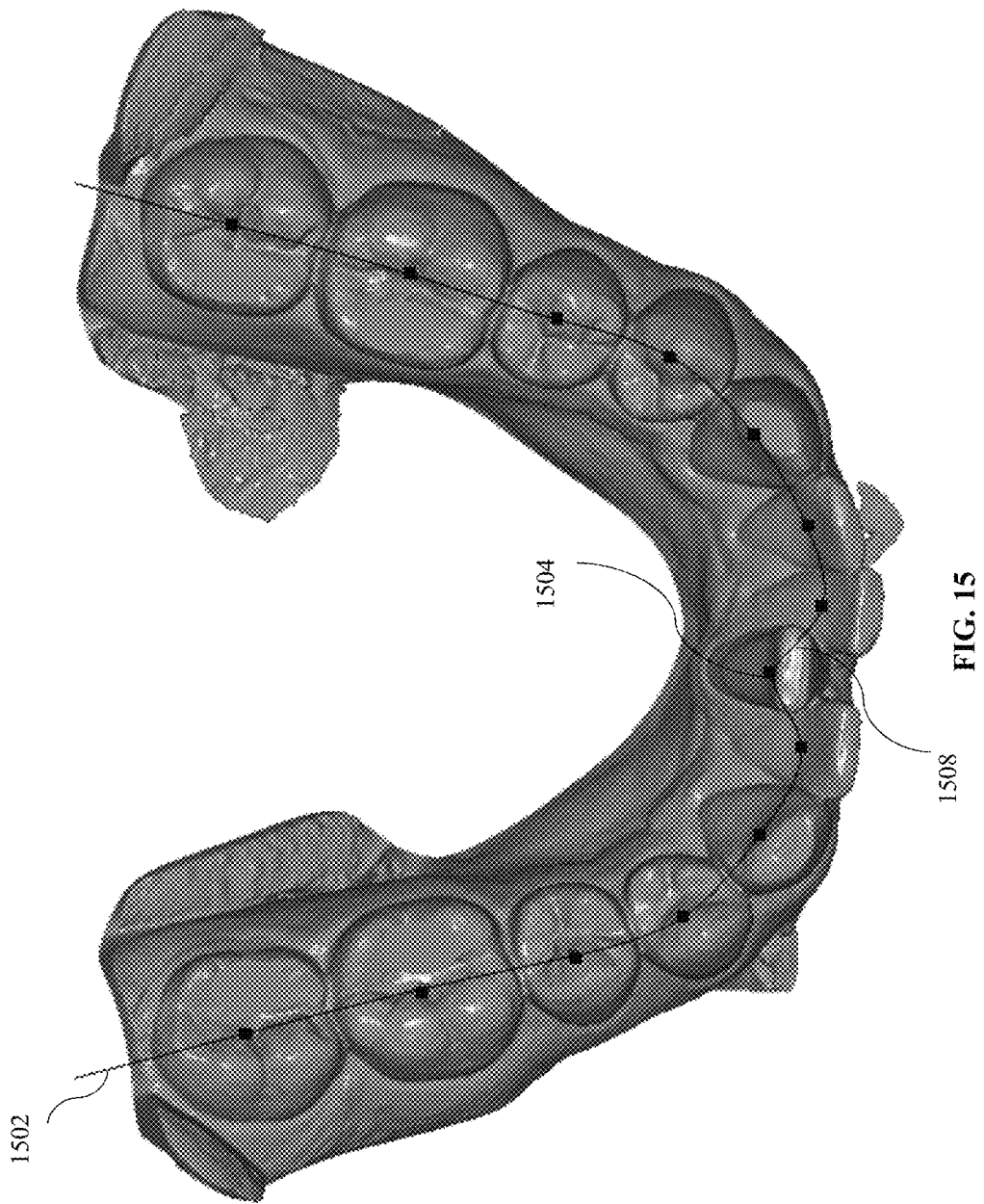
FIG. 15 illustrates an example of a non-convex spline in some embodiments.

FIG. 14 illustrates an example of constructing a virtual crown line for the digital dental model 1400. As illustrated in the figure, the computer-implemented method generates a spline 1402 by connecting one or more virtual tooth centers such as virtual tooth center 1404. The computer-implemented method skips virtual tooth center 1406 since the virtual tooth center would prevent the spline from forming a convex hull. This can be seen in FIG. 15, which illustrates a non-convex spline 1502 formed by connecting through virtual tooth center 1504, thereby causing the non-convex spline 1502 to have a concave portion 1508.

In some embodiments, the computer-implemented method of advanced virtual tooth segmentation can include determining a long axis of one or more virtual teeth based on the virtual crown line. In some embodiments, determining the long axis of a virtual tooth can include determining, for one or more virtual tooth centers, a plane that contains the virtual tooth center wherein the plane can be also perpendicular to the crown line. In some embodiments, the long axis can be determined for every virtual tooth. This can include, for example, virtual teeth whose virtual tooth center was skipped or excluded from the spline generated as the crown line.

Figure 16:
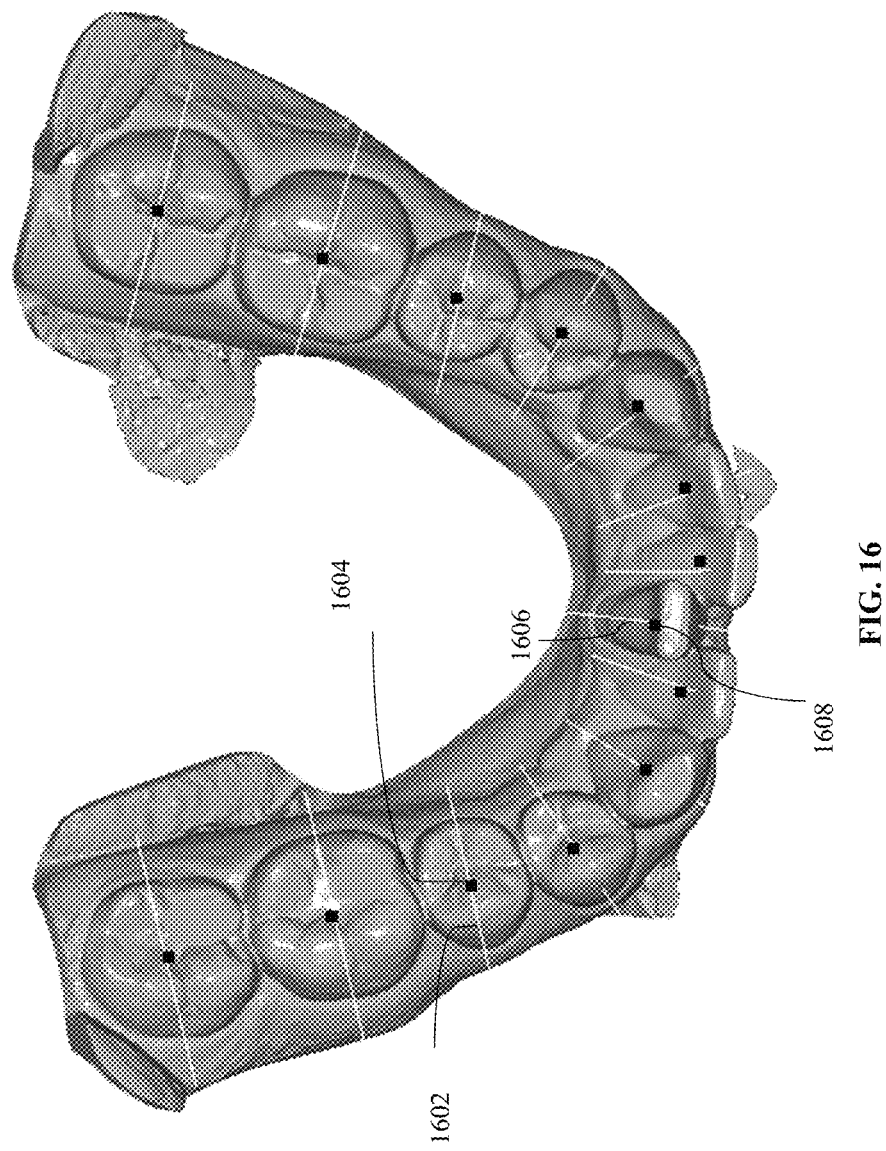
FIG. 16 illustrates an example 3D digital dental model with one or more planes passing through virtual tooth centers in some embodiments.

FIG. 16 illustrates an example 3D digital dental model with one or more planes passing through virtual tooth centers. In the figure, the computer-implemented method generates one or more planes such as a plane 1602 that passes through virtual tooth center 1604 and is perpendicular to the crown line (not shown). The computer-implemented method also generates a plane 1606 for virtual tooth center 1608 even though the virtual tooth center 1608 was excluded from the determination of the crown line. However, the plane 1606 is also perpendicular to the generated crown line.

In some embodiments, determining the long axis of a virtual tooth can include evaluating one or more rays originating from the virtual tooth center and directed inside a cone. In some embodiments, an angle step between one or more rays can be equal. The number of rays can be any user-configurable value. For example, the number of rays can be a user-configurable 17 rays. It is noted that the number of rays can be any suitable value, and is not limited to 17 rays. In some embodiments, the cone can be a user-configurable number of degrees from the occlusion direction. For example, the user-configurable angle can be plus/minus 45 degrees from the occlusion direction. However, other suitable values can be used, and the disclosure is not limited to any particular degrees.

In some embodiments, determining the long axis of a virtual tooth can include determining one or more maximal distance rays that intersect with a surface of the 3D digital dental model. In some embodiments, determining one or more maximal distance rays can include:

(1) Discarding one or more rays that have a point at a user-configurable distance from the cone origin that is outside of the digital surface. In some embodiments, the user-configurable distance can be any suitable value. In some embodiments, the user-configurable distance can be 1 mm, as an example. However, other suitable values can be used, and the disclosure is not limited to any particular distance.

(2) Determining, for one or more other rays, where each ray intersects with the surface at a second location along the ray. In some embodiments, if the ray does not intersect the digital surface again, then setting its distance to a user-configurable distance from the cone origin. In some embodiments, the user-configurable distance can be any suitable value. In some embodiments, the user-configurable distance can be 25 mm from the cone origin, for example. However, other suitable values can be used, and the disclosure is not limited to any particular distance. In some embodiments, the computer-implemented method can determine the long axis as one or more maximum distance rays as rays at a user-configurable maximal intersect distance from the cone origin. In some embodiments, the computer-implemented method can determine the long axis as an average direction of the one or more maximum distance rays.

Figure 17:
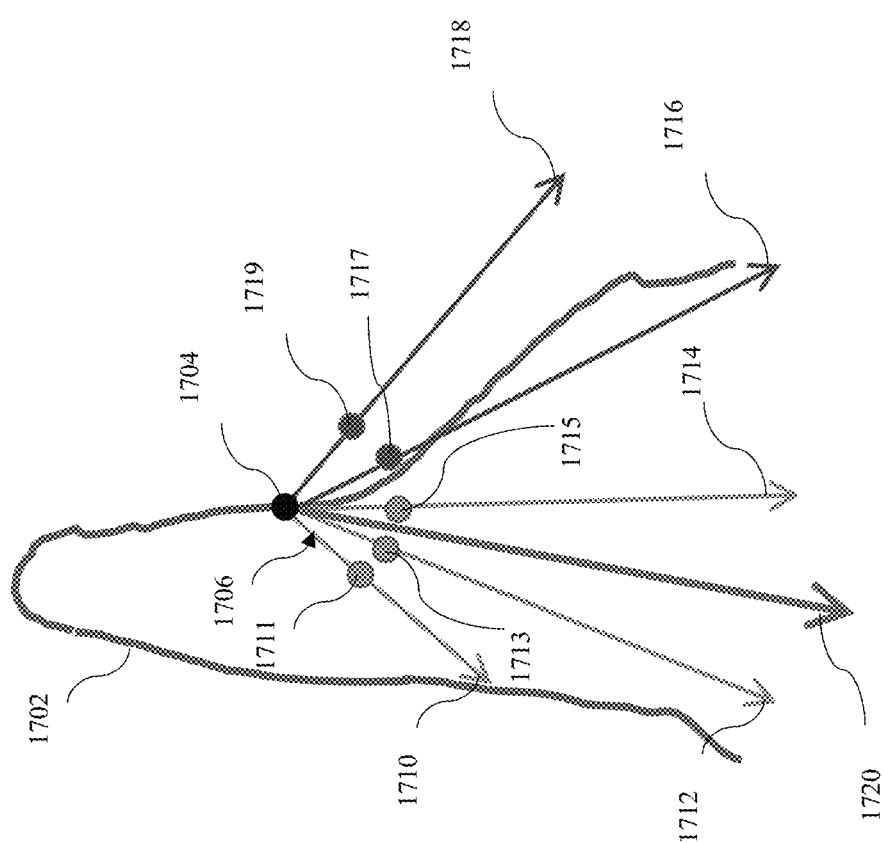
FIG. 17 illustrates an example of determining the long axis for one or more virtual teeth in some embodiments.

FIG. 17 illustrates an example of determining the long axis for one or more virtual teeth. The figure shows a planar section of a virtual tooth section 1702 having a virtual tooth center 1704 and a cone of rays 1706 extending from the virtual tooth center 1704. The example includes five rays: ray 1710, ray 1712, ray 1714, ray 1716, and ray 1718. More or fewer rays can be used. Each of the rays in the example includes a user-configurable test point as shown in the figure. For example, ray 1710 has test point 1711, ray 1712 has test point 1713, ray 1714 has test point 1715, ray 1716 has test point 1717, and ray 1718 has test point 1719. The computer-implemented method can determine that the test point 1717 of ray 1716 and the test point 1719 of ray 1718 are outside of the virtual tooth section 1702 surface and discard ray 1716 and ray 1718. The computer-implemented method can determine that ray 1710, ray 1712, and ray 1714 have test points that are inside the surface. Of these rays, the computer-implemented method can determine ray 1712 and ray 1714 are the longest and do not intersect the digital surface of the virtual tooth more than once. The computer-implemented method can determine a long axis 1720 of the virtual tooth as an average of the longest rays ray 1712 and 1714.

Figure 18:
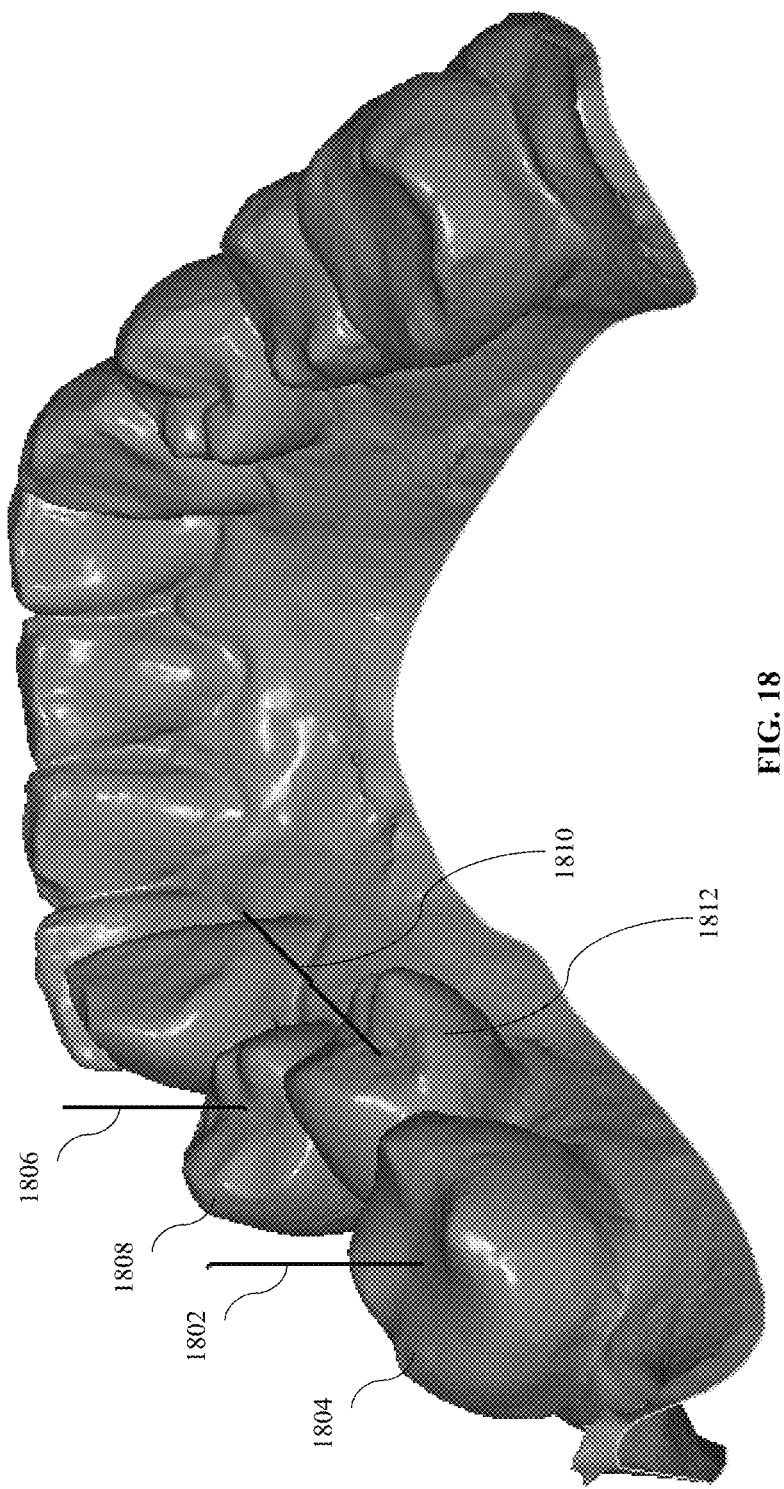
FIG. 18 illustrates an example of the 3D digital dental model with long axes determined for one or more virtual teeth in some embodiments.

FIG. 18 illustrates an example of the 3D digital dental model with long axes determined for three virtual teeth. For example, the figure shows a long axis 1802 belonging to virtual tooth 1804, a long axis 1806 belonging to virtual tooth 1808, and a long axis 1810 belonging to virtual tooth 1812. In some embodiments, a long axis for one or more virtual teeth can be determined. In some embodiments, a long axis for all virtual teeth in the 3D digital dental model can be determined.

In some embodiments, the computer-implemented method of advanced virtual tooth segmentation can include constructing a virtual root line. Constructing the virtual root line can include moving one or more virtual tooth centers along its corresponding long axis in a root direction by a user-configurable distance to provide a root point for each virtual tooth. The user-configurable distance can be any suitable distance. In some embodiments, the user-configurable distance can be 15 mm, for example. However, other suitable values can be used, and the disclosure is not limited to any particular distance. In some embodiments, constructing the virtual root line can include generating a spline connecting one or more root points. In some embodiments, the spline can be in the shape of a convex hull. In some embodiments, one option can include leaving only points from the convex hull before constructing a root line from the points of convex hull.

Figure 19:
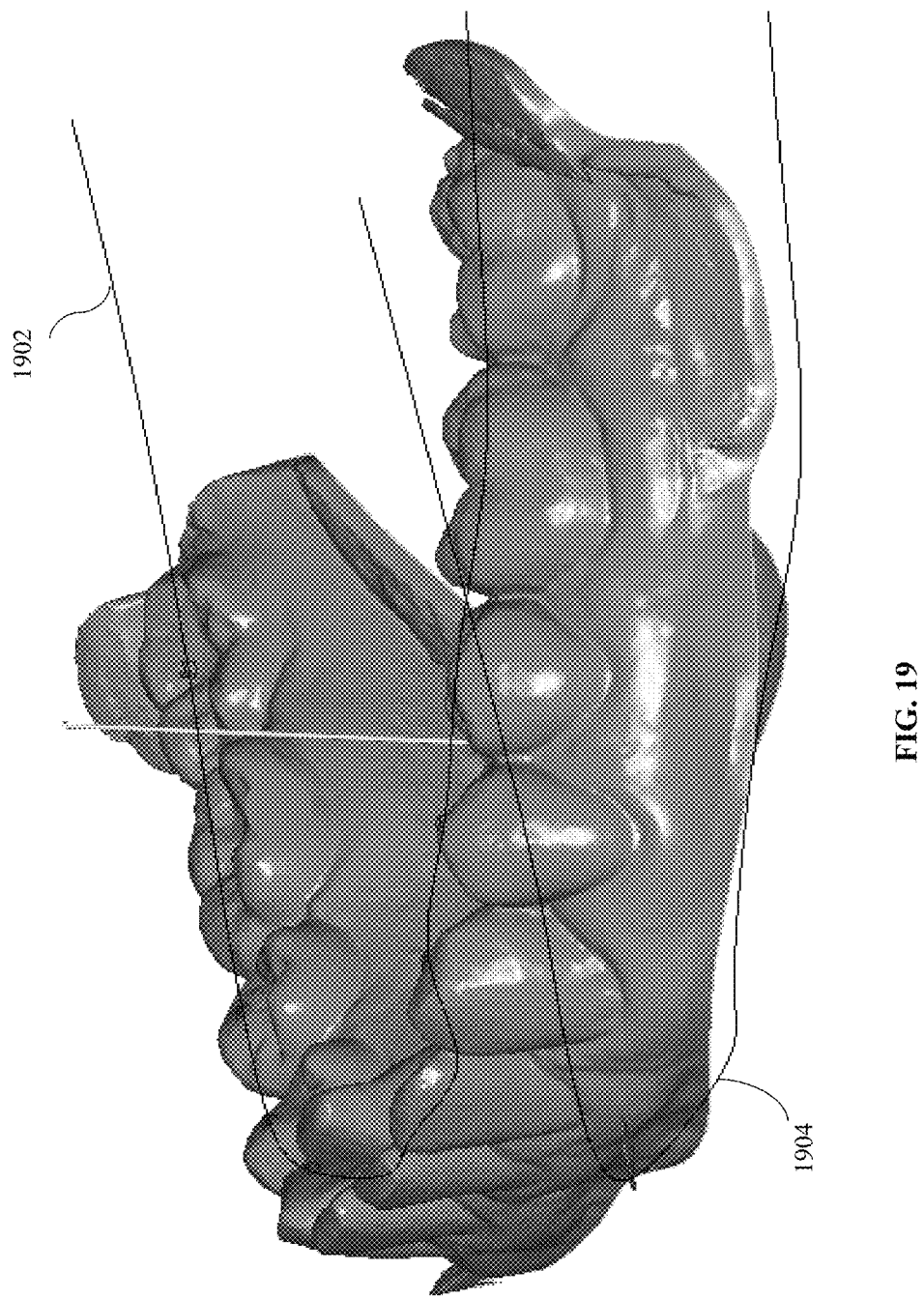
FIG. 19 illustrates an example of a virtual root line and a virtual crown line in some embodiments.

FIG. 19 illustrates an example of a virtual root line and a virtual crown line. For example, as shown in the figure, the 3D digital dental model can include a virtual crown line 1902 and a virtual root line 1904.

In some embodiments, the computer-implemented method of advanced virtual tooth segmentation can include determining a virtual tooth virtual bounding box for one or more virtual teeth in a panoramic image. In some embodiments, the panoramic image can be generated using one or more features and/or techniques described in U.S. patent application Ser. No. 17/140,739 of Azernikov, et al., filed Jan. 4, 2021, the entirety of which is hereby incorporated by reference.

In some embodiments, the computer-implemented method can generate a panoramic image from the 3D digital dental model based on the long axis. The panoramic image can include a rectangular raster image having a particular resolution. In some embodiments, the resolution can be any suitable user-configurable value. In some embodiments, the resolution can be 2048×320. In some embodiments, a column in the panoramic image corresponds to a sampled position on the virtual root line. In some embodiments, a column in the panoramic image corresponds to a sampled position on the virtual crown line. In some embodiments, a column in the panoramic image corresponds to a sampled position on the virtual root line and the virtual crown line. In some embodiments, each row in the panoramic image corresponds to an inclination angle relative to the long axis of a particular virtual tooth. In some embodiments, a middle row of the panoramic image corresponds to the long axis.

Figure 20:
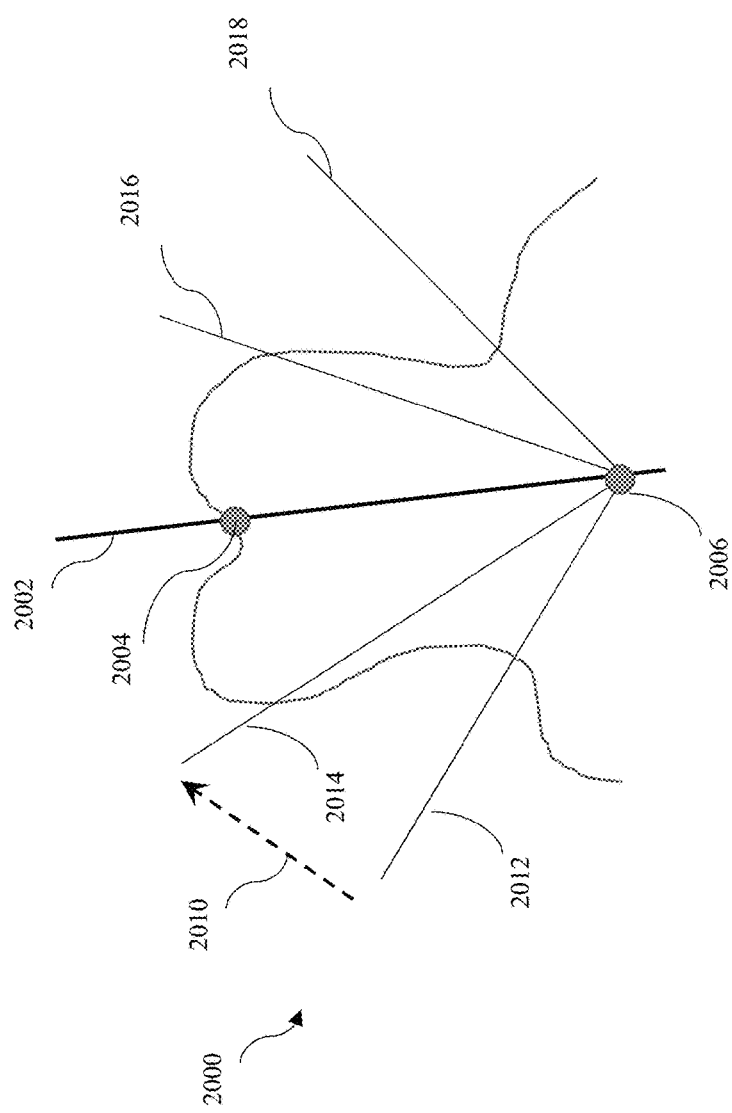
FIG. 20 illustrates an example of generating a panoramic image using the long axis of a virtual tooth in some embodiments.

FIG. 20 illustrates an example of generating a panoramic image using the long axis of a virtual tooth. The long axis 2002 corresponds to a middle row in the panoramic image, and includes a crown intersection point 2004 and a intersection with the root line at point 2006. Each sample along the inclination 2010 corresponds to a row in the panoramic image. The scan section 2000 corresponds to a column in the panoramic image. In the example, the column has five rows, corresponding to sample 2012, sample 2014, the long axis 2002 (the middle row), sample 2016, and sample 2018. The example is for illustrative purposes only, and the actual panoramic image can include many more rows and columns.

Figure 21:
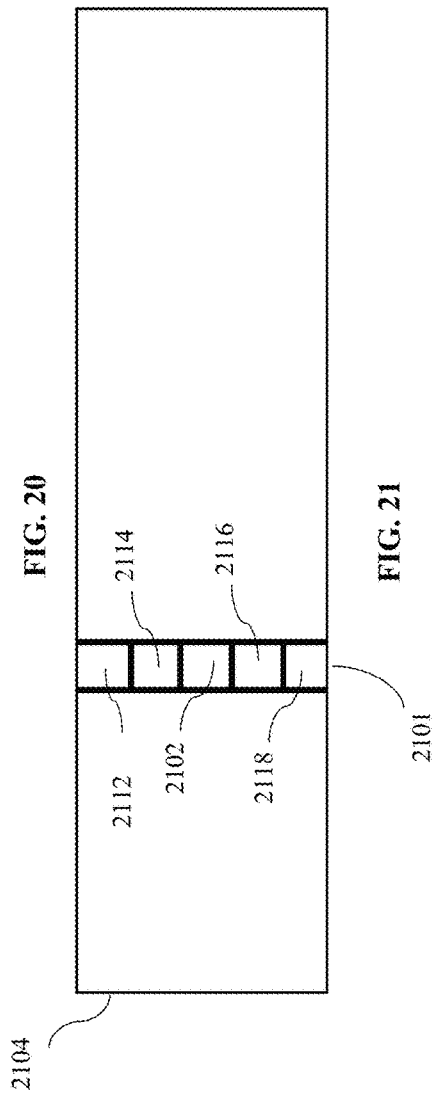
FIG. 21 illustrates an example of one column of a panoramic image in some embodiments.

FIG. 21 illustrates an example of one column 2101 of a panoramic image 2104. The column 2101 corresponds to the scan section 2000 from FIG. 20, with center cell 2102 of the column 2101 corresponding to the long axis 2002 from FIG. 20, a row 2112 of the column 2101 corresponding to a sample 2012 from FIG. 20, a row 2114 of the column 2101 corresponding to a sample 2014 from FIG. 20, a row 2116 of the column 2101 corresponding to a sample 2016 from FIG. 20, and a row 2118 of the column 2101 corresponding to a sample 2018 from FIG. 20, In some embodiments, generating the panoramic image can include determining one or more ray-surface intersections. The number of rays can correspond to the number of pixels in the panoramic image. In some embodiments, the one or more ray-surface intersections are determined in parallel. In some embodiments, each panoramic image pixel can include an indication of whether the ray can be a digital surface-intersecting ray, and if it does, then a distance from the virtual root line for one or more surface-intersecting rays and a surface location face penetrated by one or more surface-intersecting ray corresponding to this pixel. The digital surface can be a surface of the 3D digital dental model. In some embodiments, the computer-implemented method selects an intersection position closest to the virtual root. In some embodiments, the intersection position closest to the virtual root can include a lowest intersection position. In some embodiments, the intersection position closest to the virtual root can include an intersection point closest to a gum line. In some embodiments, selecting an intersection position closer or closest to the virtual root advantageously reduces extraneous material, for example. In some embodiments, selecting an intersection position closer or closest to the virtual root can advantageously accommodate for big undercuts, for example. Alternatively, in some embodiments, the computer-implemented method can select an intersection position furthest from the root. This can be done, for example where virtual jaw models include complex artificial bases in place of virtual gums.

Figure 22:
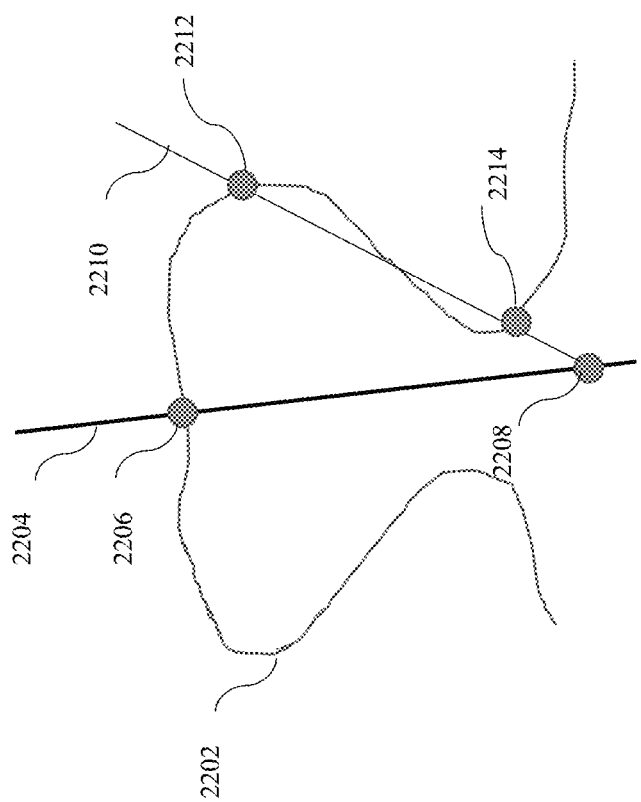
FIG. 22 illustrates an example a cross section of a virtual tooth having a long axis that intersects at the crown line point and the root line point in some embodiments.
Figure 23:
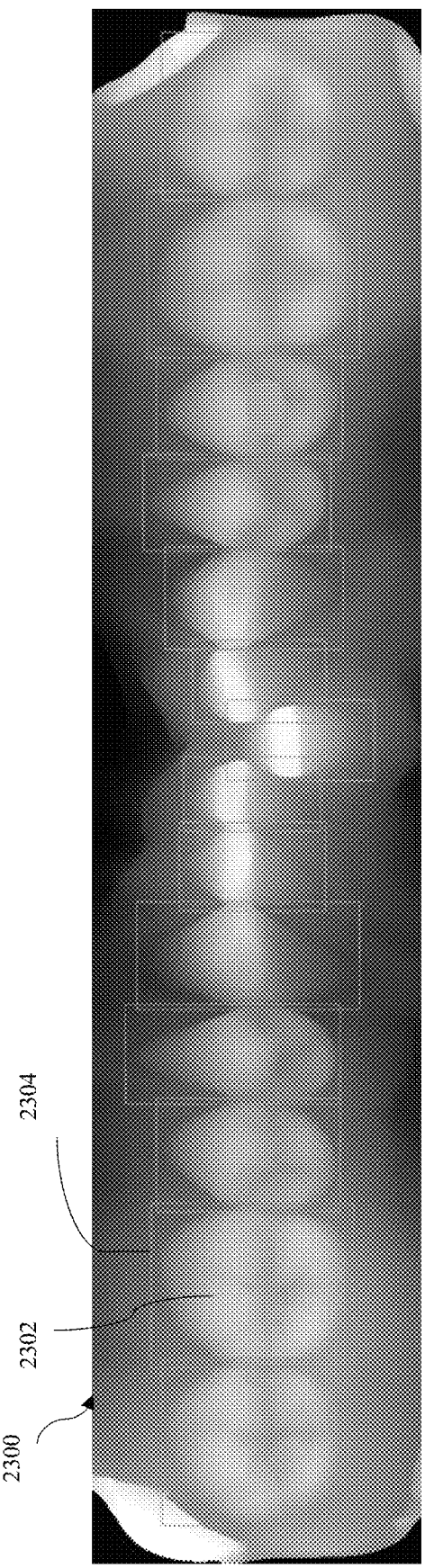
FIG. 23 illustrates a panoramic image generated by the computer-implemented method for a 3D digital dental model in some embodiments.

FIG. 22 illustrates an example a cross section of a virtual tooth 2202 having a long axis 2204 that intersects at the crown line point 2206 and the root line point 2208. A sample 2210, can intersect a digital surface of the virtual tooth 2202 at a first intersection point 2212 and a second intersection point 2214. The computer-implemented method can determine the second intersection point 2214 to be closer to the root line point 2208 and select the second intersection point 2214 for inclusion in the panoramic image. FIG. 23 illustrates a panoramic image generated by the computer-implemented method for a 3D digital dental model.

In some embodiments, advanced virtual tooth segment can include determining, using a trained neural network, a virtual bounding box for one or more virtual teeth in the panoramic image. In some embodiments, the trained neural network can be a panoramic image trained neural network. In some embodiments, the panoramic image trained neural network can be trained using a panoramic image trained dataset can include one or more panoramic images, each training panoramic image can include a virtual bounding box marked around at least one virtual tooth in the panoramic image. In some embodiments, the panoramic image trained dataset can be generated by a user who manually marks each virtual bounding box. In some embodiments, the neural network can be a YOLO neural network as described herein.

FIG. 23 illustrates a panoramic image 2300 having one or more virtual teeth after being input to a panoramic trained neural network such as a YOLO neural network, for example. Each virtual tooth in the panoramic image includes a virtual bounding region such as a virtual bounding box. For example, virtual tooth 2302 is localized by virtual bounding region 2304.

In some embodiments, the computer-implemented method of advanced virtual tooth segmentation can include performing an initial segmentation to generate a first segmented 3D digital dental model. In some embodiments, performing the initial segmentation can include performing two points segmentation on one or more virtual teeth in the 3D digital dental model using lingual and buccal points from one or more virtual bounding boxes in the panoramic image.

Figure 24A:
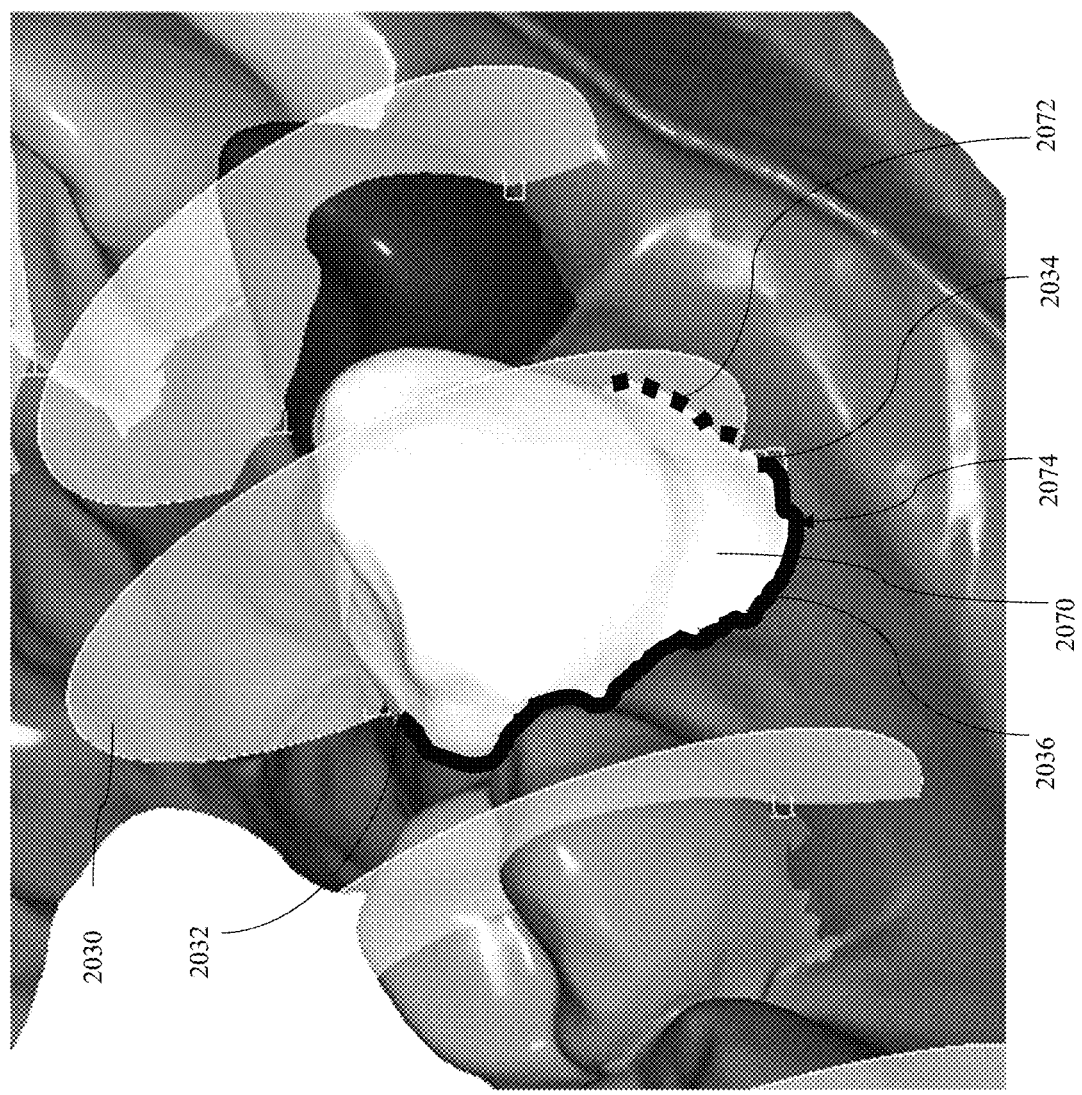
FIG. 24(a) illustrates an example of determining a lingual point and a buccal point for a plane in some embodiments.
Figure 24B:
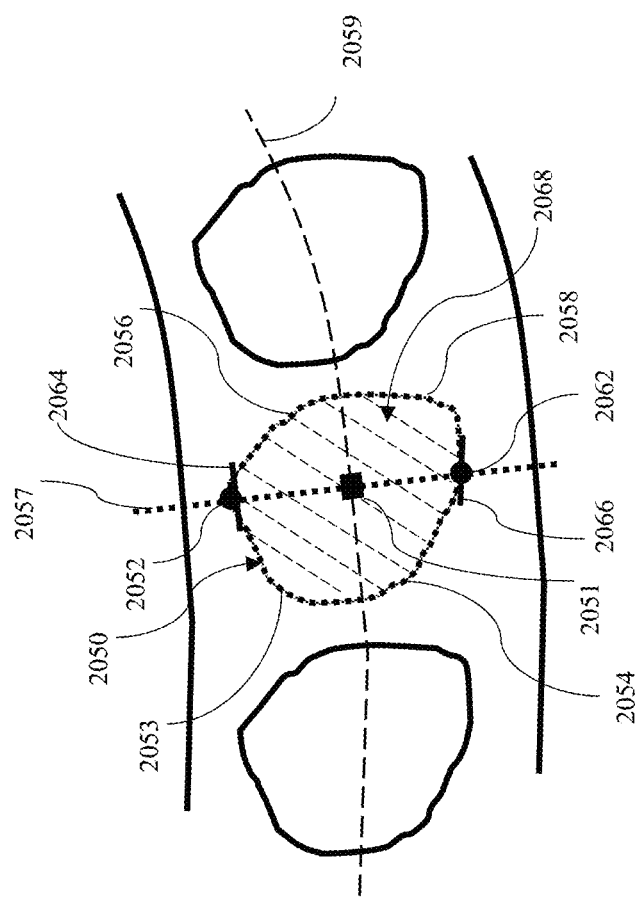
FIG. 24(b) illustrates a digital tooth having a center point in some embodiments.

One or more examples of two-point segmentation in some embodiments can be found in SEMI-AUTOMATIC TOOTH SEGMENTATION, U.S. patent application Ser. No. 16/778,406 of Nikolskiy et al., the entirety of which is hereby incorporated by reference. As illustrated in FIG. 24(a), for example, the computer-implemented method can, for each plane such as plane 2030 determine a lingual point such as lingual point 2032 and a buccal point such as buccal point 2034 where the plane 2030 intersects a first segment path such as first segment path 2036 and the second segment path such as second segment path 2072. FIG. 24(b) illustrates a digital tooth 2050 having a center point 2051 through which a crown line 2059 traverses. The computer-implemented method can construct a first path such as first path 2053 on a first side of a separation region such as separation region 2057 and a second path such as second path 2056 on a second side of the separation region 2057 to connect the lingual point 2052 and the buccal point 2062.

In some embodiments, the first segment path 2053 and second segment path 2056 can be determined using Dijkstra's shortest path algorithm known in the art, using either the facial point 2062 or the lingual point 2052 as the initial digital surface point, for example. In some embodiments, the computer-implemented method can determine the first segment path 2053 using the shortest path algorithm by evaluating only edges between digital surface points on the first side 2054 of the separation region 2057 for example. In some embodiments, the computer-implemented method can determine the second segment path 2056 using the shortest path algorithm by evaluating only edges between digital surface points on the second side 2058 as digital surface points, for example. In some embodiments, the computer-implemented method can perform the following, for example:

1. Set an initial digital surface point. In some embodiments, the initial digital surface point can be the facial point 2062. Alternatively, in some embodiments, the initial digital surface point can be the lingual point 2052.

2. Mark all digital surface points on one side of the separation region 2057 as unvisited. Generate an unvisited set of all unvisited digital surface points. In some embodiments, the one side can be the first side 2054. Alternatively, in some embodiments, the one side can be the second side 2058.

3. Assign every digital surface point on the one side a tentative distance value. The tentative distance value for the initial digital surface point is assigned to zero and the tentative distance value for all other digital surface points on the one side is assigned to infinity or the highest possible value or larger than the sum of all edge lengths, for example. Set the initial digital surface point as the current digital surface point.

4. For the current digital surface point, consider all unvisited neighboring digital surface points on the one side and determine their calculated tentative distances (e.g. edge length between the current digital surface point and the particular unvisited neighboring digital surface point) through the current digital surface point. In some embodiments, the calculated tentative distance can determine an edge length between current digital surface point and the particular unvisited neighboring digital surface point based on digital surface curvature. In some embodiments, the computer-implemented method can include an angle-dependent factor in determining an edge length, for example. For example, in some embodiments, the computer-implemented method can determine the tentative distance as follows:

$$f(e_i)=|e_i|\exp(k\cdot\sin\alpha_i), \text{ or } f(e_i)=|e_i|\exp(k\cdot\alpha_i)$$

where f ($e_i$) is the length of edge $e_i$ for the algorithm between the current digital surface point and the particular unvisited neighboring digital surface point, $|e_i|$ is Euclidean distance in 3D between two ends of the edge, k is a constant, such as 1.8 in some embodiments, for example. A greater magnitude of the constant k can lead to preferring paths going through regions of higher curvature. The sign of the constant can define which edges will be preferred by the algorithm: concave or convex, and $\alpha_i$ is dihedral angle of the triangular surface at edge $e_i$, sin $\alpha_i$ is the sine of that angle that can be, for example, computationally faster to find than $\alpha_i$ itself in some embodiments, for example. In some embodiments, $\alpha_i$ and/or sin $\alpha_i$ can be the angle-dependent factor, for example. The boundary between the tooth and the gum can have significantly higher curvature than the rest of the surface. With edge length $f(e_i)=|e_i|\exp(k\cdot\sin\alpha_i)$, the length of edges in the digital tooth-gum line boundary region is significantly smaller than in other regions. The computer-implemented method can accordingly determine the shortest path along the digital tooth-gum line junction.

5. Compare the newly calculated tentative distance to the current assigned value and assign the smaller one. For example, if the current digital surface point A is marked with a distance of 6, and the edge connecting it with a neighboring digital surface point B has length 2, then the distance to B through A will be 6+2=8. If B was previously marked with a distance greater than 8 then change it to 8. Otherwise, keep the current value.

6. After considering all of the unvisited neighbors of the current digital surface point, mark the current digital surface point as visited and remove it from the unvisited set. A visited digital surface point will never be checked again.

7. If the destination digital surface point has been marked visited (when planning a route between two specific digital surface points) or if the smallest tentative distance among the digital surface points in the unvisited set is infinity, or the highest possible value, or larger than the sum of all edge lengths for example (when planning a complete traversal; occurs when there is no connection between the initial digital surface point and remaining unvisited digital surface points), then stop. The algorithm has finished.

Otherwise, select the unvisited digital surface point that is marked with the smallest tentative distance, set it as the new "current digital surface point", and go back to step 4.

The algorithm can stop once the destination digital surface point has the smallest tentative distance among all "unvisited" digital surface points (and thus could be selected as the next "current").

The computer-implemented method can repeat the steps on the other side of the separation region 2057 (this can be performed simultaneously or sequentially). In this manner, the computer-implemented method can determine the first segment path 2053 along the first side 2054 and the second segment path 2056 along the second side 2058. The first segment path 2053 and the second segment path 2056 can be digital surface triangle edges in some embodiments for example.

In some embodiments, the first segment path 2053 connects to one side of the facial triangle edge 2066 and one side of the lingual triangle edge 2064. In some embodiments, the second segment path connects to the other side of the facial triangle edge 2066 and the other side of the lingual triangle edge 2064. The connected first segment path 2053, second segment path 2056, facial triangle edge 2066, and the lingual triangle edge 2064 together can form a boundary loop in some embodiments. The boundary loop can be closed in some embodiments, having an enclosed inner loop region 2068, for example.

In some embodiments, performing the initial segmentation can include performing two points segmentation for one or more virtual teeth in the 3D digital dental model to provide a virtual tooth contour of one more virtual teeth in the panoramic image. In some embodiments, performing two-point segmentation for at least one virtual tooth in the 3D digital dental model can include using lingual and buccal points obtained from the one or more bounding boxes in the panoramic image. In some embodiments, two points segmentation can include determining a lingual point for each virtual bounding box in the panoramic image. In some embodiments, determining the lingual point can include a surface location at the midpoint of the lingual edge of the bounding box. In some embodiments, the midpoint of the lingual edge can be the lower (lingual) edge of the bounding box in the panoramic image. In some embodiments, two points segmentation can include determining a buccal point for each virtual bounding box in the panoramic image. In some embodiments, determining the buccal point can include a surface location at the midpoint of the buccal edge of the bounding box. In some embodiments, the midpoint of the buccal edge can be the upper (buccal) edge of the bounding box in the panoramic image.

Figure 25:
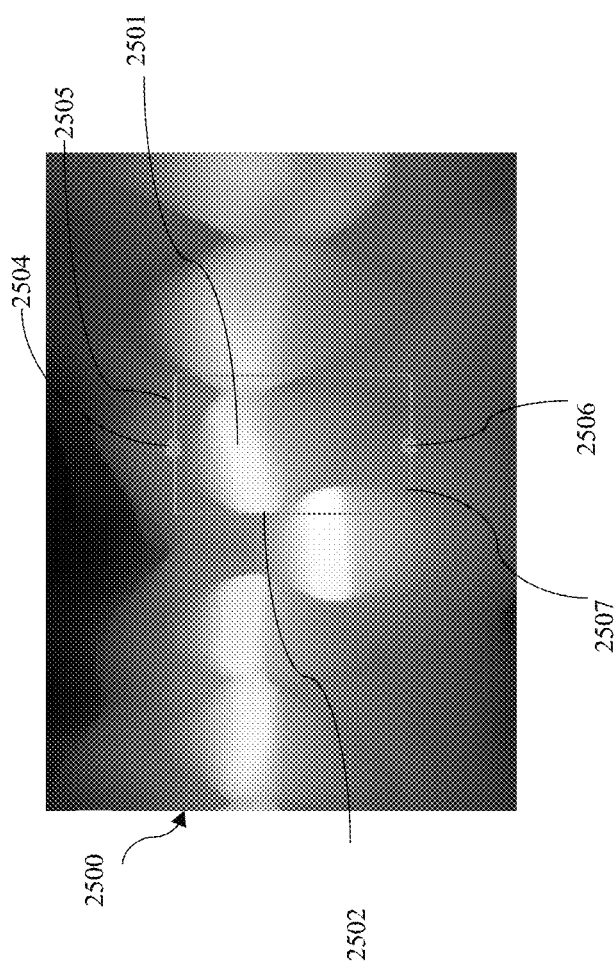
FIG. 25 illustrates an example of a portion of panoramic image that includes one or more virtual teeth such as virtual tooth having a bounding box determined by a neural network in some embodiments.

FIG. 25 illustrates an example of a portion of panoramic image 2500 that includes one or more virtual teeth such as virtual tooth 2501 having a bounding box 2502 determined by a neural network as described previously. The computer-implemented method can determine a buccal point 2504 as a midway point along a buccal edge 2505 and determine a lingual point 2506 as a midway point along lingual edge 2507.

In some embodiments, the two points segmentation can include limiting a virtual tooth contour to reside within an extended virtual bounding box in the panoramic image. In some embodiments, the extended virtual bounding box in the panoramic image for a particular virtual tooth can be determined by extending the bounding box by a user-configurable number of extension pixels. In some embodiments, the extended virtual bounding box excludes neighboring virtual teeth. In some embodiments, the user-configurable number of extension pixels can include any suitable value. In some embodiments, the user-configurable number of extension pixels can include 40 pixels on all sides of the bounding box. In some embodiments, the extended virtual bounding box can prevent combining two virtual teeth into a single segment.

Figure 26:
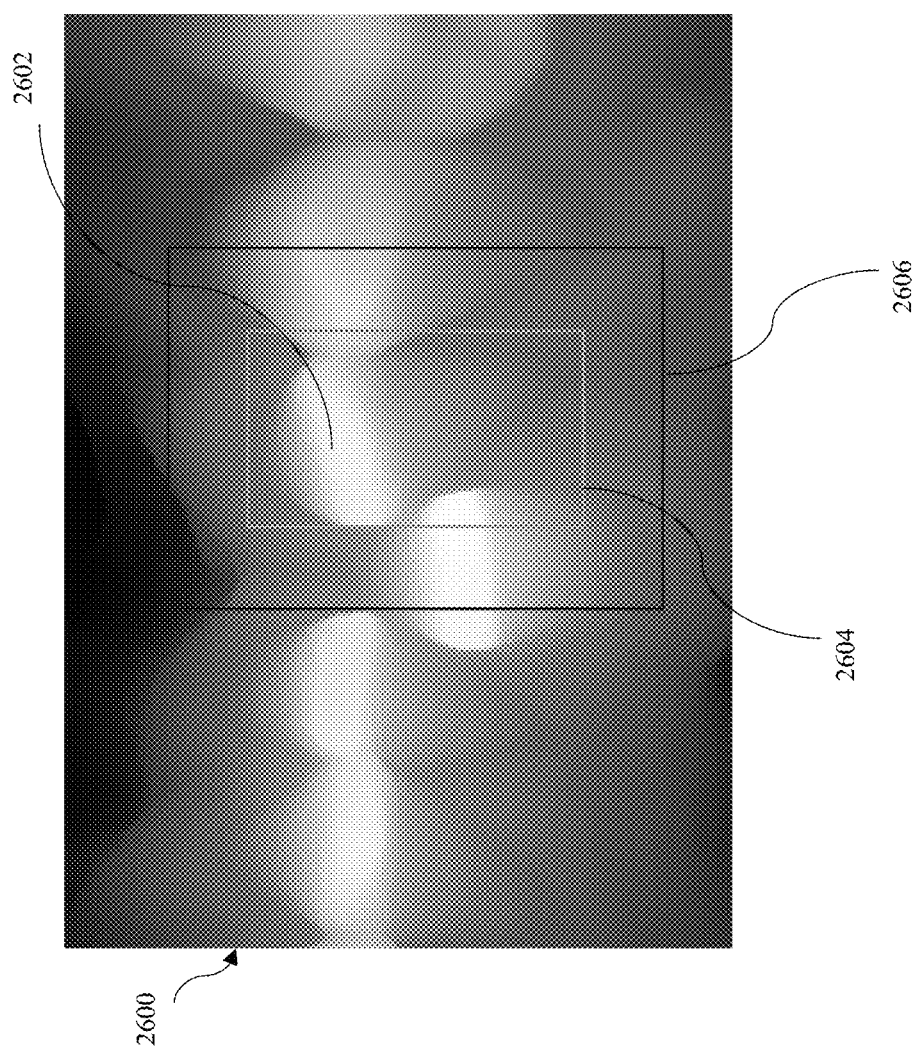
FIG. 26 illustrates an example of a portion of panoramic image that includes one or more virtual teeth such as virtual tooth surrounded by a virtual bounding region such as virtual bounding box in some embodiments.

FIG. 26 illustrates an example of a portion of panoramic image 2600 that includes one or more virtual teeth such as virtual tooth 2602 surrounded by a virtual bounding region such as virtual bounding box 2604. The computer-implemented method can determine an extended virtual bounding box such as extended virtual bounding box 2606.

In some embodiments, the extended virtual bounding box from the panoramic image can be used to define four planes in the 3D digital dental model of the virtual tooth. In some embodiments, one or more digital surface triangle edges of the four planes around the virtual tooth in the 3D digital dental model receive large weight values to prevent two point segmentation from crossing any of the four planes. The initial segmentation further can include defining four limiting planes for a virtual tooth in the 3D digital dental model that must contain the virtual tooth.

Figure 27:
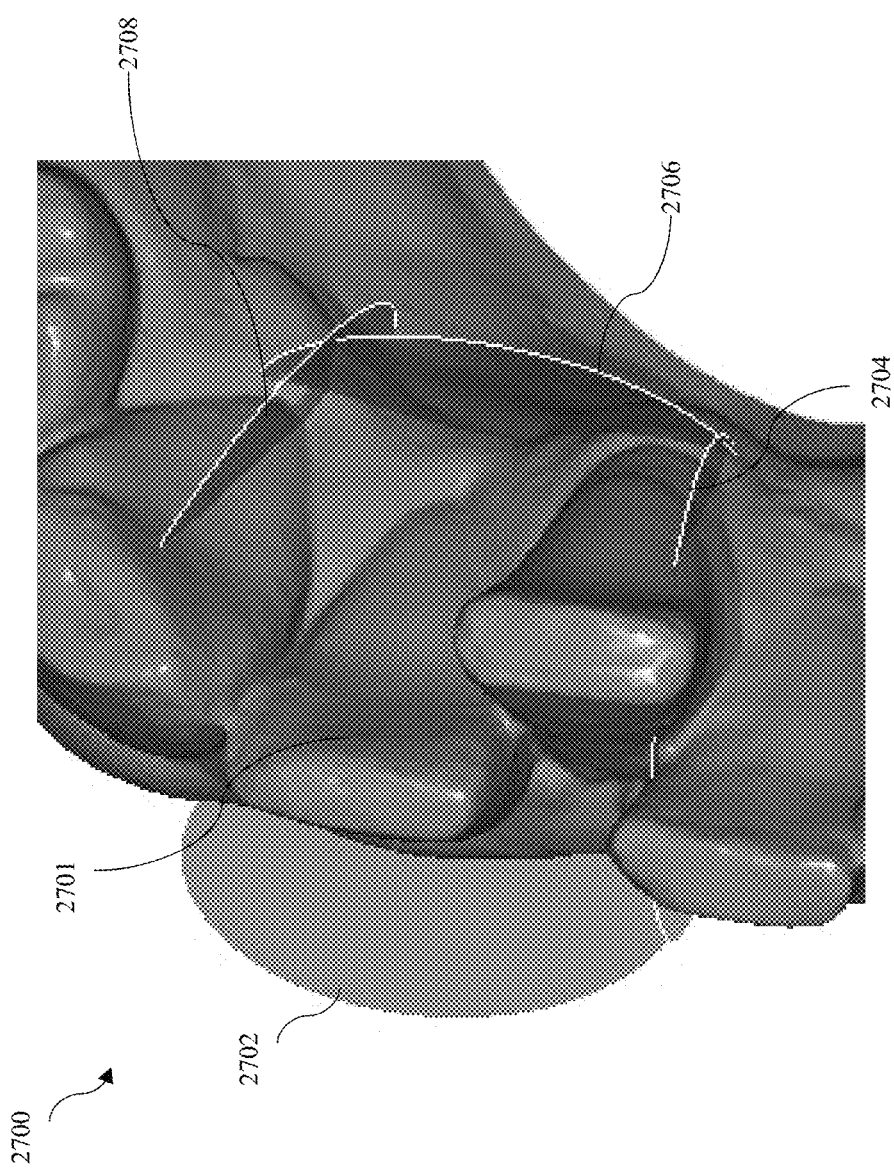
FIG. 27 illustrates an example of a portion of a 3D digital dental model with a virtual tooth bound by one or more planes in some embodiments.

FIG. 27 illustrates an example of a portion of a 3D digital dental model 2700 with a virtual tooth 2701. The virtual tooth 2701 is bound by a first plane 2702, a second plane 2704, a third plane 2706, and a fourth plane 2708. The computer-implemented method can generate each plane from the extended virtual bounding box in the panoramic image.

In some embodiments, the limiting planes are defined on the extended virtual bounding box for a virtual tooth as a left plane can include two left corner rays, a right plane can include two right corner rays, a labial plane can include a ray corresponding to an upper (buccal) middle extended virtual bounding box point and parallel to the crown line, and a lingual plane can include a ray corresponding to a lower (lingual) middle box point and parallel to the crown line.

Figure 28:
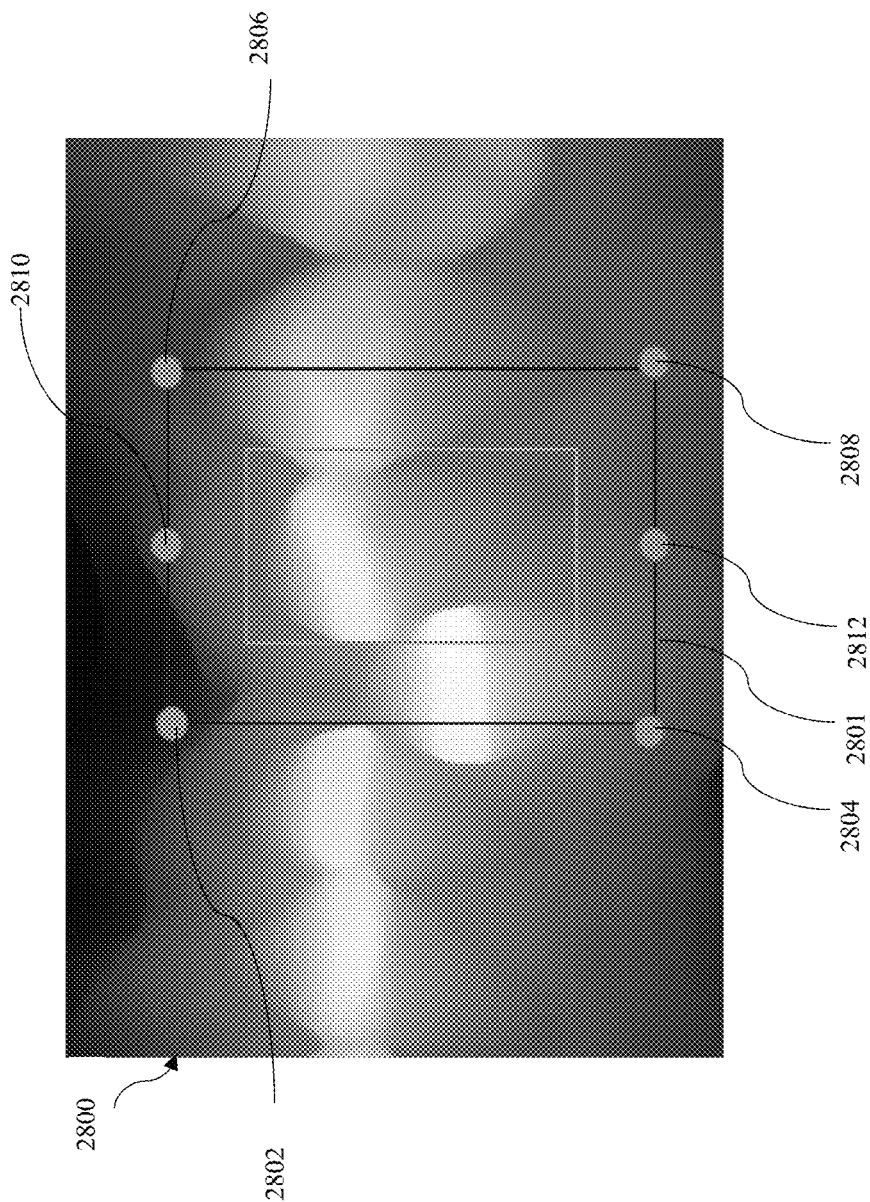
FIG. 28 illustrates an example of a portion of a panoramic image having an extended virtual boundary region in some embodiments.

FIG. 28 illustrates an example of a portion of a panoramic image 2800 having an extended virtual boundary region 2801. The computer-implemented method can determine a left plane by first corner ray 2802 and second corner ray 2804. The computer-implemented method can determine a right plane by third corner ray 2806 and fourth corner ray 2808. The computer-implemented method can determine a labial plane as one containing a labial ray 2810 and parallel to the crown line (not shown). The computer-implemented method can determine a lingual plane as one containing a lingual ray 2812 and parallel to the crown line (not shown).

In some embodiments, the computer-implemented method performing two points segmentation can exclude left and right paths from a center exclusion region of each virtual bounding box in the panoramic image. In some embodiments, determining the center exclusion region can include reducing one or more virtual bounding boxes by a user-configurable reduction amount to provide a reduced virtual bounding box. In some embodiments, the reduction amount can be any amount. In some embodiments, the reduction amount can be 65% as one example. However, any suitable reduction value can be used, and is not limited to the amount disclosed herein. In some embodiments, determining the center exclusion region can include reducing one or more virtual bounding boxes until the reduced virtual bounding box does not intersect with any other virtual bounding box. In some embodiments, determining the center exclusion region further can include determining a circular region having a center at the center of the reduced virtual bounding box and a radius of ½ a width of the reduced virtual bounding box. In some embodiments, a height of the reduced virtual bounding box can be greater than a width of the reduced virtual bounding box. In some embodiments, excluding left and right paths from the center exclusion region advantageously prevents splitting a single virtual tooth into two segments. In some embodiments, excluding left and right paths from the center exclusion region can advantageously prevent splitting can occur for virtual teeth having deep features, such as molar teeth, for example.

Figure 29:
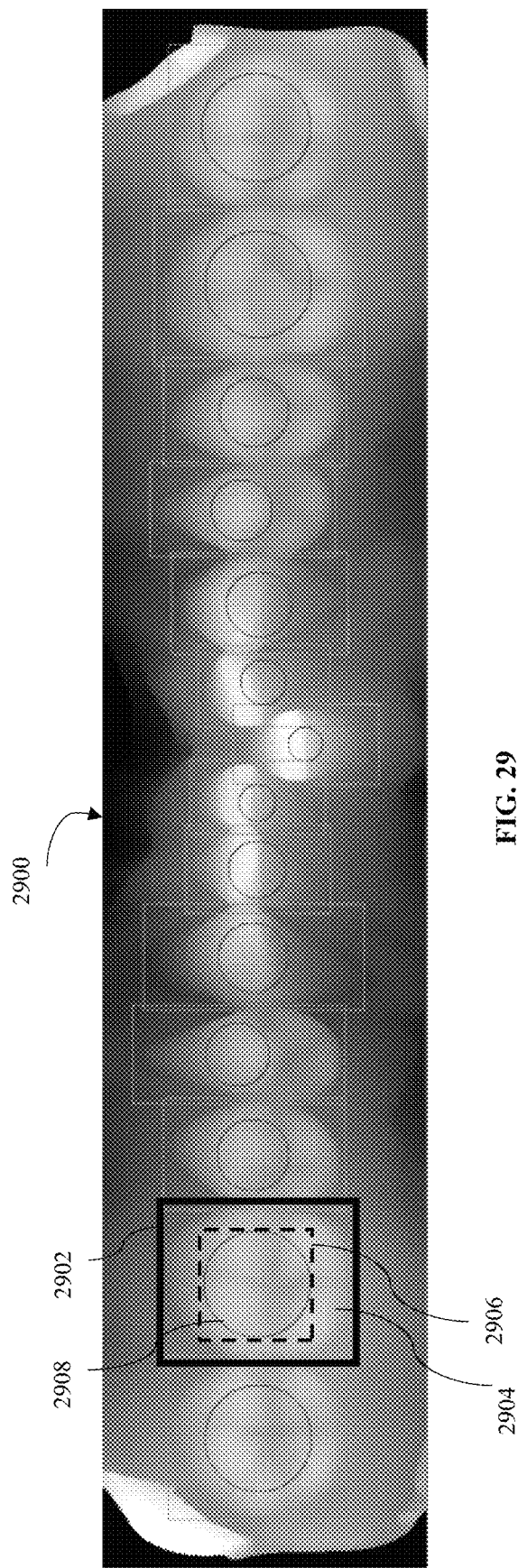
FIG. 29 illustrates a panoramic image illustrating one or more virtual teeth. Also shown are virtual bounding regions such as a virtual bounding box around a virtual tooth in some embodiments.

FIG. 29 illustrates a panoramic image 2900 illustrating one or more virtual teeth. Also shown are virtual bounding regions such as a virtual bounding box 2902 around a virtual tooth 2904. In the example, the computer-implemented method shrinks or reduces the virtual bounding box 2902 down to provide a reduced virtual bounding box 2906. The computer-implemented method can determine a center exclusion region 2908 in the example as a circular region or other shape within reduced virtual bounding box 2906.

Figure 30:
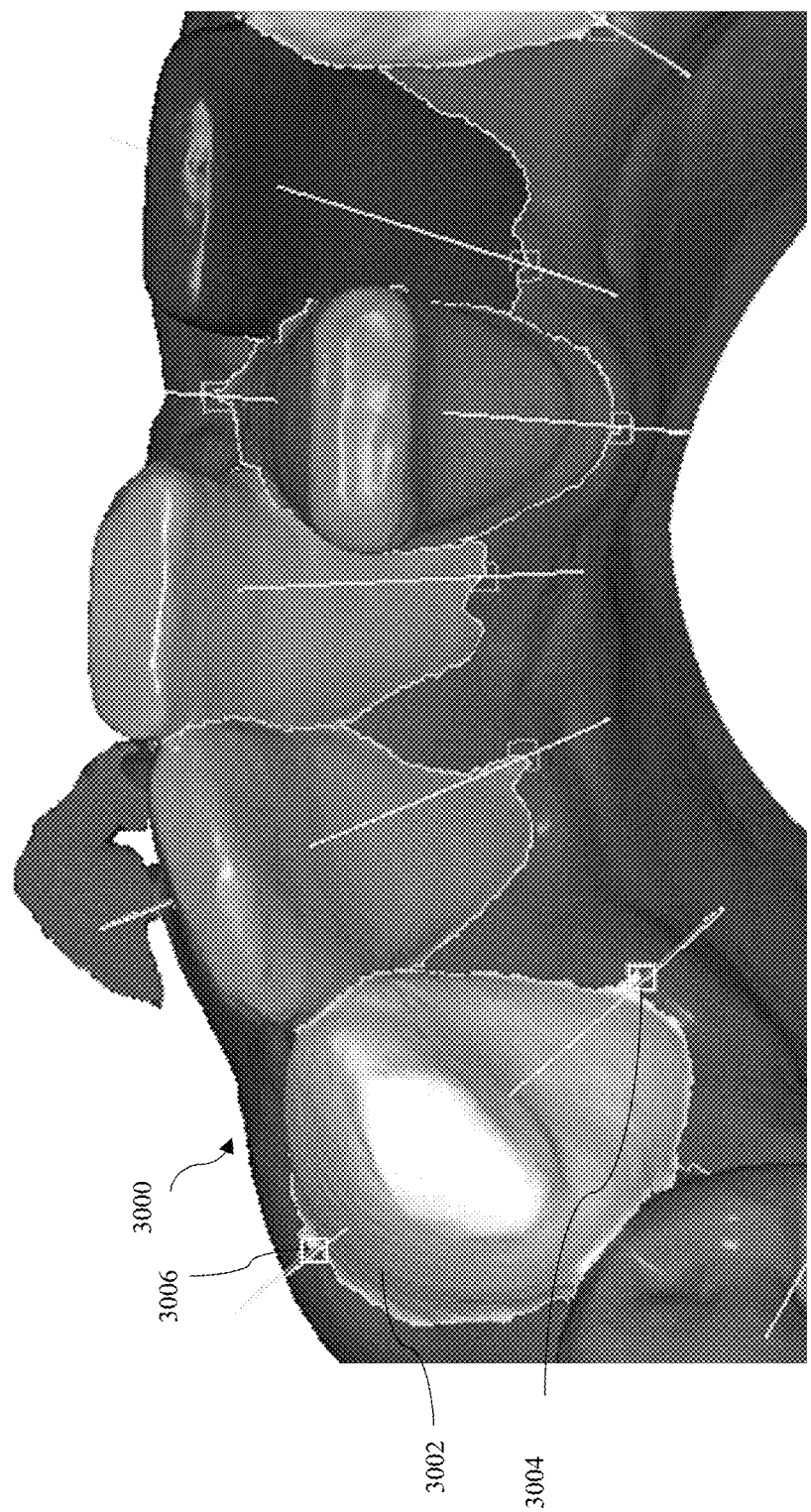
FIG. 30 illustrates a 3D digital dental model after initial segmentation in some embodiments.

FIG. 30 illustrates a 3D digital dental model 3000 after initial segmentation. The initial segmentation can provide one or more initially segmented virtual teeth such as initially segmented virtual tooth 3002. The initially segmented virtual tooth 3002 can be further segmented to adjust lingual and buccal points, such as lingual point 3004 and buccal point 3006 for virtual tooth 3002, to further refine segmentation and adjust any potential inaccuracies.

In some embodiments, the computer-implemented method of advanced virtual tooth segmentation can include performing final segmentation of the first segmented 3D digital dental model to generate a final segmented 3D digital dental model. In some embodiments, performing final segmentation of the first segmented 3D digital dental model can include determining an adjusted lingual point and an adjusted buccal point for one or more virtual bounding boxes in the panoramic image. In some embodiments, determining the adjusted lingual point and the adjusted buccal point can include determining first and second intersection points between a horizontal line passing through a virtual bounding box and the virtual tooth contour of a virtual tooth in the panoramic image. In some embodiments, the horizontal line can pass through a virtual tooth box center. In some embodiments, the horizontal line can be shifted toward the lingual side by a user-configurable shift value. In some embodiments, determining the adjusted lingual point and the adjusted buccal point can include determining a shortest compound path that can include a first path between the first intersection point and an intermediate point and a second path between the second intersection point and the intermediate point. In some embodiments, the first path and the second path are determined using two point segmentation on the 3D digital dental model as described in the present disclosure. In some embodiments, the adjusted lingual point can include an intermediate point on the lowest edge (lingual edge) of the virtual bounding box that provides the shortest compound lingual path. In some embodiments, the adjusted buccal point can include an intermediate point on the upper most edge (buccal edge) of the virtual bounding box that provides a shortest compound buccal path. In some embodiments, determining adjusted lingual and adjusted buccal points can advantageously improve accuracy in segmentation, for example.

Figure 31:
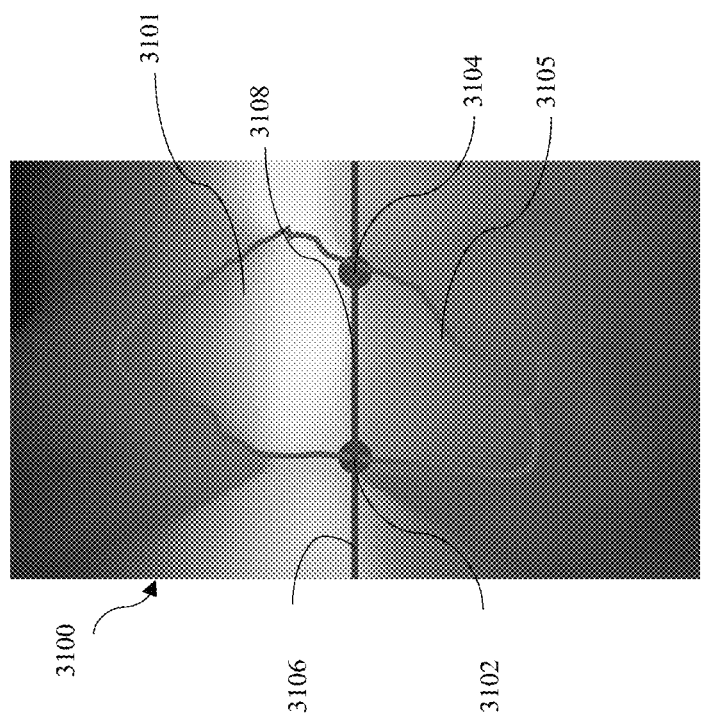
FIG. 31 illustrates an example of a portion of a panoramic image including a virtual tooth and intersection points between a virtual tooth contour and a horizontal line in some embodiments.

FIG. 31 illustrates an example of a portion of a panoramic image 3100 including one or more virtual teeth, such as virtual tooth 3101. The computer-implemented method can determine a first intersection point 3102 and a second intersection point 3104 with a virtual tooth contour 3105 along a horizontal line 3106 passing through the virtual tooth center 3108.

Figure 32:
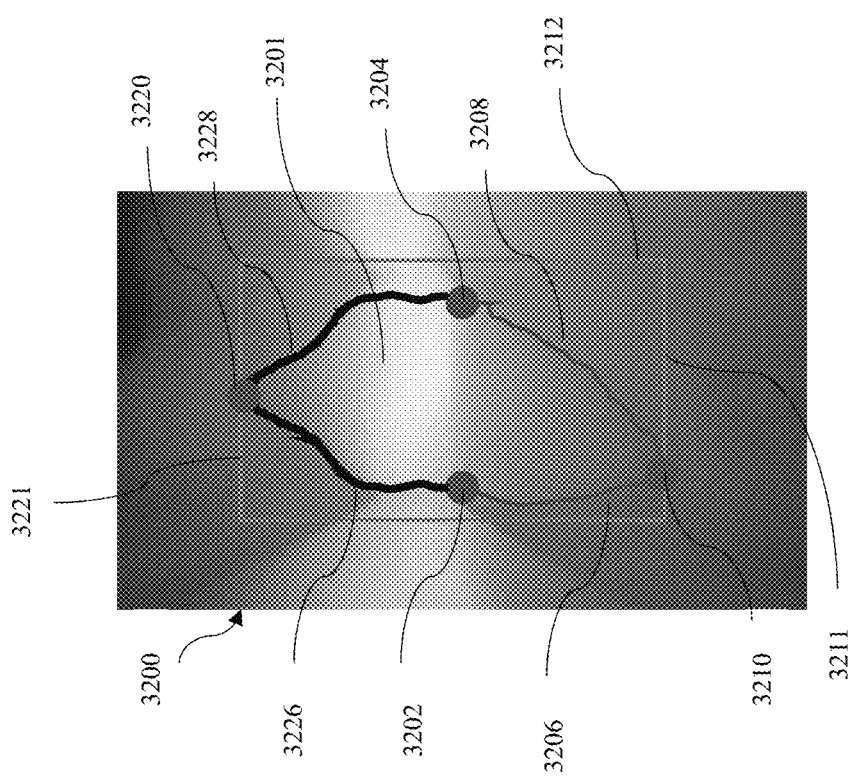
FIG. 32 illustrates an example of a portion of a panoramic image including one or more virtual teeth and determining intermediate buccal and lingual points in some embodiments.

FIG. 32 illustrates an example of a portion of a panoramic image 3200 including one or more virtual teeth such as virtual tooth 3201 having a first intersection point 3202 and a second intersection point 3204. The computer-implemented method can determine first lingual path 3206 and second lingual path 3208 using two point segmentation on the 3D digital dental model as described previously between one or more intermediary points and determine the intermediary point forming the shortest compound path. In this example, the first intersection point 3202 and the second intersection point 3204 form the shortest compound path together for intermediate lingual point 3210 that is on the lowest or lingual edge 3211 of a virtual bounding box 3212 for the virtual tooth 3201.

The computer-implemented method can determine first buccal path 3226 and second buccal path 3228 using two point segmentation on the 3D digital dental model as described previously between one or more intermediary points and determine the intermediary point forming the shortest compound path. In this example, the first intersection point 3202 and the second intersection point 3204 form the shortest compound path together for intermediate buccal point 3220 that is on the lowest or buccal edge 3221 of a virtual bounding box 3212 for the virtual tooth 3201.

In some embodiments, performing final segmentation can include updating the virtual tooth contour to an adjusted virtual tooth contour include the shortest compound lingual path and the shortest compound buccal path for one or more virtual teeth in the 3D digital dental model.

Figure 33:
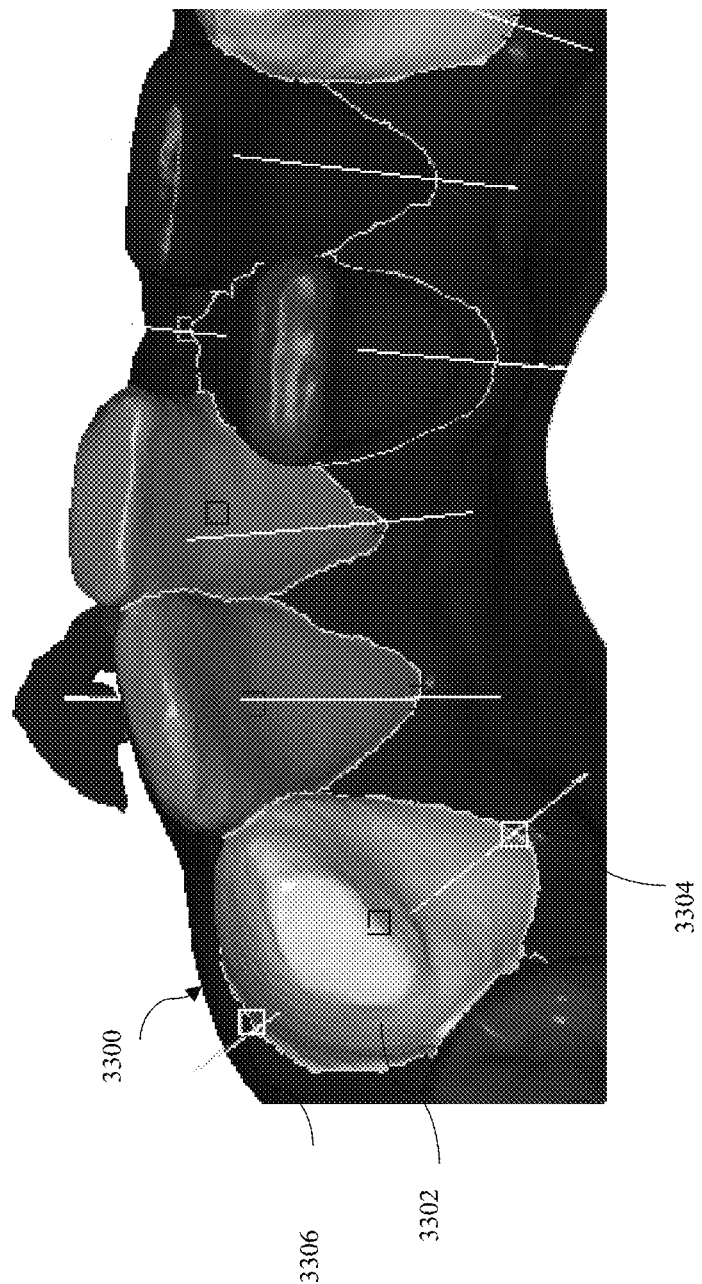
FIG. 33 illustrates an example of a 3D digital dental model after final segmentation in some embodiments.

FIG. 33 illustrates an example of a 3D digital dental model 3300 after final segmentation. The final segmentation can provide one or more segmented virtual teeth such as segmented virtual tooth 3302. The segmented virtual tooth 3302 can include adjusted lingual and buccal points, such as adjusted lingual point 3304 and adjusted buccal point 3306 for virtual tooth 3302.

In some embodiments, the computer-implemented method of advanced virtual tooth segmentation can include identifying one or more virtual teeth in the final segmented 3D digital dental model. In some embodiments, identifying one or more virtual teeth can include providing a unique identifier for one or more virtual teeth. In some embodiments, the unique identifiers can each include any value. In some embodiments, virtual tooth identification can be based on dental types.

For example, since typically there are less than 16 teeth in digital jaw surface, some embodiments can give unique identifier for each tooth segment from the list.

In some embodiments, the unique identifiers can be as follows:

1—right $3^{rd}$ molar, 2—right $2^{nd}$ molar, 3—right $1^{st}$ molar
4—right $2^{nd}$ premolar, 5—right $1^{st}$ premolar
6—right canine 7—right lateral incisor, 8—right central incisor
9—left central incisor, 10—left lateral incisor
11—left canine
12—left $1^{st}$ premolar, 13—left $2^{nd}$ premolar
14—left $1^{st}$ molar, 15—left $2^{nd}$ molar, 16—left $3^{rd}$ molar In some embodiments, virtual tooth identification can include sorting segments along the dental arch, or equivalently sort segments from left to right in a panoramic image.

In some embodiments, virtual tooth identification in the 3D digital dental model can include, for example defining a penalty of each segment to be a specific dental tooth type $-p_i(s_j)$. A minus penalty can be used because these penalties are frequently negative, where i in [1,16] and $s_j$ is one of the found virtual tooth segments. For example, $-p_4(s_j)$ is the penalty of the segment $s_j$ to be right $2^{nd}$ premolar, and $-p_{11}(s_j)$ is the penalty of the segment $s_1$ to be left canine.

In some embodiments, virtual tooth identification can include defining a penalty for tooth type change $t_{i,k}(s_j)$ where i is the tooth type of this segment and k in [1,16] is the type of the next segment, where $t_{0,k}(s_0)$ is the penalty for identifying the first segment as tooth type k (skipping types before k), and $t_{i,17}(s_{n_s})$ is the penalty for identifying the last segment tooth type i (skipping types after i). One simple approach can be to set $t_{i,k}(s_j)=0$ for allowing skipping of any virtual tooth id, which works but with certain amount of misidentification where teeth are missing.

In some embodiments, the computer-implemented method can include using a matrix. For example, some embodiments can include identifying one or more virtual teeth by forming a rectangular matrix M with 16 rows and $n_s$ columns, filling a first column $M_{i,1}=1-p_i(s_1)+t_{0i}(s_0)$, filling all other columns j from 2 to $n_s$:

$M_{i,j}=B$, if i<j, where B is a big value, otherwise if i≥j:

$$M_{i,j} = 1 - p_i(s_j) + \min_{k \in [j-1, i-1]} (M_{k,j-1} + t_{ki}(s_{j-1})).$$

After filling matrix M, segment ids can be given as follows
Let i=17, j=$n_s$
While j>0 do $$k = \arg\min_{k \in [j, i-1]} (M_{k,j} + t_{k,i}(s_j))$$

set id k to segment j
j=j-1, i=k

Described method follows dynamic programming decision making and selects unique tooth ids with minimal summed penalty, which is:

$$T = \min_{k \in [n_s, 16]} \left( M_{k, n_s} + t_{k,17}(s_{n_s}) \right)$$

In some embodiments, the computer-implemented method can identify one or more virtual teeth by using a virtual tooth area. For example, in some embodiments, the computer-implemented method can define directed area of a triangle be the vector having the direction of triangle's normal and magnitude of triangle's area. Then a directed area of a segment is the sum of directed areas of all its triangles—also a vector. For each tooth segment $s_j$ find its directed area, and dot product it with the long axis direction to get a scalar $\alpha_j$. Another option is to use simple area of the segment as $a_j$. Compute average segment area $$\langle a \rangle = \frac{1}{n_s} \Sigma_j a_j.$$

For each tooth segment find relative segment area $$r_j = \frac{a_j}{\langle a \rangle}.$$

In some embodiments, the computer-implemented method can use a simple area model. This model is based on simple fact that molars have area more than other teeth. Molar probability can be defined as $p_1=p_2=p_3=p_{14}\times p_{15}=p_{16}=\text{clamp}(1.5r_j-1.3, 0, 1)$, and the probability of being any other tooth is $p_4= \ldots =p_{13}=1-p_1$.

In some embodiments, the computer-implemented method can use a complex area model. The complex area model can be an extension of the simple area model, built using statistics of multiple virtual jaw models. One example of statistics for virtual upper jaw models in some embodiments can include, for example:
.molar={1.552832284, 0.165052813},
.premolar={0.860978916, 0.068913103},
.canine={0.797482149, 0.059543358},
.lateral={0.554468595, 0.06439171},
.central={0.779110702, 0.067114369}

One example of statistics for virtual lower jaw models in some embodiments can include, for example:
.molar={1.758981462, 0.154279959},
.premolar={0.866963754, 0.082213893},
.canine={0.71797465, 0.067208723},
.lateral={0.504533908, 0.053313743},
.central={0.444054105, 0.045245606}

The statistics for the virtual upper jaw models and the lower jaw models are example values; other values can be used/determined, and the disclosure is not limited to these values.

The first number in the statistics for the virtual upper jaw and the virtual lower jaw is the average relative tooth area m of some dental type, and the second number is the standard deviation a of the relative tooth area of that dental type. If it is not known whether the virtual jaw is a virtual upper jaw or a virtual lower jaw, then the computer-implemented method can perform two virtual tooth identifications (as if it were an upper jaw, and as if it were a lower jaw), and select the identification with smaller minimal summed penalty T.

In a complex area model, the computer implemented method performs the following, for example:
Let $$P_{molar} = 10\max(0, \min(1, \frac{r - m_{premolar}}{m_{molar} - m_{premolar}})),$$

so $p_{molar}$ is zero if the segment relative area is less than average area of a premolar, and 10 if it is more than average area of a molar.

$p_3=p_{14}=p_{molar}$
$p_2=p_{15}=0.99\ p_3$
$p_1=p_{16}=0.99\ p_2$

The values are decreasing because if the jaw misses a $2^{nd}$ or a $3^{rd}$ molar, the algorithm will not identify first molar as one of missing molars.

Compute model probability for each dental type i:

$$x_i = \frac{1}{\sqrt{2\pi}\sigma} e^{-\frac{(r-m)^2}{2\sigma^2}};$$

$p_5=p_{12}=10 p_{molar}+x_{premolar}$;
$p_4=p_{13}=10-p_{molar}+0.1 x_{premolar}$; if some not-molar tooth is missing then most likely it is a 2nd premolar;
$p_6=p_{11}=10-p_{molar}+x_{canine}$;
$p_7=p_{10}=10-p_{molar}+x_{lateral}$;
$p_8=p_9=10\ p_{molar}+x_{central}$;

In some embodiments, the computer-implemented method can perform virtual tooth identification using a space-depending penalty of virtual tooth type change as follows:

Compute the space $d_j$ in between every consecutive pair of segments $s_j$ and $s_{j+1}$. Then, for example, $$t_{i,i+1}(s_j) = 5\min\left(\frac{d_j}{7.5\ \text{mm}}, 1\right)$$

—penalty for setting consecutive dental types grows with the space.

$$t_{i,k>i+1}(s_j) = 5\left(1 - \min\left(\frac{d_j}{7.5\ \text{mm}}, 1\right)\right)$$

—penalty for skipping a dental type i+1 decreases with more space between segments.

$t_{2,4}(s_j)=0$, $t_{11,13}(s_j)=0$—no penalty for skipping left and right $2^{nd}$ premolars (with dental types 3 and 12), since they are frequently deleted without any space left.

One or more advantages can include, but are not limited to: the features can be based on two calls to YOLO-type neural network rather than to per-pixel segmenting networks. Neural networks can be much lighter, faster and easier to train, for example. One or more advantages of one or more features described herein can include, for example, a fully automatic way to determine the trim-line for any 3D digital dental model. One or more advantages of one or more features described herein can include, for example, no manual intervention by a technician. One or more advantages of one or more features described herein can include, for example, faster determination of the trim-line and more accurate results. One or more advantages of one or more features described herein can include, for example, consistent results, which can be important for many-stage aligners. One or more advantages of one or more features described herein can include, for example, receiving input from treatment planning software for better quality and higher performance. One or more advantages of one or more features described herein can include, for example, increased speed due to post-processing. One or more advantages of one or more features described herein can include, for example, application to both to full arch and quadrant scans. One or more advantages of one or more features described herein can include, for example, tolerance for extra material (e.g. soft tissues present in intra-oral scans). One or more advantages of one or more features described herein can include, for example, not only segmentation of a 3D digital model having not only normal teeth, but also prepared teeth, very worn teeth, and dental abutments. One or more advantages of one or more features described herein can include, for example, not requiring single boundary of the mesh or absence of handles/tunnels. One or more advantages of one or more features described herein can include, for example, the one or more virtual teeth can be segmented automatically in some embodiments.

Some embodiments can include, for example, one or more features in various combinations. One or more features can be performed by a computer-implemented method, by a system having a processor and a non-transitory computer-readable storage medium comprising instructions executable by the processor to perform one or more steps, and/or a non-transitory computer readable medium storing executable computer program instructions to determine a trim line for an aligner, the computer program instructions comprising instructions to perform one or more features/steps.

Figure 34:
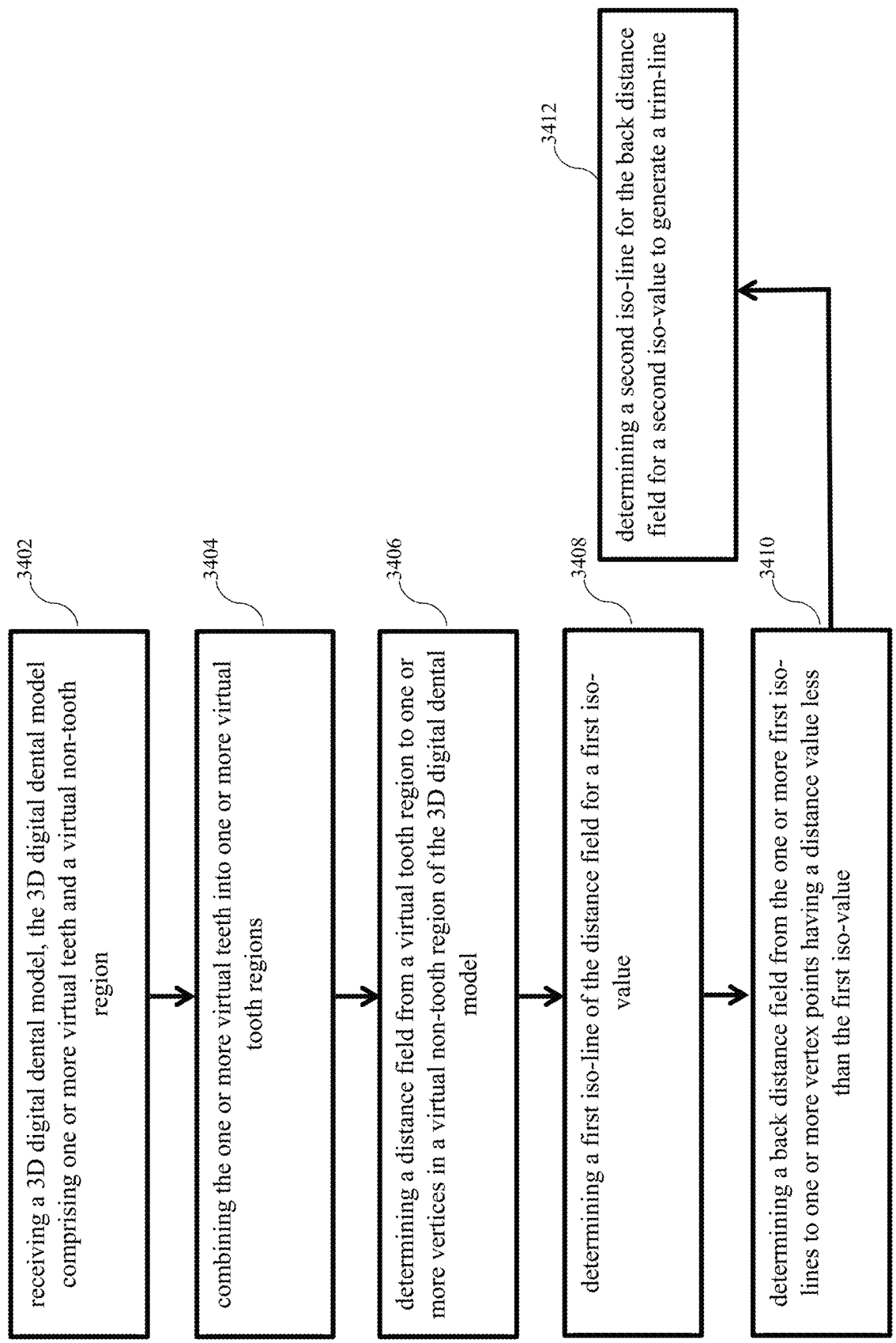
FIG. 34 illustrates an example flowchart of determining a trim line for an aligner in some embodiments.

For example, as illustrated in FIG. 34, some embodiments can include a method/system/non-transitory medium storing instructions to determine a trim line that can include receiving a 3D digital dental model, the 3D digital dental model having one or more virtual teeth and a virtual non-tooth region at 3402; combining the one or more virtual teeth into one or more virtual tooth regions at 3404; determining a distance field from a virtual tooth region to one or more vertices in a virtual non-tooth region of the 3D digital dental model at 3406; determining a first iso-line of the distance field for a first iso-value at 3408; determining a back distance field from the one or more first iso-lines to one or more vertex points having a distance value less than the first iso-value at 3410; and determining a second iso-line for the back distance field for a second iso-value to generate a trim-line at 3412. The method/system/non-transitory medium storing instructions can further include combining the one or more virtual tooth regions together to form a final virtual tooth region. The distance field can include one or more distance values, each distance value a distance from the virtual tooth region to a vertex in the virtual non-tooth region. Determining an iso-line of the distance field for the first iso-value can include determining one or more digital surface triangles having vertices with distance values both below and above the first iso-value. The method can further include constructing one or more first iso-line segments for the digital surface triangles having vertices with distance values both below and above the first iso-value. Determining the second iso-line of the back distance field can include determining one or more digital surface triangles having vertices with distance values both below and above the second iso-value. The method can include constructing one or more second iso-line segments for the digital surface triangles having vertices with distance values both below and above the second iso-value.

Figure 35:
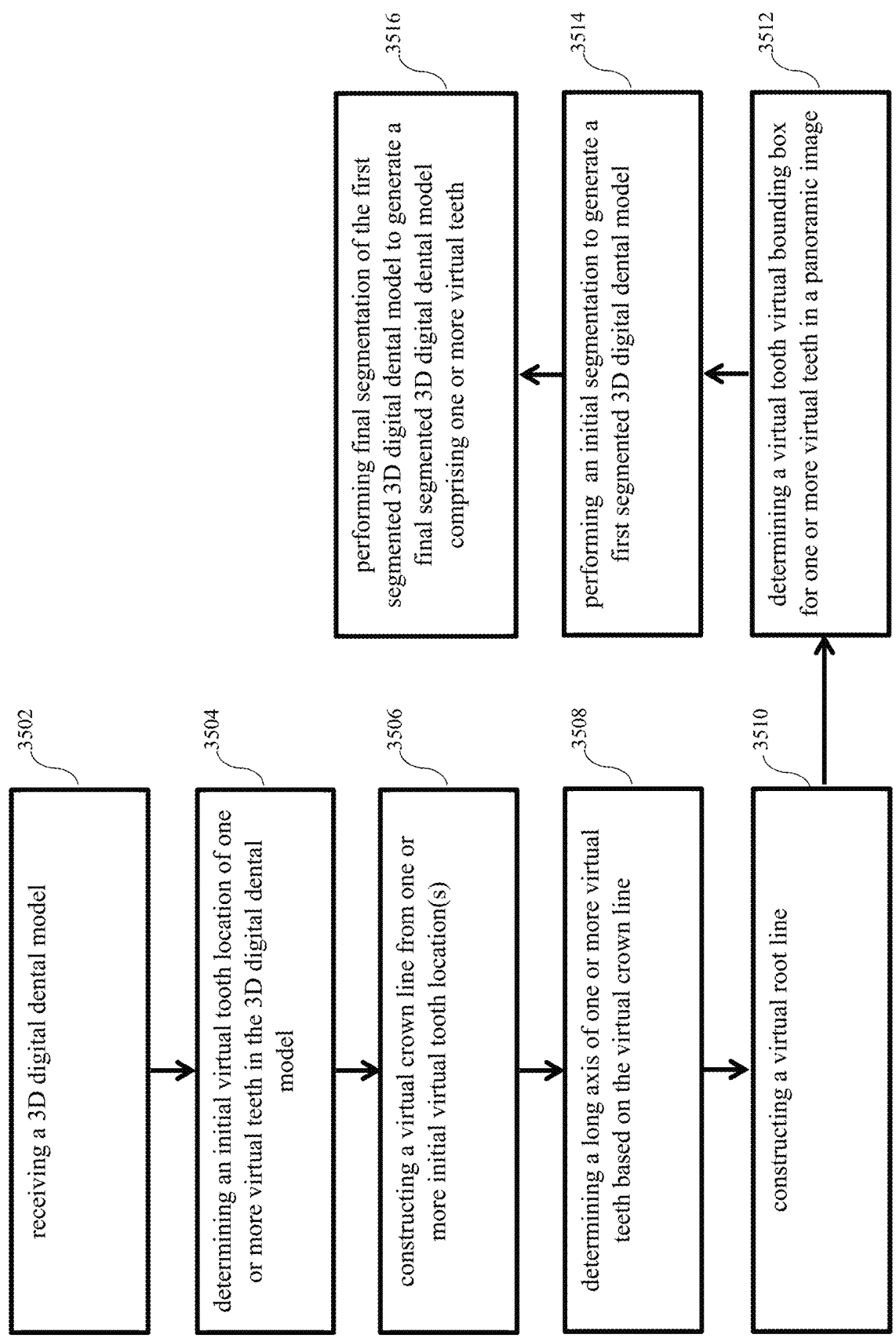
FIG. 35 illustrates an example flowchart of segmenting an unsegmented 3D digital dental model in some embodiments.

In another example, as illustrated in FIG. 35, some embodiments can include a method/system/non-transitory medium storing instructions for segmenting the 3D digital dental model that can include, for example, receiving a 3D digital dental model at 3502; determining an initial virtual tooth location of one or more virtual teeth in the 3D digital dental model at 3504; constructing a virtual crown line from one or more initial virtual tooth location(s) at 3506; determining a long axis of one or more virtual teeth based on the virtual crown line at 3508; constructing a virtual root line at 3510; determining a virtual tooth virtual bounding box for one or more virtual teeth in a panoramic image at 3512; performing an initial segmentation to generate a first segmented 3D digital dental model at 3514; performing final segmentation of the first segmented 3D digital dental model to generate a final segmented 3D digital dental model comprising one or more virtual teeth at 3516. The method/system/non-transitory medium storing instructions can include combining the one or more virtual teeth into one or more virtual tooth regions; determining a distance field from the single virtual tooth region to one or more vertices in a virtual non-tooth region of the 3D digital dental model; determining an iso-line of the distance field for a first iso-value; determining a back distance of each iso-line to one or more vertex points having a distance less than the first iso-value; determining an iso-line of the distance field for a second iso-value to generate a trim-line. Determining the initial virtual tooth location of one or more virtual teeth can include determining, using a first trained neural network, a virtual bounding box for one or more virtual teeth in a depth map of the 3D digital dental model. Determining a virtual tooth center from each virtual bounding box. The virtual crown line can be determined by a spline passing through one or more virtual tooth centers to form a convex hull. Determining the virtual tooth virtual bounding box for one or more virtual teeth in a panoramic image can include determining, using a second trained neural network, the virtual bounding box for one or more virtual teeth in the panoramic image. Performing the initial segmentation can include performing two points segmentation on the 3D digital dental model using lingual and buccal points from one or more virtual bounding boxes in the panoramic image. Performing final segmentation of the first segmented 3D digital dental model can include determining an adjusted lingual point and an adjusted buccal point for one or more virtual bounding boxes in the panoramic image.

Figure 36:
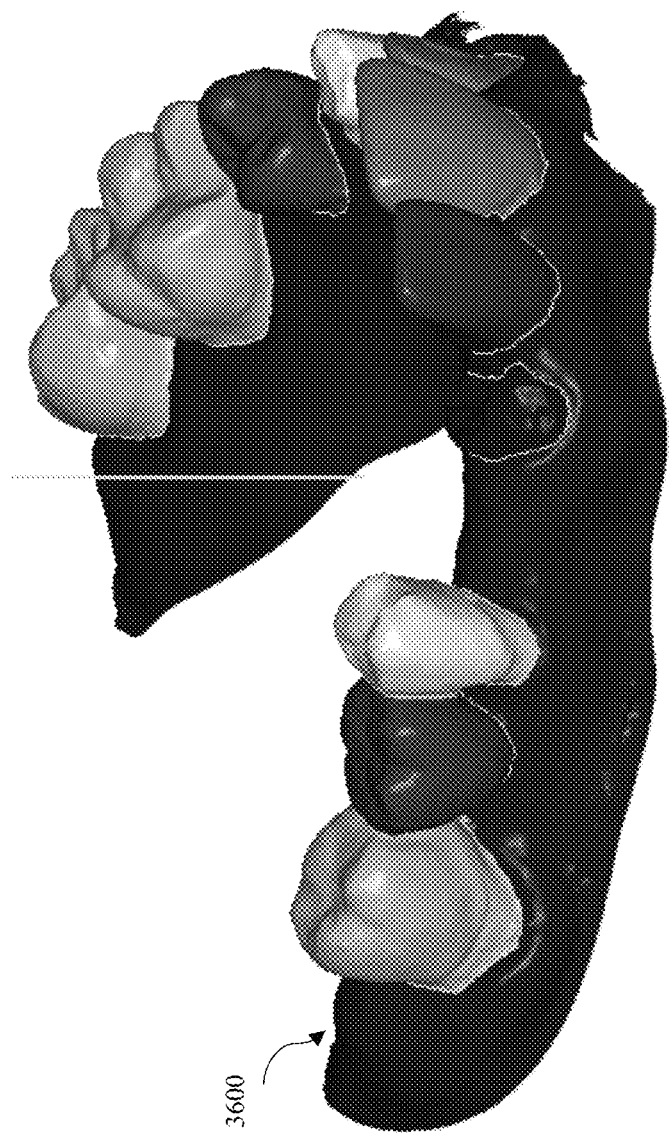
FIG. 36 illustrates an example of a segmented 3D digital dental model that includes one or more virtual teeth.
Figure 37:
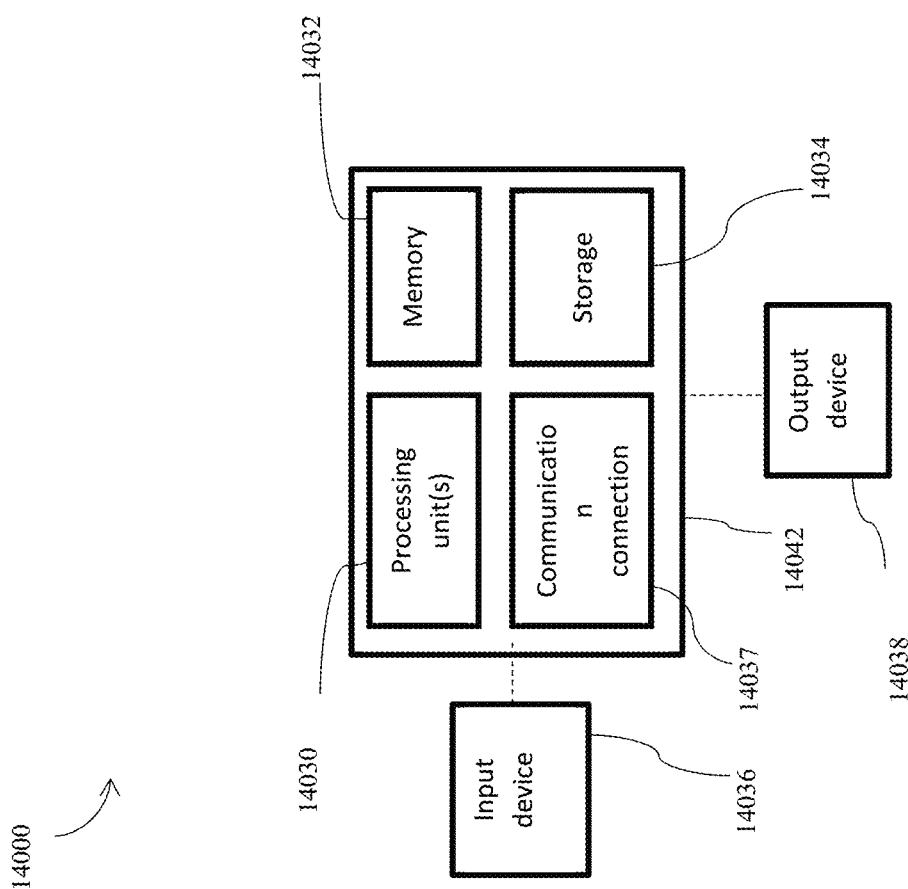
FIG. 37 illustrates an example of a system in some embodiments.

FIG. 36 illustrates an example of a segmented 3D digital dental model such as segmented 3D digital model 3600 having one more segmented virtual teeth determined by one or more features as described in the present disclosure.

Some embodiments include a processing system that can include a processor, a computer-readable storage medium including instructions executable by the processor to perform steps including one or more features described in the present disclosure.

FIG. 38 illustrates a processing system 14000 in some embodiments. The system 14000 can include a processor 14030, computer-readable storage medium 14034 having instructions executable by the processor to perform one or more steps described in the present disclosure.

In some embodiments the computer-implemented method can display a digital model on a display and receive input from an input device such as a mouse or touch screen on the display for example. The computer-implemented method can, upon receiving an initiation command, perform one or more features described in the present disclosure in some embodiments. The computer-implemented method can, upon receiving manipulation commands, rotate, zoom, move, and/or otherwise manipulate the digital model in any way as is known in the art.

One or more of the features disclosed herein can be performed and/or attained automatically, without manual or user intervention. One or more of the features disclosed herein can be performed by a computer-implemented method. The features—including but not limited to any methods and systems—disclosed may be implemented in computing systems. For example, the computing environment 14042 used to perform these functions can be any of a variety of computing devices (e.g., desktop computer, laptop computer, server computer, tablet computer, gaming system, mobile device, programmable automation controller, video card, etc.) that can be incorporated into a computing system comprising one or more computing devices. In some embodiments, the computing system may be a cloud-based computing system.

For example, a computing environment 14042 may include one or more processing units 14030 and memory 14032. The processing units execute computer-executable instructions. A processing unit 14030 can be a central processing unit (CPU), a processor in an application-specific integrated circuit (ASIC), or any other type of processor. In some embodiments, the one or more processing units 14030 can execute multiple computer-executable instructions in parallel, for example. In a multi-processing system, multiple processing units execute computer-executable instructions to increase processing power. For example, a representative computing environment may include a central processing unit as well as a graphics processing unit or co-processing unit. The tangible memory 14032 may be volatile memory (e.g., registers, cache, RAM), non-volatile memory (e.g., ROM, EEPROM, flash memory, etc.), or some combination of the two, accessible by the processing unit(s). The memory stores software implementing one or more innovations described herein, in the form of computer-executable instructions suitable for execution by the processing unit(s).

A computing system may have additional features. For example, in some embodiments, the computing environment includes storage 14034, one or more input devices 14036, one or more output devices 14038, and one or more communication connections 14037. An interconnection mechanism such as a bus, controller, or network, interconnects the components of the computing environment. Typically, operating system software provides an operating environment for other software executing in the computing environment, and coordinates activities of the components of the computing environment.

The tangible storage 14034 may be removable or non-removable, and includes magnetic or optical media such as magnetic disks, magnetic tapes or cassettes, CD-ROMs, DVDs, or any other medium that can be used to store information in a non-transitory way and can be accessed within the computing environment. The storage 14034 stores instructions for the software implementing one or more innovations described herein.

The input device(s) may be, for example: a touch input device, such as a keyboard, mouse, pen, or trackball; a voice input device; a scanning device; any of various sensors; another device that provides input to the computing environment; or combinations thereof. For video encoding, the input device(s) may be a camera, video card, TV tuner card, or similar device that accepts video input in analog or digital form, or a CD-ROM or CD-RW that reads video samples into the computing environment. The output device(s) may be a display, printer, speaker, CD-writer, or another device that provides output from the computing environment.

The communication connection(s) enable communication over a communication medium to another computing entity. The communication medium conveys information, such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Any of the disclosed methods can be implemented as computer-executable instructions stored on one or more computer-readable storage media 14034 (e.g., one or more optical media discs, volatile memory components (such as DRAM or SRAM), or nonvolatile memory components (such as flash memory or hard drives)) and executed on a computer (e.g., any commercially available computer, including smart phones, other mobile devices that include computing hardware, or programmable automation controllers) (e.g., the computer-executable instructions cause one or more processors of a computer system to perform the method). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media 14034. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, Python, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

In view of the many possible embodiments to which the principles of the disclosure may be applied, it should be recognized that the illustrated embodiments are only examples and should not be taken as limiting the scope of the disclosure.

What is claimed is:

1. A computer-implemented method of automatically determining a trim-line, comprising:
receiving a 3D digital dental model, the 3D digital dental model comprising one or more virtual teeth and a virtual non-tooth region;
combining the one or more virtual teeth into one or more virtual tooth regions;
determining a distance field from a virtual tooth region to one or more vertices in a virtual non-tooth region of the 3D digital dental model;
determining a first iso-line of the distance field for a first iso-value;
automatically determining a back distance field from the one or more first iso-lines to one or more vertex points having a distance value less than the first iso-value;
determining a second iso-line for the back distance field for a second iso-value to generate a trim-line.

2. The method of claim 1, further comprising combining the one or more virtual tooth regions together to form a final virtual tooth region.

3. The method of claim 1, wherein the distance field comprises one or more distance values, each distance value a distance from the virtual tooth region to a vertex in the virtual non-tooth region.

4. The method of claim 1, wherein determining an iso-line of the distance field for the first iso-value comprises determining one or more digital surface triangles having vertices with distance values both below and above the first iso-value.

5. The method of claim 4, further comprising constructing one or more first iso-line segments for the digital surface triangles having vertices with distance values both below and above the first iso-value.

6. The method of claim 1, wherein determining the second iso-line of the back distance field comprises determining one or more digital surface triangles having vertices with distance values both below and above the second iso-value.

7. The method of claim 6, further comprising constructing one or more second iso-line segments for the digital surface triangles having vertices with distance values both below and above the second iso-value.

8. A non-transitory computer readable medium storing executable computer program instructions to determine a trim line for an aligner, the computer program instructions comprising instructions for:
receiving a 3D digital dental model, the 3D digital dental model comprising one or more virtual teeth and a virtual non-tooth region;
combining the one or more virtual teeth into one or more virtual tooth regions;
determining a distance field from a virtual tooth region to one or more vertices in the virtual non-tooth region of the 3D digital dental model;
determining a first iso-line of the distance field for a first iso-value;
automatically determining a back distance field from the one or more first iso-lines to one or more vertex points having a distance value less than the first iso-value;
determining a second iso-line for the back distance field for a second iso-value to generate a trim-line.

9. The non-transitory computer readable medium of claim 8, further comprising combining the one or more virtual tooth regions together to form a final virtual tooth region.

10. The non-transitory computer readable medium of claim 8, wherein the distance field comprises one or more distance values, each distance value a distance from the virtual tooth region to a vertex in the virtual non-tooth region.

11. The non-transitory computer readable medium of claim 8, wherein determining an iso-line of the distance field for the first iso-value comprises determining one or more digital surface triangles having vertices with distance values both below and above the first iso-value.

12. The non-transitory computer readable medium of claim 11, further comprising constructing one or more first iso-line segments for the digital surface triangles having vertices with distance values both below and above the first iso-value.

13. The non-transitory computer readable medium of claim 8, wherein determining the second iso-line of the back distance field comprises determining one or more digital surface triangles having vertices with distance values both below and above the second iso-value.

14. The non-transitory computer readable medium of claim 13, further comprising constructing one or more second iso-line segments for the digital surface triangles having vertices with distance values both below and above the second iso-value.

15. A system to determine a trim line for an aligner, the system comprising:
   a processor; and
   a non-transitory computer-readable storage medium comprising instructions executable by the processor to perform steps comprising:
   receiving a 3D digital dental model, the 3D digital dental model comprising one or more virtual teeth and a virtual non-tooth region;
   combining the one or more virtual teeth into one or more virtual tooth regions;
   determining a distance field from a virtual tooth region to one or more vertices in a virtual non-tooth region of the 3D digital dental model;
   determining a first iso-line of the distance field for a first iso-value;
   automatically determining a back distance field from the one or more first iso-lines to one or more vertex points having a distance value less than the first iso-value;
   determining a second iso-line for the back distance field for a second iso-value to generate a trim-line.

16. The system of claim 15, further comprising combining the one or more virtual tooth regions together to form a final virtual tooth region.

17. The system of claim 15, wherein determining an iso-line of the distance field for the first iso-value comprises determining one or more digital surface triangles having vertices with distance values both below and above the first iso-value.

18. The system of claim 17, further comprising constructing one or more first iso-line segments for the digital surface triangles having vertices with distance values both below and above the first iso-value.

19. The system of claim 15, wherein determining the second iso-line of the back distance field comprises determining one or more digital surface triangles having vertices with distance values both below and above the second iso-value.

20. The system of claim 19, further comprising constructing one or more second iso-line segments for the digital surface triangles having vertices with distance values both below and above the second iso-value.

* * * * *